United States Patent
Momchilov et al.

(10) Patent No.: US 12,381,869 B2
(45) Date of Patent: Aug. 5, 2025

(54) MULTIFACTOR CONTEXTUAL AUTHENTICATION AND ENTROPY FROM DEVICE OR DEVICE INPUT OR GESTURE AUTHENTICATION

(71) Applicant: Citrix Systems, Inc., Fort Lauderdale, FL (US)

(72) Inventors: Georgy Momchilov, Parkland, FL (US); Chris Pavlou, Boca Raton, FL (US); Ola Nordstrom, Fort Lauderdale, FL (US); Christopher Wade, Ocean Ridge, FL (US)

(*) Notice: Subject to any disclaimer, the term of this patent is extended or adjusted under 35 U.S.C. 154(b) by 137 days.

(21) Appl. No.: 17/681,035

(22) Filed: Feb. 25, 2022

(65) Prior Publication Data

US 2022/0247739 A1 Aug. 4, 2022

Related U.S. Application Data

(63) Continuation of application No. 16/857,750, filed on Apr. 24, 2020, now Pat. No. 11,297,055, which is a
(Continued)

(51) Int. Cl.
*H04L 9/40* (2022.01)
*G06F 21/34* (2013.01)
(Continued)

(52) U.S. Cl.
CPC .......... *H04L 63/0853* (2013.01); *G06F 21/34* (2013.01); *G06F 21/41* (2013.01);
(Continued)

(58) Field of Classification Search
CPC ............. H04L 63/0853; H04L 63/0272; H04L 63/0815; H04L 63/0884; H04L 9/0825;
(Continued)

(56) References Cited

U.S. PATENT DOCUMENTS 8,209,744 B2 * 6/2012 Zhu ..................... H04L 63/0869
713/172
8,601,600 B1 12/2013 Shankar et al.
(Continued)

FOREIGN PATENT DOCUMENTS

EP 2919178 A1 * 9/2015 ........... G06Q 20/425
JP 2002258974 * 9/2002 ............... G06F 1/00
(Continued)

OTHER PUBLICATIONS

Diez et al.; "Toward Self-Authenticable Wearable Devices", Feb. 2015, IEEE Wireless Communications, pp. 36-43. (Year: 2015).*
(Continued)

*Primary Examiner* — Matthew Smithers

(57) ABSTRACT

Methods and systems for authenticating a user requesting to access one or more resources via a device are described herein. Authentication may be based on or otherwise rely on a plurality of devices. For example, aspects described herein are directed towards a system and method for receiving an authentication request from a first user device. A second user device may send a request for and receive a public key of the first user device and receive. The second user device may verify the authentication request using the public key of the first user device and perform authentication based on an authentication secret received from a user.

19 Claims, 88 Drawing Sheets

Related U.S. Application Data continuation of application No. 16/164,258, filed on Oct. 18, 2018, now Pat. No. 10,673,845, which is a continuation of application No. 15/150,558, filed on May 10, 2016, now Pat. No. 10,122,709.

(60) Provisional application No. 62/160,144, filed on May 12, 2015.

(51) Int. Cl.

| | | |
|---|---|---|
| *G06F 21/41* | (2013.01) | |
| *G06F 21/83* | (2013.01) | |
| *H04W 12/06* | (2021.01) | |
| *H04W 12/30* | (2021.01) | |
| *H04L 9/08* | (2006.01) | |
| *H04L 9/32* | (2006.01) | |
| *H04W 12/43* | (2021.01) | |

(52) U.S. Cl.
CPC .......... *G06F 21/83* (2013.01); *H04L 63/0272* (2013.01); *H04L 63/0815* (2013.01); *H04L 63/0884* (2013.01); *H04W 12/06* (2013.01); *H04W 12/35* (2021.01); *G06F 2221/2139* (2013.01); *H04L 9/0825* (2013.01); *H04L 9/083* (2013.01); *H04L 9/3247* (2013.01); *H04L 63/0846* (2013.01); *H04W 12/43* (2021.01)

(58) Field of Classification Search
CPC ... H04L 9/083; H04L 9/3247; H04L 63/0846; G06F 21/34; G06F 21/41; G06F 21/83; G06F 2221/2139; H04W 12/06; H04W 12/35; H04W 12/43
See application file for complete search history.

(56) References Cited

U.S. PATENT DOCUMENTS

| | | | | |
|---|---|---|---|---|
| 8,661,254 | B1 * | 2/2014 | Sama | H04L 63/18 |
| | | | | 713/168 |
| 8,725,842 | B1 * | 5/2014 | Al-Nasser | G06F 3/04883 |
| | | | | 709/219 |
| 9,119,072 | B2 * | 8/2015 | Du | H04W 12/08 |
| 9,264,419 | B1 * | 2/2016 | Johansson | G06F 21/45 |
| 9,280,645 | B1 * | 3/2016 | Alikhani | G06F 21/31 |
| 9,319,401 | B2 * | 4/2016 | Gill | G06F 21/43 |
| 9,323,911 | B1 * | 4/2016 | Alikhani | G06F 21/31 |
| 9,369,289 | B1 | 6/2016 | Harrison et al. | |
| 9,485,255 | B1 * | 11/2016 | Avital | H04L 63/102 |
| 9,641,526 | B1 * | 5/2017 | Gopalakrishnan | H04L 63/0876 |
| 9,742,767 | B1 * | 8/2017 | Li | G06F 21/31 |
| 9,800,995 | B2 * | 10/2017 | Libin | H04W 4/60 |
| 9,805,182 | B1 * | 10/2017 | Kayyidavazhiyil | G06F 21/35 |
| 9,942,222 | B1 * | 4/2018 | Fenton | H04L 63/0853 |
| 10,122,709 | B2 * | 11/2018 | Momchilov | H04L 63/0884 |
| 10,673,845 | B2 * | 6/2020 | Momchilov | H04L 63/0272 |
| 11,297,055 | B2 * | 4/2022 | Momchilov | G06F 21/41 |
| 2006/0005033 | A1 * | 1/2006 | Wood | H04L 9/3215 |
| | | | | 713/182 |
| 2011/0219427 | A1 * | 9/2011 | Hito | H04L 63/0853 |
| | | | | 726/3 |
| 2012/0124651 | A1 * | 5/2012 | Ganesan | H04L 67/02 |
| | | | | 726/4 |
| 2014/0189781 | A1 * | 7/2014 | Manickam | H04W 4/50 |
| | | | | 726/1 |
| 2014/0245396 | A1 | 8/2014 | Oberheide et al. | |
| 2014/0282878 | A1 * | 9/2014 | Ignatchenko | G06Q 20/321 |
| | | | | 726/3 |
| 2014/0293957 | A1 * | 10/2014 | Chun | H04L 1/0046 |
| | | | | 370/329 |
| 2014/0329497 | A1 * | 11/2014 | Sanzgiri | H04L 63/0492 |
| | | | | 455/26.1 |
| 2014/0380445 | A1 * | 12/2014 | Tunnell | H04L 63/18 |
| | | | | 726/7 |
| 2015/0019444 | A1 * | 1/2015 | Purves | G06Q 20/3821 |
| | | | | 705/76 |
| 2015/0215299 | A1 * | 7/2015 | Burch | H04W 12/069 |
| | | | | 726/5 |
| 2015/0358451 | A1 * | 12/2015 | Cronin | H04M 1/72412 |
| | | | | 455/420 |
| 2015/0371026 | A1 * | 12/2015 | Gnanasekaran | G06F 21/35 |
| | | | | 726/7 |
| 2016/0037345 | A1 * | 2/2016 | Margadoudakis | H04W 12/33 |
| | | | | 455/411 |
| 2016/0103982 | A1 * | 4/2016 | Boss | G06F 21/316 |
| | | | | 726/7 |
| 2016/0174025 | A1 * | 6/2016 | Chaudhri | H04B 1/385 |
| | | | | 455/41.3 |
| 2016/0197916 | A1 * | 7/2016 | Ravindran | H04L 63/10 |
| | | | | 726/4 |
| 2016/0241558 | A1 | 8/2016 | Adam et al. | |
| 2016/0262017 | A1 * | 9/2016 | Lavee | G06F 21/31 |
| 2016/0285628 | A1 | 9/2016 | Carrer et al. | |
| 2016/0286393 | A1 * | 9/2016 | Rasheed | H04L 63/0853 |

FOREIGN PATENT DOCUMENTS

| | | | | | |
|---|---|---|---|---|---|
| JP | 2004054395 | * | 2/2004 | | G06F 3/033 |
| WO | WO-2014022856 A1 | * | 2/2014 | | H04W 4/005 |

OTHER PUBLICATIONS

Khan et al.; "SEPIA: Secure-PIN-Authentication-as-a-Service for ATM using Mobile and Wearable Devices", 2015, 3rd IEEE International Conference on Mobile Cloud Computing, Services, and Engineering, pp. 41-50. (Year: 2015).*
Diez et al.; "Toward Self-Authenticable Wearable Devices", 2015, IEEE Wireless Communications, pp. 36-43. (Year: 2015).*
Jun. 27, 2022—(US) Non-Office Action—U.S. Appl. No. 16/895,467.
Jun. 27, 2022—(EU) Examination Report—App 16 713 717.3.

* cited by examiner

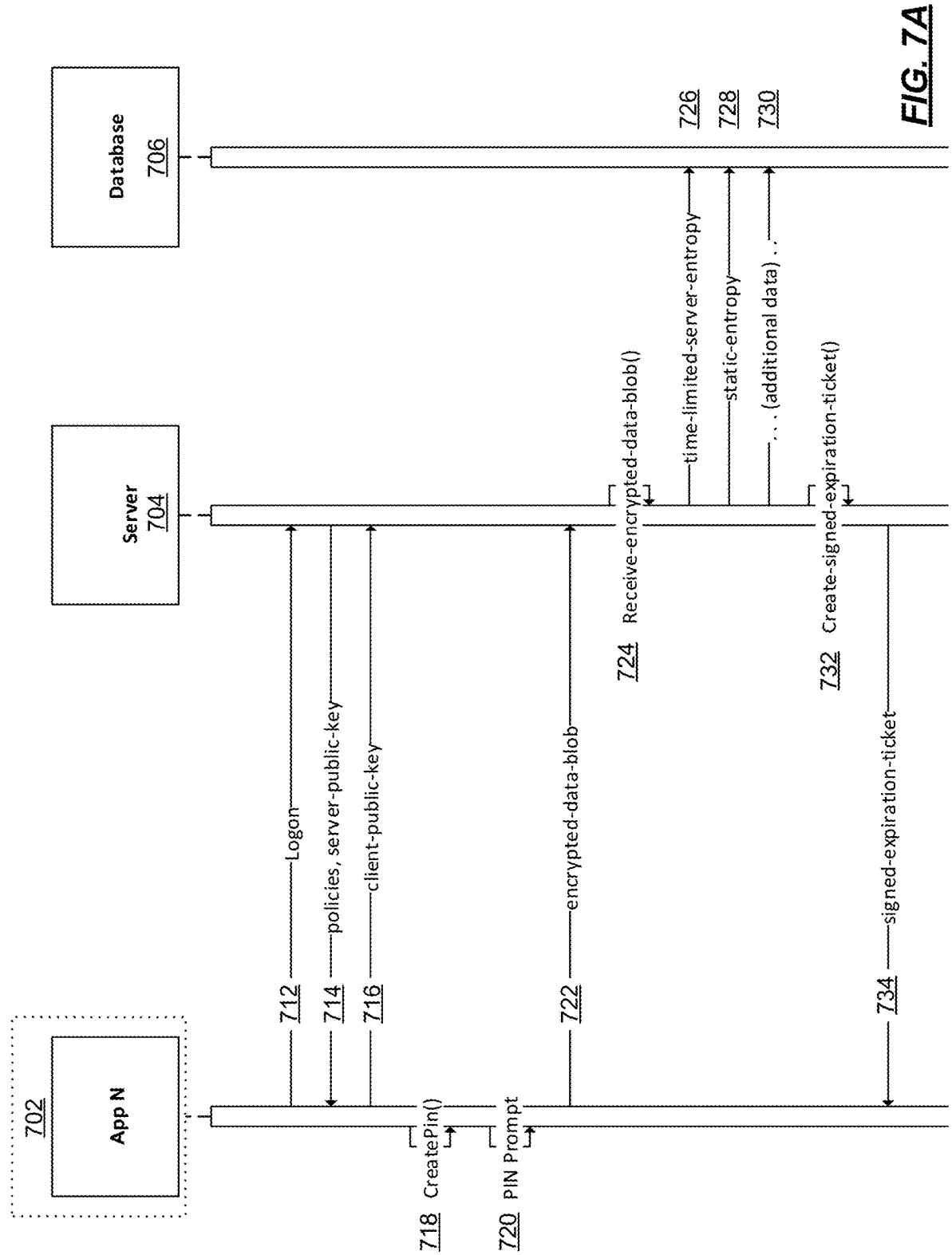

```
Function CreatePin()
{
    tickRollover    = GetDeviceMaximumTickValue()   ⎫
    tickPerSecond   = CalculateTicksPerSecond()     ⎬  718A
    tickNow         = GetCurrentProcessorTickCount()⎭
    userID          = GetUserID()                   ⎫
    deviceID        = GetDeviceID()                 ⎪
    serverPublicKey = GetServerPublicKey()          ⎬  718B
    salt            = CryptGenRandom(128)           ⎭ pin = PromptForPin()
    encryptedDataBlob = Encrypt(serverPublicKey, userID, deviceID,
          ⌐                    pin, tickRollover, tickPerSecond, tickNow,
      722A                     salt)

SecureZeroMemory(pin)
    SendToServerViaTLS(encryptedDataBlob) ⎯ 722B
    SecureZeroMemory(encryptedDataBlob)
}
```

*FIG. 7B*

```
Function Receive-encrypted-data-blob(encryptedBlob)
{
    serverPrivateKey = GetServerPrivateKey()            ⎫
                                                        ⎬ 724A
    blob = Decrypt(serverPrivateKey, encryptedBlob)     ⎭
    SecureZeroMemory(serverPrivateKey);

userID        = GetUserIDFrom(blob)                 ⎫
    deviceID      = GetDeviceIDFrom(blob)               ⎪
    pin           = GetPinFrom(blob)                    ⎬ 724B
    tickRollover  = GetDeviceMaximumTickValueFrom(blob) ⎪
    tickPerSecond = CalculateTicksPerSecondFrom(blob)   ⎪
    tickNow       = GetCurrentProcessorTickCountFrom(blob) ⎭
                                                             724C SaveInDatabase(userID, deviceID, tickRollover, tickPerSecond, tickNow)

signed-expiration-ticket = CreateSigned-expiration-ticket(userID,
                    deviceID, pin, tickRollover, tickPerSecond,
                    tickNow)
    SecureZeroMemory(pin)
    SendToClient(signed-expiration-ticket)
}                                                       734A
```

FIG. 7C

```
Function CreateSigned-expiration-ticket(userID, deviceID, pin,
                                    tickRollover, tickPerSecond, tickNow)
{
    time-limited-server-entropy = CryptGenRandom(64)———732A
                                                              ┌——726A
    SaveTimeLimitedEntropyInDatabase(userID, deviceID,
                                    time-limited-server-entropy)

static-entropy-from-server = FetchStaticEntropyFromServerDatabase(
                                                           userID, deviceID)
           732B
    if (!static-entropy-from-server)———732C
    {                                              ┌——732D
        static-entropy-from-server= CryptGenRandom(64)         ┌——728A
        SaveStaticEntropyFromServerInDatabase(userID, deviceID,
                                                    static-entropy-from-server)
    }
                                           ┌——732E
    key-for-static-entropy   = PBKDF2( 100000, pin,
732F—┐                                              time-limited-server-entropy)
        keyForPin            = PBKDF2( 100000, time-limited-server-entropy,
                                                    static-entropy-from-server)
    ⎰ encryptedPin            = AESEncrypt(keyForPin, pin)
    ⎱ encrypted-static-entropy = AESEncrypt(key-for-static-entropy,
732G                                                static-entropy-from-server)

SecureZeroMemory(time-limited-server-entropy)
    SecureZeroMemory(static-entropy-from-server)
    SecureZeroMemory(key-for-static-entropy)
    SecureZeroMemory(keyForPin)
```

```
                                            • 
                                            • 
                                            •        732H
nowTime             = GetCurrentGMTTimeInSeconds()
expirationTimeSeconds = CalculateExpirationTimeFrom(nowTime)    732I
lifetimeSeconds     = expirationTimeSeconds - nowTime;
tickEnd = CalculateExpirationTick(lifetimeSeconds, tickRollover,  732J
                                  tickPerSecond, tickNow);

clientDevicePublicKey = GetDevicePublicKey(userID, deviceID)
                                                              732K
timeBasedPinValidator = Encrypt(clientDevicePublicKey,
                               expirationTimeSeconds, tickStart, tickEnd,
                               encryptedPin, encrypted-static-entropy)

SaveInDatabase(userID, deviceID, expirationTimeSeconds, tickStart,
               tickEnd, encryptedPin, encrypted-static-entropy)
                                                                  732L
serverPrivateKey = GetServerPrivateKey()
signed-expiration-ticket = Sign(serverPrivateKey,              732M
                                timeBasedPinValidator)
SecureZeroMemory(serverPrivateKey)

return signed-expiration-ticket
}
```

*FIG. 7E*

```
Function Receive-signed-expiration-ticket(signed-expiration-ticket)
{
    serverPublicKey = GetServerPublicKey()  /—812A
                                                         /—812B
    if (VerifySignature(serverPublicKey, signed-expiration-ticket) ==
                                                                false)
    {
        /* display error */
        return
    }
                                 /—812C
    Save(signed-expiration-ticket)
}
```

*FIG. 8B*

```
Function VerifyPin(enteredPin)                     812D
{
    correctPin              = false
    serverPublicKey         = GetServerPublicKey()
    signed-expiration-ticket = GetExpirationTicket()              812B if (VerifySignature(serverPublicKey, signed-expiration-ticket) ==
                                                            false)
    {
        /* display error */
        return
    }
                                                              814A
    devicePrivateKey        = GetDevicePrivateKey()
    timeBasedPinValidator   = Decrypt(devicePrivateKey,
                                      signed-expiration-ticket)
    SecureZeroMemory(devicePrivateKey)
                                                              814B deviceTimeSeconds       = GetCurrentGMTTimeInSeconds()
    tickNow                 = GetCurrentProcessorTickCount()
    tickStart               = ReadTickStartFrom(timeBasedPinValidator)
    tickEnd                 = ReadTickEndFrom(timeBasedPinValidator)
    encryptedPin            = ReadEncryptedPinFrom(timeBasedPinValidator)
    encrypted-static-entropy = ReadEncryptedStaticEntropyFrom
                                           (timeBasedPinValidator)

if (deviceTimeSeconds >= expirationTimeSeconds)
    {
        /* return error */                              814C
        return
    }                       814D
    if (tickStart < tickEnd)
    {                                                       814E
        if (tickEnd <= tickNow || tickNow <= tickStart)
        {
            /* return error */
            return
        }
    }
                            •
                            •
                            •
```

```
else
{                                                            ╭── 814F
    if (tickEnd <= tickNow && tickNow <= tickStart)
    {
        /* return error */
        return
    }
} userID          = GetUserID()
deviceID        = GetDeviceID()
devicePrivateKey = GetDevicePrivateKey()                     ╭── 818A signedUserDeviceID = Sign(devicePrivateKey, userID, deviceID)
SecureZeroMemory(devicePrivateKey)

time-limited-server-entropy = SendToServerViaTLS(signedUserDeviceID)
                                                              ╭── 828A
key-for-static-entropy = PBKDF2(100000, enteredPin,
828B ──╮                              time-limited-server-entropy)
    static-entropy-from-server = AESDecrypt(Key-for-static-entropy,
                                            encrypted-static-entropy)
keyForPin = PBKDF2(100000, time-limited-server-entropy,
                                       static-entropy-from-server)
decryptedPin = AESDecrypt(keyForPin, encryptedPin)                ╲── 828C
if (enteredPin == decryptedPin)                    ╲── 828D
    correctPin = true
else                                      ── 830A
    SecureZeroMemory(static-entropy-from-server)

SecureZeroMemory(time-limited-server-entropy)
SecureZeroMemory(key-for-static-entropy)
SecureZeroMemory(keyForPin)
SecureZeroMemory(enteredPin)

Return correctPin
}
```

*FIG. 8D*

```
Function Handle-time-limited-server-entropy-request (userID, deviceID,
                                                     signedUserDeviceID)
{
    currentTime = GetGMTTimeInSeconds()
    ticketExpirationTime = GetTicketExpirationTime(userID, deviceID)

if (currentTime >= ticketExpirationTime)
    {
        /* return error */                  ──── 820A
        return
    } devicePublicKey = GetPublicKey(userID, deviceID)

if (VerifySignature(signedUserDeviceID, devicePublicKey) == false)
    {
        /* return error */
        return                              ──── 820B
    }                                              ──── 822A time-limited-server-entropy = LookupTimeLimitedServerEntropyInDatabase
                                                (userID, deviceID)
    SendToClientViaTLS(time-limited-server-entropy)
}                                                  ──── 826A
```

2520
Enter your Citrix mouse code
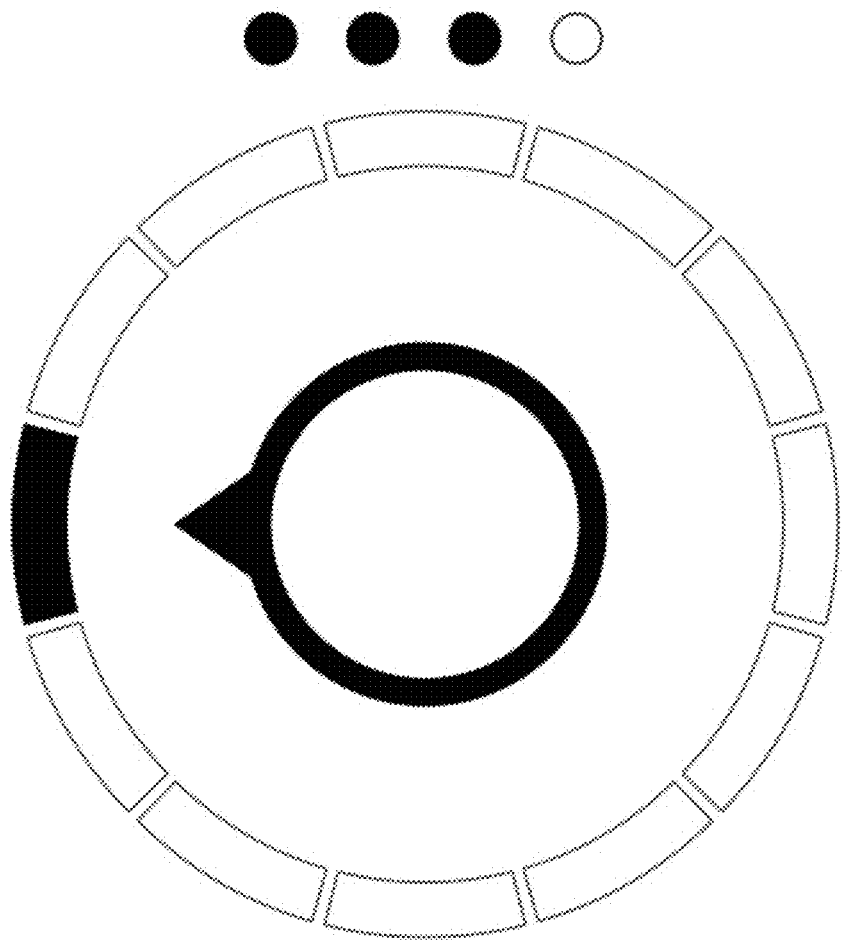
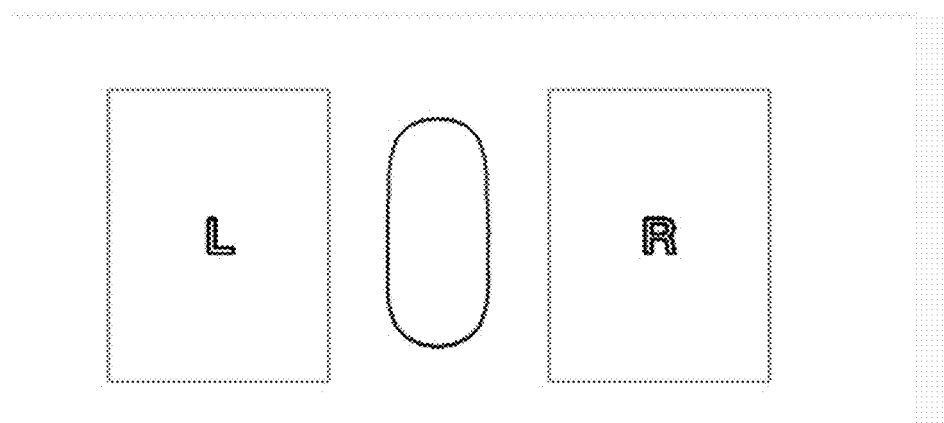
*FIG. 25B*

Enter your Citrix mouse code

3040

Set your Citrix mouse code

3520
Enter your Citrix mouse code
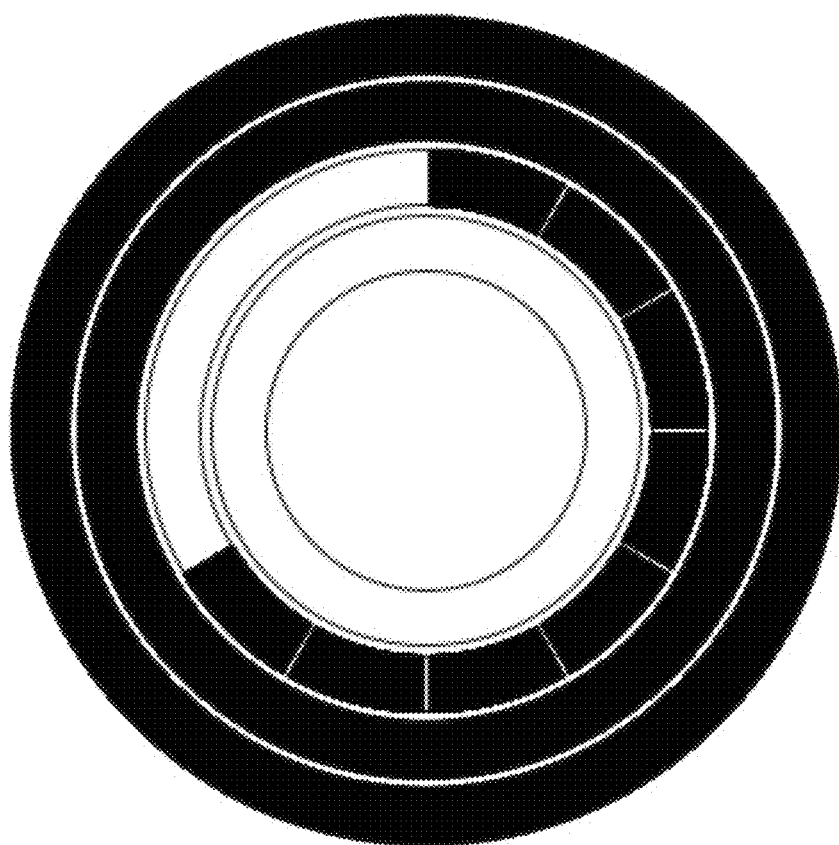
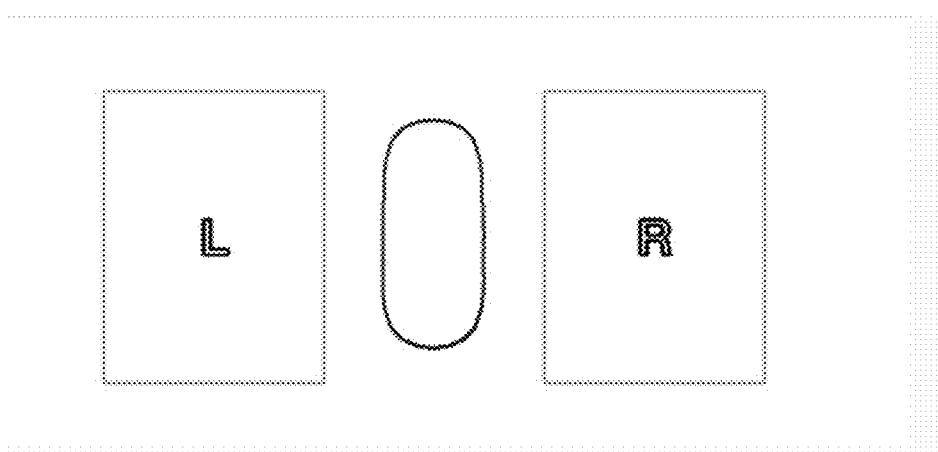
*FIG. 35B*

3540
Enter your Citrix mouse code
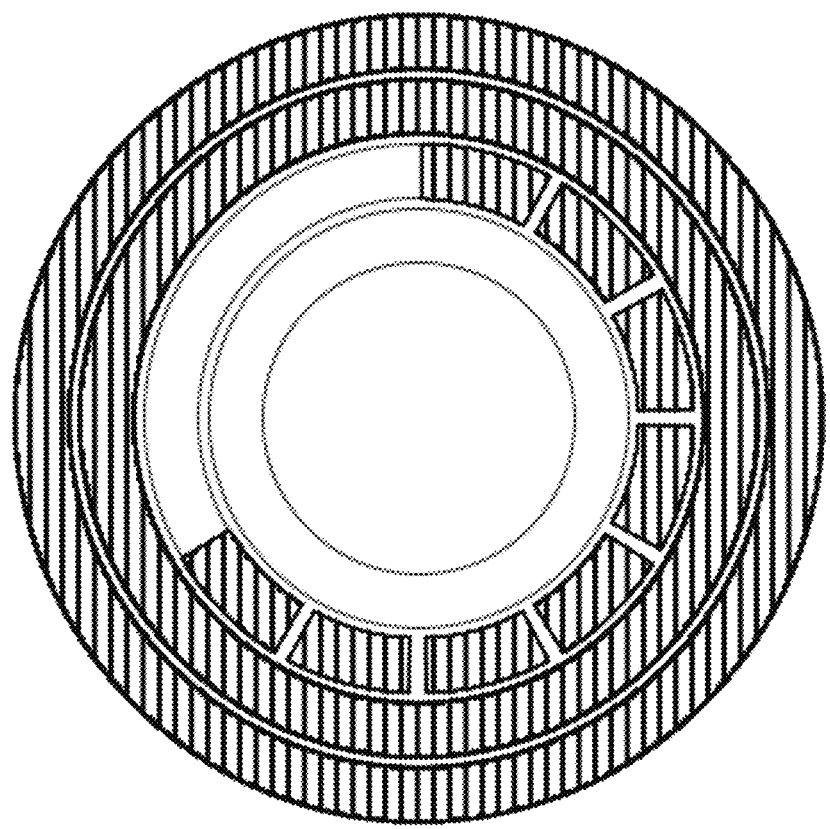
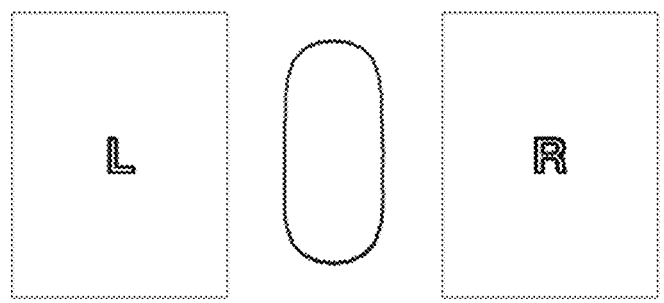
*FIG. 35C*

0|------------TNow------------|1000

FIG. 65A

0|--tickStart-------tickEnd----|1000

0|------------TNow------------|1000

FIG. 65B

0|------tickEnd--tickStart------|1000

0|-TNow-----------------Tnow-|1000

FIG. 65C

MULTIFACTOR CONTEXTUAL AUTHENTICATION AND ENTROPY FROM DEVICE OR DEVICE INPUT OR GESTURE AUTHENTICATION

CROSS-REFERENCE TO RELATED APPLICATIONS

This application is a continuation of pending U.S. patent application Ser. No. 16/857,750, filed Apr. 24, 2020 and entitled MULTIFACTOR CONTEXTUAL AUTHENTICATION AND ENTROPY FROM DEVICE OR DEVICE INPUT OR GESTURE AUTHENTICATION, which claims priority to U.S. patent application Ser. No. 16/164,258, filed Oct. 18, 2018 and entitled MULTIFACTOR CONTEXTUAL AUTHENTICATION AND ENTROPY FROM DEVICE OR DEVICE INPUT OR GESTURE AUTHENTICATION, which claims priority to U.S. patent application Ser. No. 15/150,558, filed May 10, 2016 and entitled MULTIFACTOR CONTEXTUAL AUTHENTICATION AND ENTROPY FROM DEVICE OR DEVICE INPUT OR GESTURE AUTHENTICATION, which claims priority to U.S. Provisional Patent Application Ser. No. 62/160,144, filed May 12, 2015 and entitled MULTIFACTOR CONTEXTUAL AUTHENTICATION AND ENTROPY FROM DEVICE OR DEVICE INPUT OR GESTURE AUTHENTICATION. The prior applications are herein incorporated by reference in their entireties and for all purposes.

FIELD

Aspects described herein generally relate to computer networking, remote access, and computer security. More specifically, aspects described herein relate to authentication of a user requesting to access one or more resources via a device, where the authentication may be based on a plurality of devices.

BACKGROUND

Client applications protecting sensitive information typically require a user-supplied PIN to authenticate the user. However, a simple PIN might not provide sufficient security. For example, a six-digit numeric PIN at most provides $10^6$ characters of entropy, which may be used for data security. This may be inadequate to withstand a GPU-based password cracking attack.

A PIN Validator may be used to verify that the user has entered the correct PIN. Current systems may create a PIN Validator by generating a random phrase, encrypting the random phrase with a derivative of the user-supplied PIN, and storing the original random phrase and the encrypted random phrase after hashing each of them a number of times for obfuscation. The PIN validator may be stored on the client device. However, this data security mechanism may be reversed in an offline attack in a matter of hours.

Additionally, the small amount of entropy provided by the user-supplied PIN might not be able to be used for cryptographic key derivation. Although key-stretching algorithms exist, the algorithms are not adequate for government and other regulated environments with strict security standards.

Moreover, with today's flexible mobile work styles, when people frequently switch between locations, devices and applications, security and authentication become very challenging, especially if the goal is to preserve or enhance user experience. Authentication secrets are a continual source of frustration for users. At their very core, most password policies are contradictory in nature. They contain a mix of upper and lower case letters, symbols and digits yet should be easy to remember. In the case of mobile devices, they are typically simple to enter and are as frictionless as possible to the end user. This leads to user PINs that are trivial to crack or even subject to shoulder surfing. Furthermore, PINs often cannot be used to derive encryption keys because they lack the necessary entropy (e.g., randomness) to create encryption keys. The problems are further compounded when users switch between devices and applications and are frequently and repetitively asked to authenticate, often using different authentication mechanisms.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a system and method for making available, by a first user device, a public key of the first user device to devices of a device mesh, where the first user device may be in the device mesh. The method may comprise receiving, at the first user device and from a user, a request to access one or more resources via the first user device. In response to receiving the request to access the one or more resources, the first user device may determine a second user device in the device mesh having access to the public key of the first user device. The first user device may send, to the second user device in the device mesh, a request for user input of a credential at the second user device. The first user device may receive the credential from the second user device, and the first user device may authenticate the user based on the credential received from the second user device.

In some aspects, the second user device may comprise a mouse or a smartwatch. The credential may be configured to be input at the mouse or the smartwatch by one or more of a wheel or buttons of the mouse or the smartwatch. In additional aspects, in response to a determination that a display of the second user device is unavailable, one or more credential input buttons of the second user device may be emulated for display on a display of the first user device. The one or more credential input buttons of the second user device may comprise one or more of a scroll wheel or an on-screen slider.

In some aspects, the method may further comprise registering the first user device with the device mesh by providing an identifier for the first user device to the device mesh and correlating the identifier with the public key of the first device. The first user device may sign the request using a private key of the first user device, e.g., to generate a signed request. Sending the request may comprise sending the signed request, and the public key of the first user device may be available to the second user device for verifying the signed request. Additionally or alternatively, receiving the credential may comprise receiving the credential encrypted using the public key of the first user device.

In some aspects, receiving the credential from the second user device may be based on one or more of a geographical location of the second user device or a proximity of the second user device to the first user device. Additionally or alternatively, authenticating the user may comprise authenticating the user based on the credential received from the second user device and entropy from one or more of the second user device and an authentication server. In some aspects, after authenticating the user by the first user device, the first user device may send, to a third user device, a request for the third user device to authenticate the user.

In some aspects, the second user device may comprise a mouse having a scroll wheel. The mouse may be configured to receive input of the credential from the user via the scroll wheel. Additionally, receiving the credential at the first user device may comprise receiving a scrolling input via the scroll wheel of the mouse. The method may further comprise, in response to receiving the scrolling input via the scroll wheel of the mouse, generating for display on a display of the first user device a graphical user interface comprising a pointer, an arm, or a highlighted segment corresponding to the scrolling input.

Aspects described herein are directed towards a system and method for receiving, from a first user device and at a second user device, a request to authenticate a user requesting access to one or more resources via the first user device. In response to receiving the request to authenticate the user, the method may comprise generating for display on a display of the second user device or a display of the first user device a prompt for user input of a credential at the second user device. The second user device may receive input of the credential from the user. The second user device may authenticate the user based on the input of the credential received from the user. In response to authenticating the user, the second user device may send, to the first user device, an indication of a successful authentication.

In some aspects, the second user device may comprise a mouse, and the prompt may be generated for display on the display of the first user device. The mouse may have a scroll wheel and buttons for input of the credential. In some aspects, the second user device may comprise a smartwatch, and the prompt for user input of the credential may be generated for display on the display of the smartwatch.

In some aspects, the request to authenticate the user may be signed by a private key of the first user device. The method may further comprise accessing, by the second user device, a public key of the first user device from a device mesh. The method may also comprise verifying the request to authenticate the user signed by the private key using the public key of the first user device.

In some aspects, the second user device may access a public key of the first user device from a device mesh in response to authenticating the user. The second user device may encrypt the indication of the successful authentication using the public key of the first user device. Sending the indication of the successful authentication may comprise sending the indication of the successful authentication encrypted using the public key of the first user device.

Aspects described herein are directed towards a system and method for authenticating, at a first user device, a user requesting to access one or more resources via the first user device. In response to authenticating the user, a session for the user on the first user device may be initiated and state information for the session may be generated. Access to the session via the second user device may be granted by transferring the state information for the session to the second user device. In some aspects, granting access to the session via the second user device may be performed in response to a determination that a second user device is in a same device mesh as the first user device. In some aspects, the state information for the session may comprise one or more of an authentication token or an inactivity timer for the session.

The system and method described herein may comprise determining that the first user device is within a proximity of the second user device. Granting access to the session via the second user device may be performed in response to determining that the first user device is within the proximity of the second user device. Additionally or alternatively, it may be determined that the user issued, via the first user device, a command to pair the first user device with the second user device. Granting access to the session via the second user device may be performed in response to determining that the user issued the command to pair the first user device with the second user device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7A illustrates an example method of registering a client device in accordance with one or more illustrative aspects described herein.

FIG. 7B illustrates an example method of creating a PIN in accordance with one or more illustrative aspects described herein.

FIG. 7C illustrates an example method of a server receiving encrypted data in accordance with one or more illustrative aspects described herein.

FIGS. 7D and 7E illustrate an example method of creating an expiration ticket in accordance with one or more illustrative aspects described herein.

FIG. 8B illustrates an example method of a client device receiving an expiration ticket in accordance with one or more illustrative aspects described herein.

FIGS. 8C and 8D illustrate an example method of verifying a PIN in accordance with one or more illustrative aspects described herein.

FIG. 8E illustrates an example method of a server handling a client request for time-limited entropy in accordance with one or more illustrative aspects described herein.

FIGS. 25A-C illustrate example display screens for entering a mouse wheel authentication code in accordance with one or more illustrative aspects described herein.

FIGS. 35A-C illustrate example display screens for entering a mouse wheel authentication code in accordance with one or more illustrative aspects described herein.

FIGS. 65A-C illustrate example diagrams for calculating an expiration tick count.

DETAILED DESCRIPTION

Figure 1:
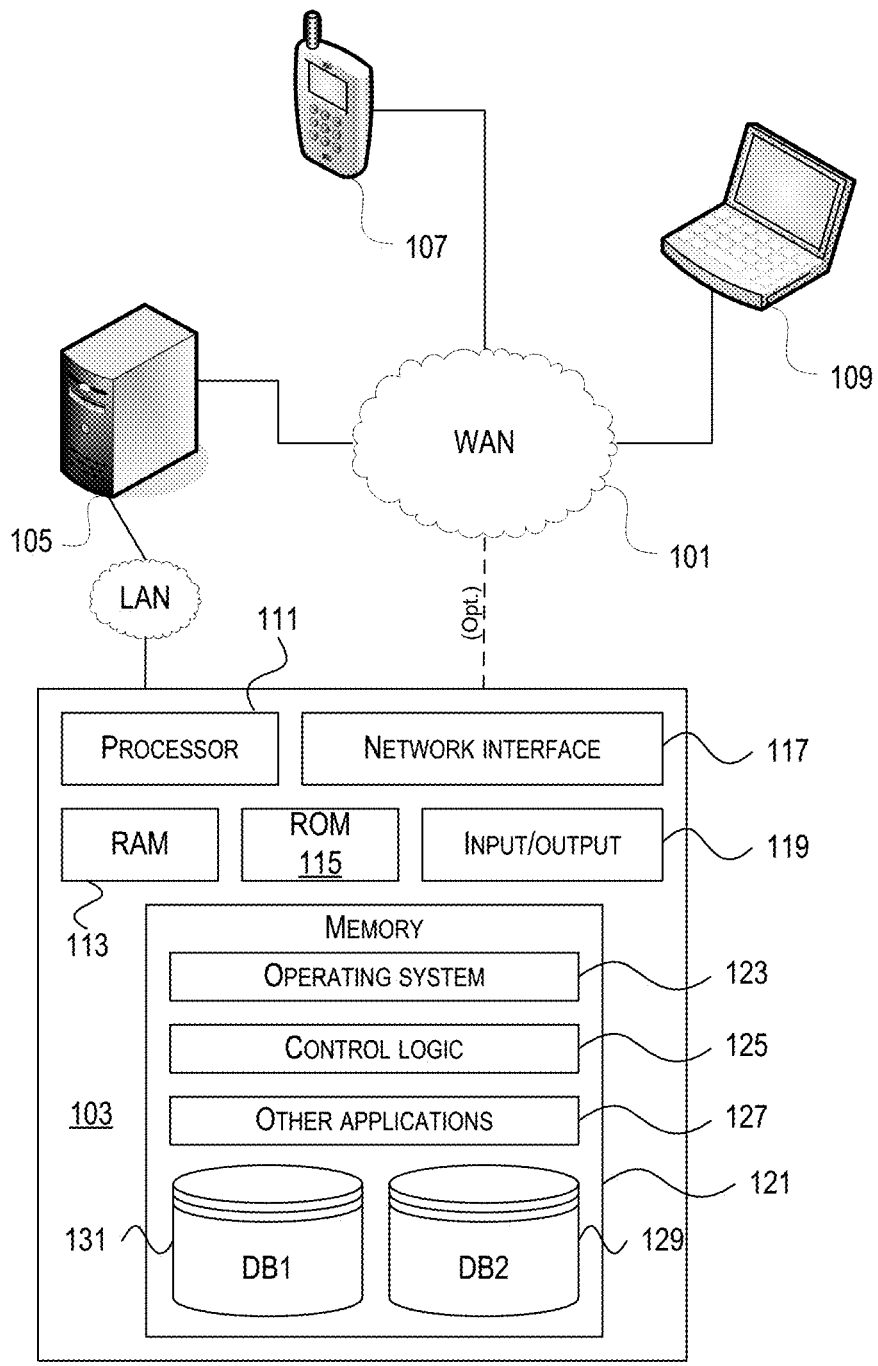
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a system and method for authenticating a client device based on entropy obtained from a server and/or other device, such as a paired device. The system may generate keys, such as cryptographic keys, to unlock data in order to authenticate the client device, application, and/or user of the client device. Data security may be improved because keys generated from server entropy and/or paired device entropy may be stronger than keys generated by a short PIN, such as a 4 digit or 6 digit PIN. During authentication, the client device may receive signed data from the server. The signed data may comprise a time-limited ticket and an encrypted copy of the user's passcode, such as a PIN or a password. An alphanumeric password may provide more entropy than a short numeric PIN. A PIN, on the other hand, may be used more often in government or other regulated environments. A PIN may also be easier to frequently type on a mobile device than a password. For the sake of brevity, a user PIN is described herein for authentication of the user and/or client device. However, a password (or any other passcode) may be used instead of the PIN for authentication.

The time-limited ticket included in the signed data may be valid for a range of hours to days (e.g., 24 hours, 72 hours, etc.). If the current time is within the ticket validity window, a cryptographic key may be used to decrypt the PIN that is stored at the client device. The cryptographic key may comprise key material created on the server. The PIN entered by the user may be compared to the correct PIN to authenticate the user and/or the client device. Keys may also allow the client device to unlock encrypted vaults on the client device that contain additional passwords, certificates, cookies, and other sensitive information.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
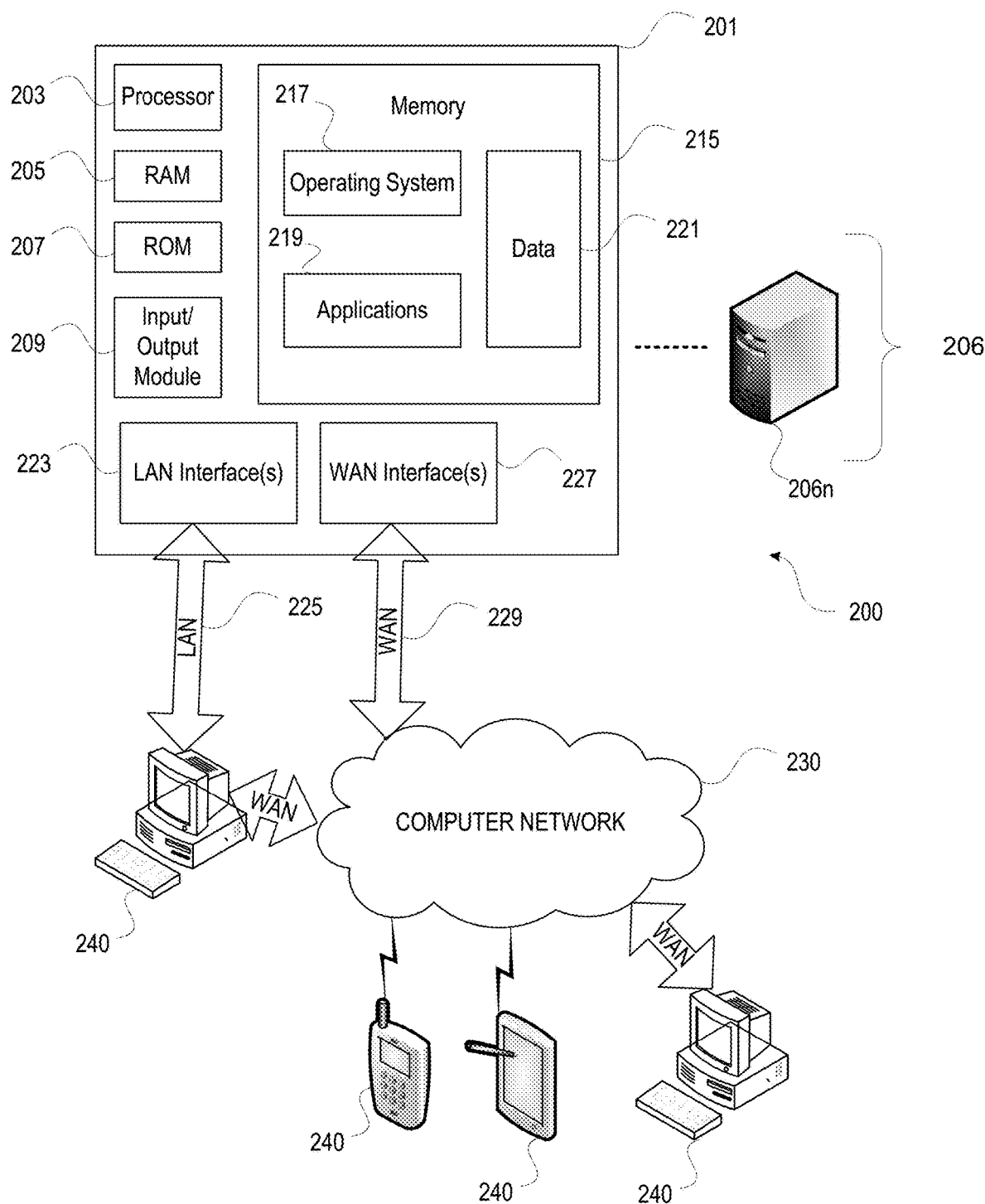
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

Figure 3:
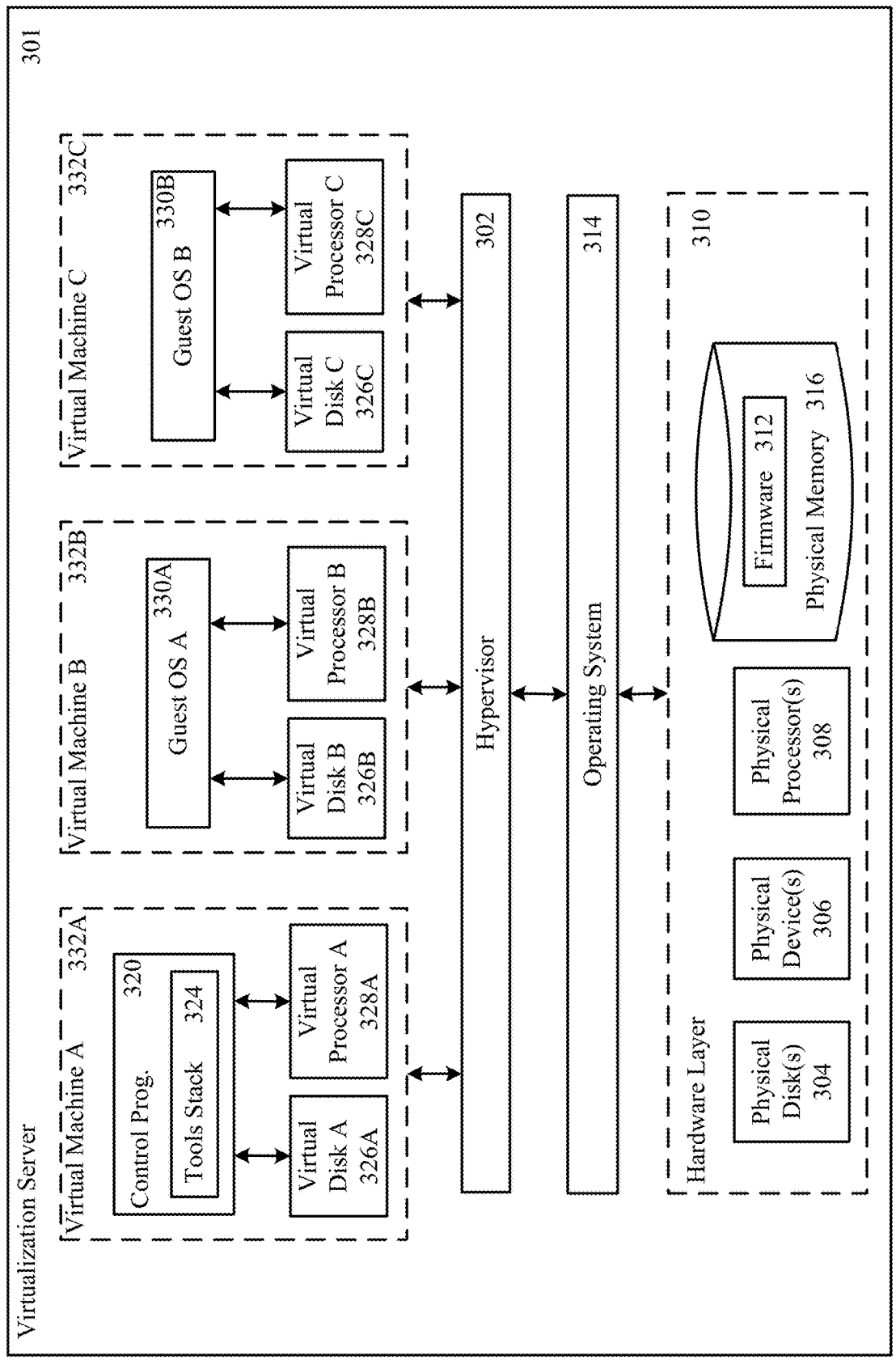
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, California; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
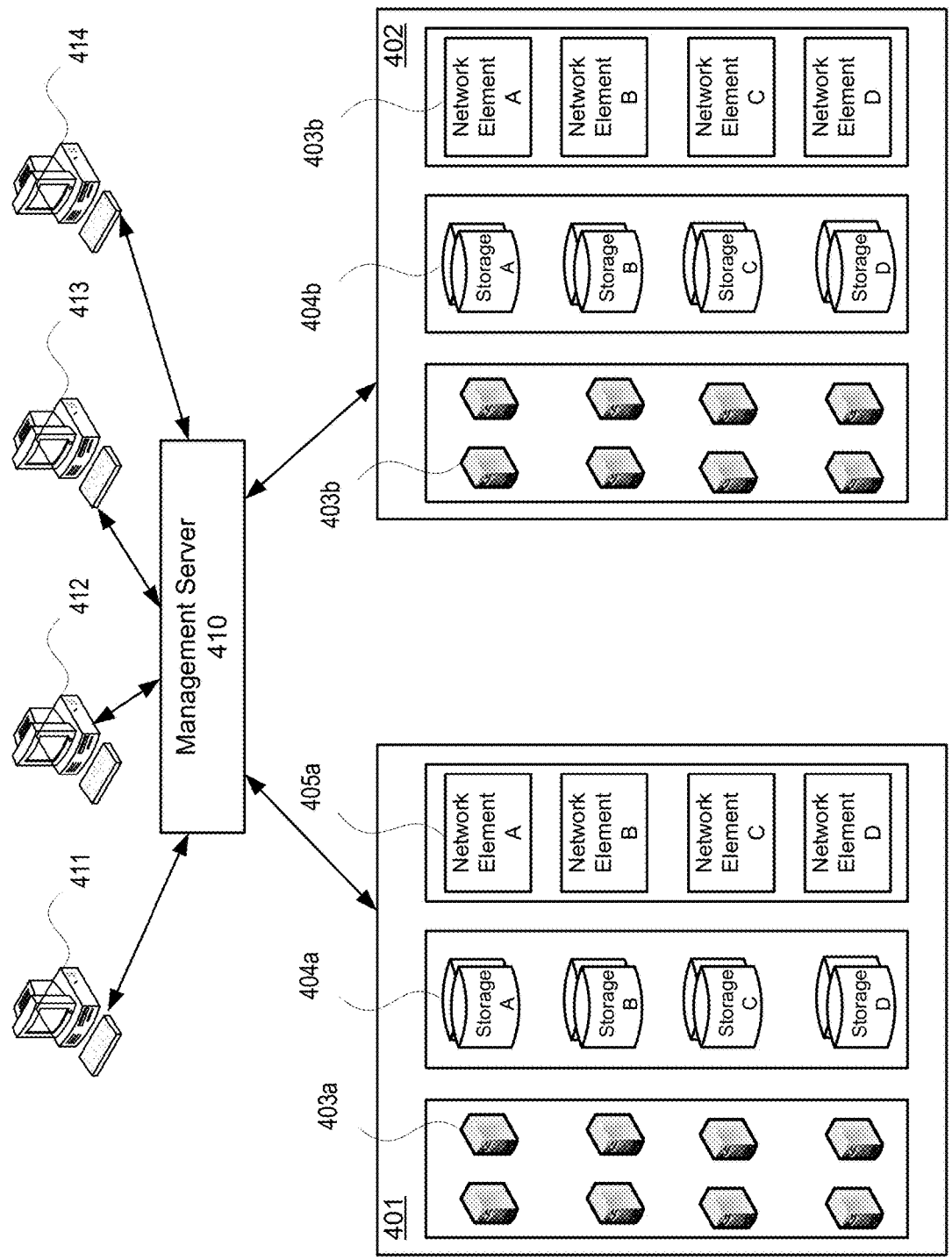
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washhington), IBM BLUE CLOUD (IBM Corporation of Armonk, New York), or others.

Enterprise Mobility Management Architecture

Figure 5:
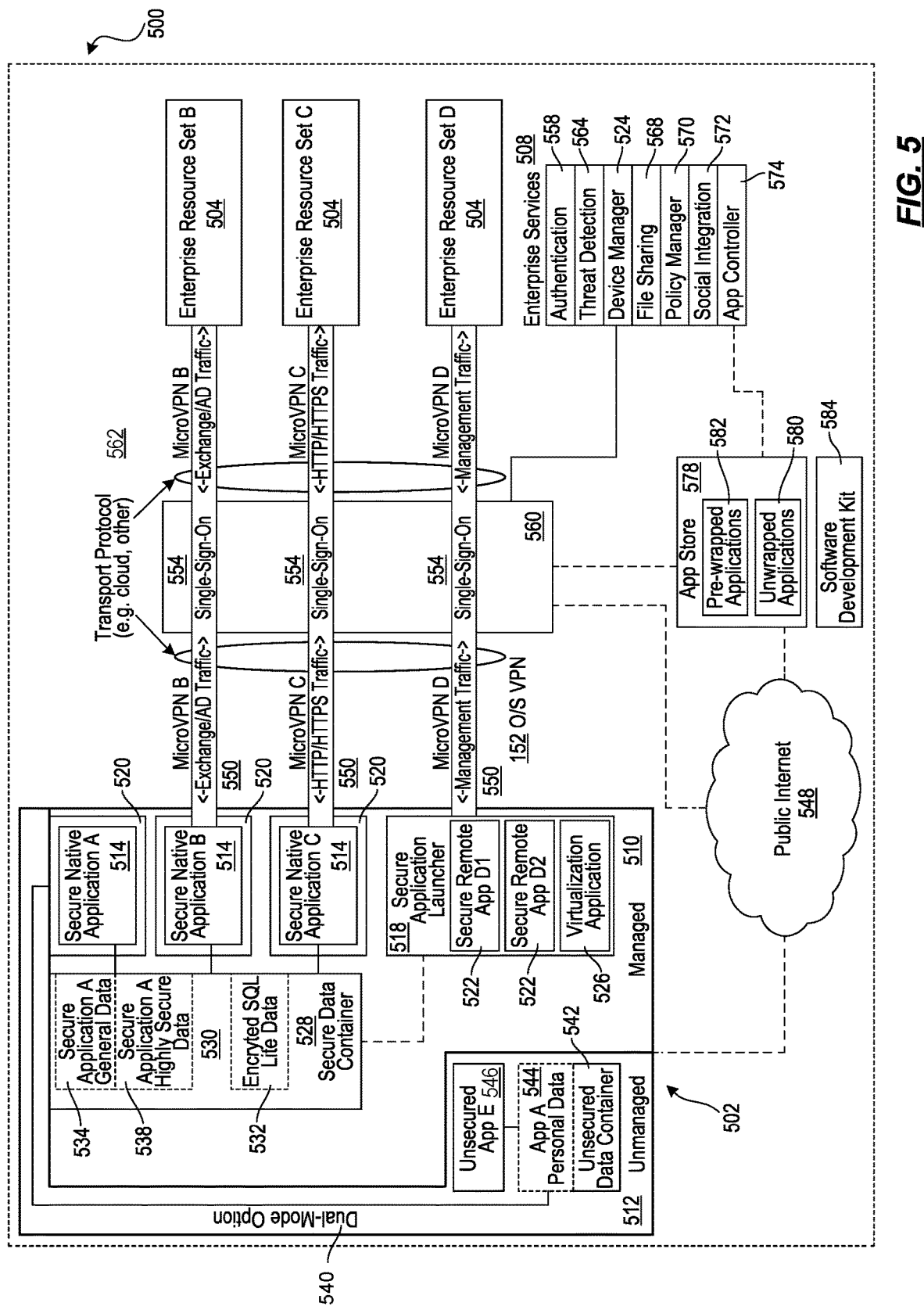
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
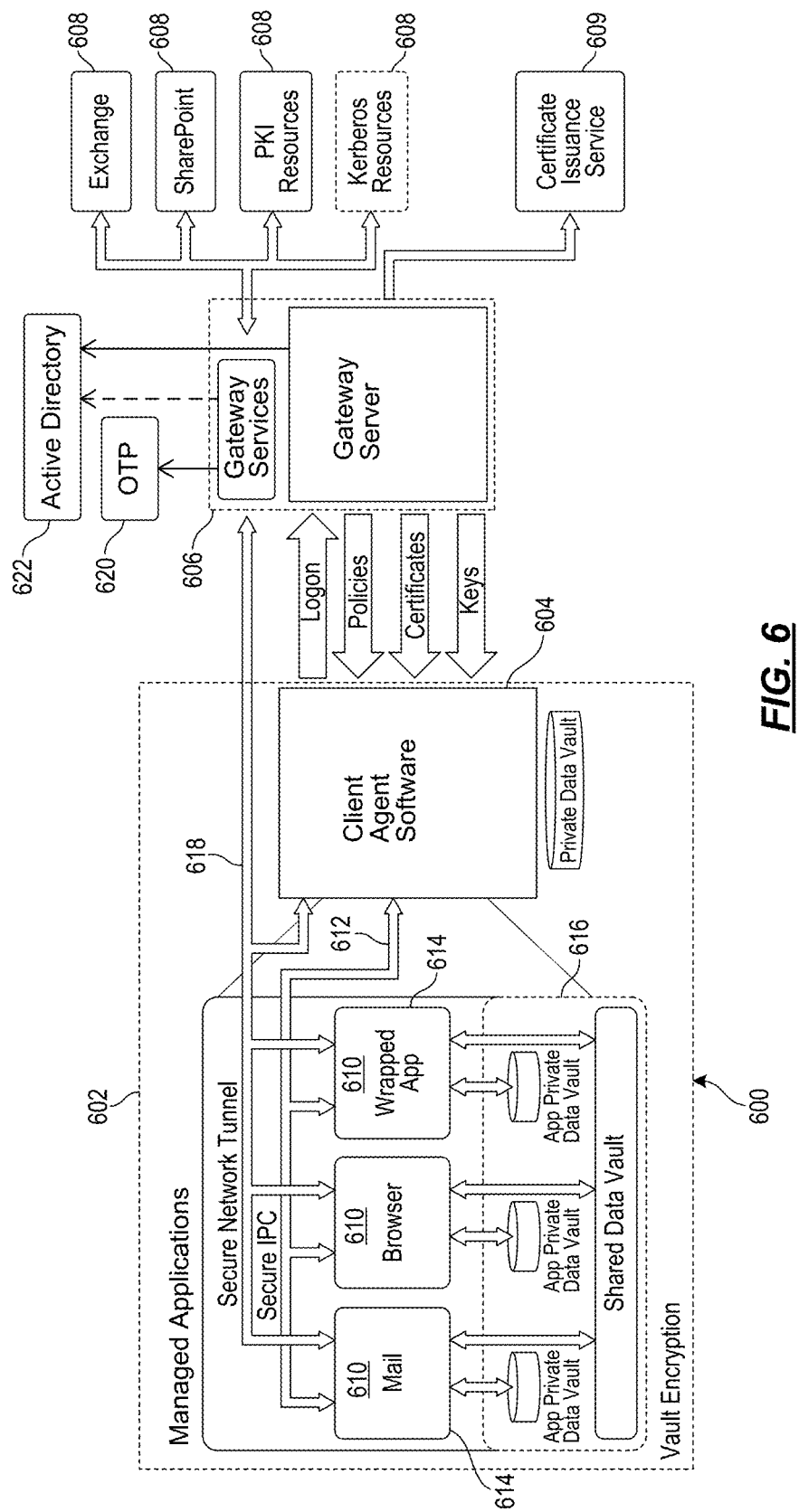
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally, the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Authenticating a Client Device

FIG. 7A illustrates an example method of registering a client device 702 in accordance with one or more illustrative aspects described herein. The client device 702 may comprise any of the client devices previously described, such as terminals 240, client computers 411-414, mobile device 502, or mobile device 602. The client device 702 may also include an application (illustrated as App N), such as the client agent 604 or any other managed and/or trusted application. The server 704 illustrated in FIG. 7A may comprise any of the servers previously described, such as the computing device 201, server 206, virtualization server 301, management server 410, enterprise resources 504, enterprise services 508, access gateway 560, or gateway server 606. The database 706 illustrated in FIG. 7 may comprise any of the databases and/or storage devices previously described. In some aspects, the database 706 may comprise long-term, persistent storage. The database 706 may comprise a device separate from the server 704 or may be integrated in the server 704.

In step 712, the client device 702 may be deployed (e.g., activated) and send a logon request to the server 704. For example, the registration steps illustrated in FIG. 7A may be initiated after an application, such as a mobile application, is installed on the client device 702. To log on, the client device 702 may send user credentials (e.g., username and password, PIN, account number, etc.) to the server 704, and the server 704 may authenticate the client device 702 based on the user credentials. If the client device 702 is logged on in step 712, the method may proceed to step 714.

In step 714, the server 704 may send, to the client device 702, its policies for accessing services provided by the server 704 and a public key of the server 704, such as a cryptographic public key. The client device 702 may receive the public key of the server 704 and store it in memory.

In step 716, the client device 702 may send, to the server 704, a public key of the client device 702, such as a cryptographic public key. In other words, the client device 702 and server 704 may exchange public keys used to decrypt exchanged data. The server 704 may receive and store the received public key.

In steps 718 and 720, credentials, such as a PIN, passcode, biometrics, smartcard credentials, or any other type of credential, may be created for a user of the client device 702. A PIN may be created each time the user desires to create a PIN, whether for the first time or the user changes the PIN.

FIG. 7B illustrates an example method of creating a PIN on the client device 702 in accordance with one or more illustrative aspects described herein. The CreatePin( ) function illustrated in FIG. 7B may also be used to generate an encrypted data blob and to send the encrypted data blob to the server 704, as will be described in further detail below with respect to step 722.

With brief reference back to FIG. 7A, in step 720, the client device 702 may prompt the user to enter a PIN, such as a four or six digit PIN. The user may be prompted to enter the PIN twice in order to confirm the chosen PIN. In step 722, the client device 702 may generate an encrypted data blob to send to the server 704. Returning to FIG. 7B and with reference to element 718B, the data blob may include a user ID (e.g., a username, user account number, etc.) and/or a device ID (e.g., a MAC address, a serial number, an IMEI number, etc.). The data blob may also include a random or pseudorandom number, which is referred to as "salt" in the pseudo code illustrated in FIG. 7B. The random or pseudorandom number may be, for example, 128 bytes long.

With reference to element 718A, the data blob may also include time data, which may be used to generate a time-limited ticket or key, as will be described in further detail in the examples below. In some aspects, the time data may comprise a tick count of a processor of the client device 702. For example, the time data may comprise a maximum tick value (e.g., the value at which the processor tick count will roll over), a conversion of the number of ticks to seconds (e.g., the ticks per second), and the current processor tick count. The client device 702 may use the processor's tick count rather than the device's clock time because the time can easily be modified on some devices and are thus less secure.

In step 722A (and similarly step 722 illustrated in FIG. 7A), the client device 702 may encrypt the data blob, including the user's PIN, the metadata identifying the client device and/or user, and the time data. The data blob may be encrypted using the server's public key. In step 722B, the client device 702 may send the encrypted data blob to the server 704 via TLS, SSL, or any other encryption protocol. The client device 702 may also securely clear from its memory (e.g., scrub or overwrite) the PIN and/or the data blob by calling, for example, the SecureZeroMemory( ) function or any other function to securely remove the PIN and/or the data blob from memory.

With brief reference back to FIG. 7A, in step 724, the server 704 may receive the encrypted data blob from the client device 702. In response to receiving the data, the server 704 may perform various processes on the data. FIG. 7C illustrates an example method of the server 704 receiving the encrypted data and processing it in accordance with one or more illustrative aspects described herein.

In step 724A, the server 704 may retrieve its private key and decrypt the encrypted data blob with the private key to access the data blob. As previously described, the data 724B may include a user ID, a device ID, a PIN, a maximum tick value, a ticks to second ratio, and/or a current processor tick count. In step 724C, the server 704 may store one or more pieces of the information in the database 706. The server 704 may also securely clear from its memory the user's encrypted PIN and/or the server's private key.

Returning to FIG. 7A, in steps 726, 728, 730, and 732, the server 704 may generate a signed expiration ticket for the client device 702. The expiration ticket may comprise static server entropy generated by the server 704 for the client device 702. In step 728, the server 704 may store, in the database 706, the static entropy with additional client device metadata. The metadata may comprise information identifying the client device 702, such as the user ID and/or device ID. The static entropy may be the same for all expiration tickets belonging to a specific client device, such as client device 702. In other words, the server 704 may generate the static entropy once for a particular client device, for the life of the client device. The server 704 may also encrypt and send the static entropy to the client device 702 (not illustrated).

The expiration ticket may also comprise dynamic, time-limited server entropy generated by the server 704 for the client device 702. In step 726, the server 704 may store the dynamic entropy with client metadata in database 706. The time-limited server entropy may change each time a new expiration ticket is created. In some aspects, unlike the static server entropy, the time-limited server entropy is not stored on the client device 702. Instead, it may be fetched from the server 704 (or from a paired device, as described later) and immediately erased by the client device 702 after each use.

The expiration ticket may also comprise a key derivation function (KDF) that uses the PIN, the static entropy, and the dynamic entropy to create cryptographic keys. The cryptographic keys may be used to encrypt the user's PIN and encrypt the static server entropy. In step 730, the server 704 may optionally store additional data in the database 706, including, for example, additional device identifying information such as information identifying the user or owner of the client device 702, the time the client device 702 was registered (e.g., enrolled), and/or additional audit data.

In step 732, the server 704 may generate the signed expiration ticket. FIG. 7D and FIG. 7E illustrate an example method of creating an expiration ticket in accordance with one or more illustrative aspects described herein. The server 704 may call the CreateSigned-expiration-ticket( ) function to generate the ticket. Inputs to this function may include the user ID, the device ID, the PIN, the maximum tick value, the ticks per second, and/or the current tick value.

In some aspects, the CreateSigned-expiration-ticket( ) function may be called each time the client device 702 (or any other client device) requests a signed expiration ticket from the server 704, including after a hard authentication by the client device 702. A hard authentication may comprise verification of a username and password, and optionally a two-factor authentication code. With reference to FIG. 7D, in step 732A, the server 704 may generate a random number using a random number generator. The random number may comprise 64 cryptographically random bytes from a Federal Information Processing Standard Publication Series (FIPS) random number generator module. Other exemplary random number generators that may be used include the Mersenne Twister random number generator and the arc4random random number generator. The server 704 may set the generated random number as the dynamic, time-limited server entropy.

In step 726A (and similarly step 726 illustrated in FIG. 7A), the server 704 may store the time-limited server entropy in the database 706. The entropy may be stored with the user ID, device ID, and/or any other information identifying the client device 702.

In step 732B, the server 704 may request and receive, from the database 706, the static server entropy for the client device 702, which may have previously been generated and stored in the database 706. If, on the other hand, the server determines, in step 732C, that static server entropy for the client device 702 is not stored in the database 706, the server 704, in step 732D, may generate the static entropy. For example, this might be the first time that the client device 702 has requested a signed expiration ticket and static entropy has not yet been generated. In step 728A (and similarly in step 728 illustrated in FIG. 7A), the server 704 may store the static server entropy in the database 706. The entropy may be stored with the user ID, device ID, and/or any other information identifying the client device 702.

In step 732E, the server 704 may generate an encryption key for the static entropy. For example, the server 704 may use a key derivation function (KDF), such as Password-Based Key Derivation Function 2 (PBKDF2). Inputs to the KDF may include the number of KDF rounds to perform (e.g., 100,000 rounds), the PIN, and/or the time-limited server entropy. In other words, the key for the static entropy may be based on the time-limited entropy. The number of rounds of the key derivation function is variable and can be more or less than 100,000 rounds.

FIGS. 7D and 7E illustrate an example where the user is authenticated using a PIN. The static entropy is encrypted by a key generated by inputting both the PIN and time-limited server entropy into the KDF. Thus, the static entropy would be decrypted using a key generated based on both the PIN and time-limited server entropy, as illustrated in the following portion of pseudo code.

key-for-static-entropy=KDF(entered-pin, time-limited-server-entropy)
static-entropy=Decrypt(key-for-static-entropy, encrypted-static-entropy)

In alternative aspects, the user may be authenticated without having to enter a PIN. To create the static entropy without requiring the user to enter a PIN, the server 704 may execute the KDF based on the time-limited server entropy, but not the PIN. Thus, the static entropy would be decrypted using a key generated based on the time-limited server entropy, but not the PIN, as illustrated in the following portion of pseudo code.

key-for-static-entropy=KDF(time-limited-server-entropy)
static-entropy=Decrypt(key-for-static-entropy, encrypted-static-entropy)

There is a security tradeoff between using a PIN and not using a PIN. As will be described in further detail below, additional layers of security may be used in the PIN-less case. For example, the client device 702 may be required to be within communication range of a paired device, such as a mouse, or other device registered with the server 704 in order to authenticate. Returning to the example where the PIN is used (FIG. 7D), the server 704, in step 732F, may generate an encryption key for the user's PIN, such as by using PBKDF2. Exemplary inputs to the KDF for the PIN encryption key may include the number of KDF rounds to perform (e.g., 100,000 rounds), the time-limited server entropy, and/or the static server entropy. Accordingly, the key for the static entropy and the key for the PIN may be different, and encrypted data sent to the client device 702 may consequently be different. Moreover, by using both time-limited entropy and static entropy for the key for the PIN, the input to the KDF may be longer and consequently harder to break. Other examples of KDFs that the server 704 may use to generate keys for the static entropy and/or PIN may include, for example, the Unix crypt( ) function, the bcrypt( ) function, the scrypt( ) function, the HMAC-based Extract-and-Expand Key Derivation Function (HKDF), etc.

In step 732G, the server 704 may encrypt each of the user's PIN and the static entropy using the generated encryption keys. The server 704 may use conventional encryption standards, including for example, the Advanced Encryption Standard. Inputs to the encryption algorithm for encrypting the PIN include the PIN and the encryption key for the PIN.

Inputs to the encryption algorithm for encrypting the static entropy include the static entropy data and the encryption key for the static entropy. The time-limited server entropy and the static entropy previously described may be stored in secure memory, such as in the database 706. The server 704 may also securely clear from its memory the key for the static entropy and the key for the user's PIN.

FIG. 7E illustrates a continuation of the example method of creating the expiration ticket in FIG. 7D in accordance with one or more illustrative aspects described herein. The server 704 may determine whether the expiration time for the time-limited server entropy has expired. In step 732H, the server 704 may determine the current time at the server (e.g., nowTime). In some aspects, the server 704 may use a particular time zone as the base time to avoid time zone issues. For example, the server 704 may use the Greenwich Mean Time (GMT).

The server 704 may also calculate an expiration time, such as the time that a client device PIN validator will expire at the client device. The expiration time may be based on an expiration policy, which may be set by an administrator. The server 704 may input the current time (e.g., nowTime) into the CalculateExpirationTimeFrom( ) function to calculate the expiration time (e.g., expirationTimeSeconds).

In step 732I, the server 704 may calculate the amount of time between the current time and the expiration time of the ticket (e.g., the lifetimeSeconds). If the server 704 uses the client device's tick value (rather than time value), the server 704, in step 732J, may calculate the expiration tick count (e.g., tickEnd). For example, the server 704 may input the lifetimeSeconds value, the tickRollover value, the tickPerSecond value, and the tickNow value into a function used to calculate the expiration tick count. The expiration tick count may comprise the expected tick count at the client device 702 when the ticket expires.

As an example for calculating the expiration tick count (e.g., tickEnd), assume that the lifetimeSeconds value is 50, the tickRollover value is 1000, the tickPerSecond value is 10, and the tickNow value is the current tick value (e.g., TNow). The lifetimeSeconds may be converted to ticks (e.g., 50 lifetimeSeconds×10 tickPerSecond=500 ticks). This example is illustrated in FIG. 65A.

If TNow is less than 500, then step 814D (as will be described below) is true, and tickStart has a lower value than tickEnd, as illustrated in FIG. 65B.

Accordingly, the algorithm determines whether TNow is in between the tick start and tick end values. If not, then TNow is either greater than tickEnd or less than tickStart (e.g., step 814E, as will be described below, is true). On the other hand, if TNow is greater than or equal to 500, TNow will wrap around tickRollover, as illustrated in FIG. 65C.

If there is a wrap around, TNow is still "between" the tickStart and tickEnd values. However, due to the wrap around, TNow is greater than tickStart or less than tickEnd, and step 814F is false, as will be described below. One reason for computing the expiration tick count (rather than using the expiration time value in seconds) is to ensure that the client device 702 cannot simply reset the local time value to artificially increase the time in which a ticket is valid. This security feature may be used because the tick count at the processor of the client device 702 may constantly be increasing until the tick count wraps around to zero (e.g., reaches the maximum tick value or tickRollover).

In step 732K, the server 704 may generate a time-based validator, such as a PIN validator (e.g., timeBasedPinValidator), by encrypting one or more of the information previously described. For example, the server may encrypt the expiration time at the client device 702 when PIN validator expires (in seconds), the tick count at the processor of the client device 702 when the PIN validator expires (and similarly the tick count at the processor of the client device 702 when the PIN validator was created), the encrypted PIN, the encrypted static entropy, and/or the KDF used to generate one or more encryption keys. The time-based PIN validator may be encrypted using the public key of the client device 702. In step 732L, the server 704 may also save one or more of this information to the database 706, in association with a client device identifier, such as the user's ID or the client device's ID.

In step 732M, the server 704 may retrieve the server's private key and sign the time-based PIN validator using the server's private key. The encrypted and signed PIN Validator may be referred to as a signed expiration ticket which may be the PIN validator which consists of the data the client device 702 uses to construct and/or compute the PIN validation function. The CreateSigned-expiration-ticket( ) illustrated in FIGS. 7D and 7E may return the signed expiration ticket to the server 704. Returning to FIG. 7A, the server 704 may send the signed expiration ticket to the client device 702 in step 734 (and similarly in step 734A illustrated in FIG. 7C).

In some aspects, the PIN validator at the client device 702 may check one or more of the client device time and a tick count at the processor of the client device to determine whether the PIN validator has expired. The server 704 may also enforce the expiration time in parallel before the server 704 sends the time-limited server entropy to the client device 702. The purpose of the client device 702 also checking is to avoid unnecessary round-trip communication with the server 704.

Figure 8A:
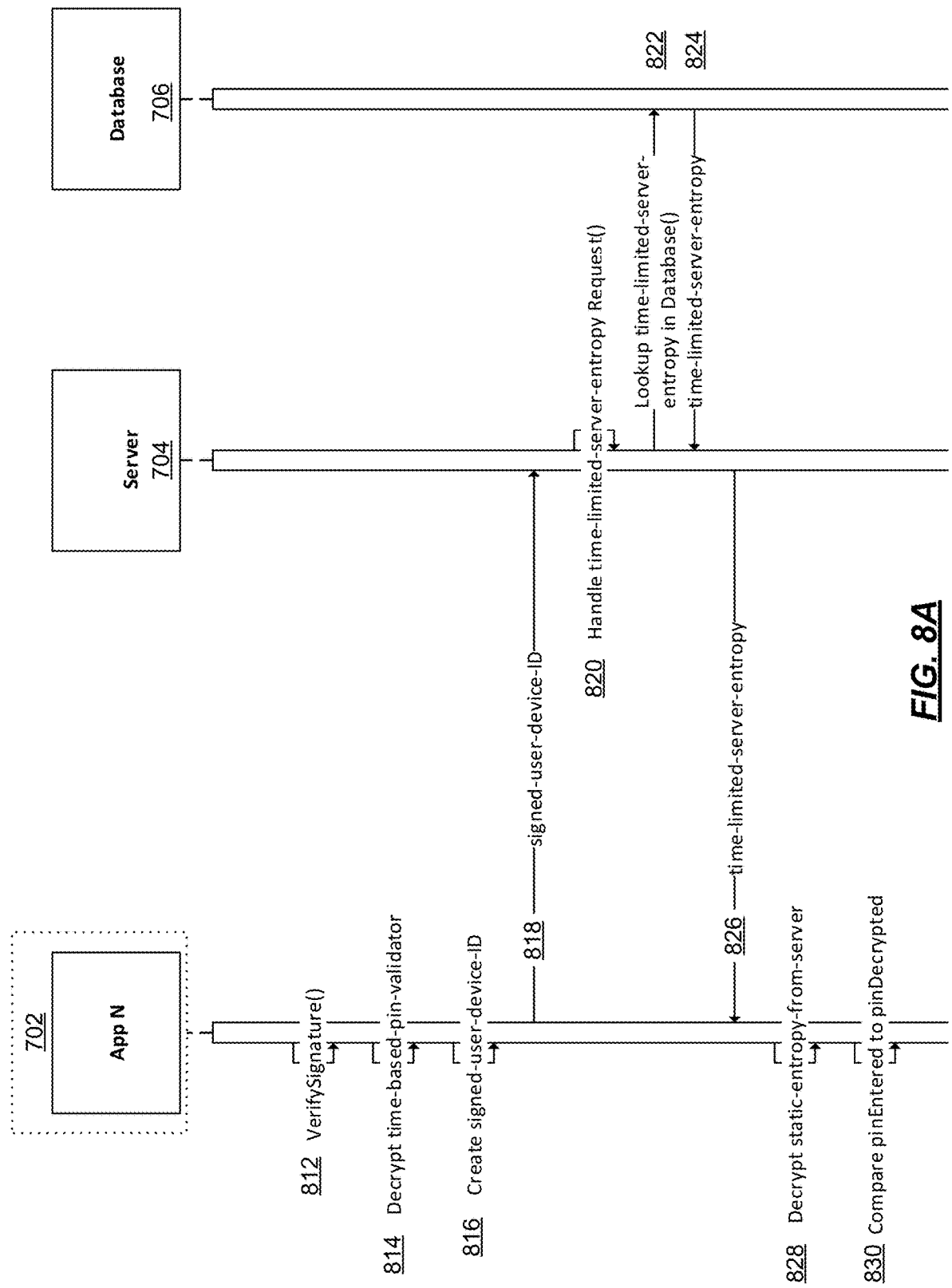
FIG. 8A illustrates an example method of validating a client device identifier in accordance with one or more illustrative aspects described herein.

FIG. 8A illustrates an example method of validating a client device 702 identifier, such as the PIN, in accordance with one or more illustrative aspects described herein. For example, the method may comprise a PIN validation procedure, and PIN validation may occur if the trusted App on the client device 702 authenticates the user of the client device 702 by challenging the user to enter the correct PIN.

In step 812, the client device 702 may verify the signature of the signed expiration ticket in response to receiving the ticket from the server 704. FIG. 8B illustrates an example method of a client device receiving an expiration ticket (and verifying the signature) in accordance with one or more illustrative aspects described herein.

In some aspects, the client device 702 may verify the signature each time the client device 702 performs a hard authentication with the server 704 to obtain a new expiration ticket. In step 812A, the client device 702 may retrieve the server's public key, which may have previously been stored by the client device 702. In step 812B, the client device 702 may verify the signature of the signed expiration ticket using the server's public key. If the signature cannot be verified, the client device 702 may display an error and optionally discard the data. If the expiration ticket's signature is valid, the client device 702 may decrypt the timed-based PIN validator using the client device's private key in step 814 (illustrated in FIG. 8A). The client device 702 may optionally store the signed expiration ticket in step 812C.

FIGS. 8C and 8D illustrate an example method of verifying a PIN in accordance with one or more illustrative aspects described herein. The Receive-signed-expiration-ticket( ) function illustrated in FIG. 8B may be included in the VerifyPin( ) function illustrated in FIG. 8C. The method illustrated in FIGS. 8C and 8D may be used to verify the user's entered PIN on the client device 702 and may be called each time the PIN is to be verified. As will be explained below, if PIN verification is successful, static server entropy may be returned, and the static server entropy may be optionally used (depending on policy) to create one or more keys to unlock one or more secure vaults, such as vaults 616.

With reference to FIG. 8C, in step 812D, the client device 702 may reset (e.g., set to false) the trigger indicating that the entered PIN is correct (e.g., correctPin). The client device 702 may also retrieve the server's public key and the signed expiration ticket. In step 812B, the client device 702 may verify the signature of the signed expiration ticket by calling the VerifySignature( ) function and inputting the server public key, as previously explained. If the signature cannot be verified, the client device 702 may display an error and optionally discard the data. The client device 702 may also instruct the user to perform a hard authentication with the server 704. By verifying the signature of the expiration ticket, the client device 702 may prevent the expiration ticket from being tampered with, such as on a jail broken device. In step 814A (and similarly step 814 illustrated in FIG. 8A), if the expiration ticket's signature is valid, the client device 702 may retrieve the client device's private key and use it to decrypt the expiration ticket to obtain the time-based PIN validator.

Once the client device 702 has access to the time-based PIN validator, the client device 702 may determine whether the expiration ticket has expired. In step 814B, the client device 702 may determine the current device time in seconds (e.g., deviceTimeSeconds) and the current tick count of the client device processor (e.g., tickNow). The client device 702 may also read time or tick data from the expiration ticket, including the tick start count (e.g., tickStart) and/or the tick end count (e.g., tickEnd). The client device 702 may also access the encrypted PIN (e.g., encryptedPin) and/or the encrypted static server entropy (e.g., encrypted-static-entropy).

In step 814C, the client device 702 may determine whether the current device time is greater than or equal to the expiration time. If so, the ticket has expired, and the client device 702 may return an error and instruct the user to perform a hard authentication with the server 704. If not, the client device 702, in step 814D, may determine whether the tick start count is less than the tick end count. If so, the client device 702 may determine, in step 814E, whether (1) the tick end count is less than or equal to the current tick count or (2) the current tick count is less than or equal to the tick start count. In either case (1) or (2), the client device 702 may determine that the tick count has rolled over and accordingly that the ticket has expired. The client device 702 may return an error and instruct the user to perform a hard authentication with the server 704.

With reference to FIG. 8D, if neither case (1) nor case (2) is true, the client device 702 may determine, in step 814F, whether the tick end count is less than or equal to the current tick count and the current tick count is less than or equal to the tick start count. If so, the client device 702 may determine that the tick count has rolled over and accordingly that the ticket has expired. The client device 702 may return an error and instruct the user to perform a hard authentication with the server 704. If either the tick end count is greater than the current tick count or the current tick count is greater than the tick start count, the client device 702 may determine that the ticket has not expired and proceed to step 816 illustrated in FIG. 8A.

In step 816, the client device 702 may create a signed-user-device-ID request. This request may comprise the user's ID and/or the client device ID. In step 818 (and similarly step 818A illustrated in FIG. 8D), the client device 702 may digitally sign the request using the client device's private key and send the signed request to the server 704. In other words, the client device 702 may send a request to the server 704 to fetch the time-limited server entropy for the client device 702. The time-limited server entropy, once received, may be used to decrypt the correct PIN in order to validate the PIN entered by the user. If the client device 702 encounters errors in communicating with the server 704 during the PIN validation process, the client device 702 may instruct the user to perform a hard authentication with the server 704.

In step 820, the server 704 may receive the signed request for the time-limited server entropy. FIG. 8E illustrates an example method of the server 704 handling a client request for time-limited entropy in accordance with one or more illustrative aspects described herein.

In step 820A, the server 704 may compare the current time to the expiration time of the time-limited ticket, which may be stored in the database 706. The time-limited ticket may be identified using the user ID and/or the client device ID. If the current time is greater than or equal to the expiration time of the ticket, the server 704 may determine that the ticket has expired, return an error, and request the user to perform a hard authentication with the server 704 (e.g., using the user's username, password, and optionally two-factor authentication code).

If the ticket has not expired, the server 704, in step 820B, may attempt to validate the digital signature on the request. In particular, the server 704 may obtain the public key of the client device 702 using the user ID and/or the client device ID. If the signature on the request is invalid, the server 704 may return an error and request the user to perform a hard authentication with the server 704. On the other hand, if the signature on the request is valid, the server 704, in step 822A (and similarly step 822 illustrated in FIG. 8A), may request the time-limited server entropy from the database 706.

Returning to FIG. 8A, in step 824, the database 706 may return the time-limited server entropy to the server 704. In step 826 (and similarly step 826A illustrated in FIG. 8E), the server 704 may encrypt the entropy using the client device's public key and send the time-limited entropy to the client device 702. For example, the time-limited entropy may be secured using TLS or SSL.

In another example, the client device 702 may store (e.g., cache) the time-limited server entropy. Caching may be allowed based on policy configuration as a trade-off between security and usability. If the client device 702 caches the time-limited server entropy, then PIN validation could be performed offline (e.g., without connectivity to the server 704). The cache expiration time may be determined based on a fixed time period, a client application lifetime, and/or a period of user inactivity. The cached time-limited server entropy may be encrypted with the public key of the client device 702, as it was received from the server 704. Additionally or alternatively, the cached time-limited server entropy may be encrypted with a user credential, such as the PIN. In these examples, the client device 702 may fetch the cached time-limited server entropy in response to receiving the user credential, rather than sending a request for the time-limited server entropy to the server 704.

In step 828, the client device 702 may decrypt the received time-limited server entropy using the client device's private key. For example and with reference to FIG. 8D, in step 828A, the client device 702 may use the time-limited server entropy and the entered PIN to derive a cryptographic key for the static entropy using a key derivation function, such as PBKDF2. The client device 702 may input the number of KDF rounds (e.g., 100,000), the PIN entered by the user, and the time-limited server entropy received from the server 704 into the PBKDF2( ) function illustrated in FIG. 8D. In step 828B, the client device 702 may use the key to decrypt the static entropy previously received as part of the PIN Validator from the server 704. As previously explained, the static server entropy may have been encrypted using the time-limited server entropy and may be accessed by the client device 702 if the expiration time has not been reached. In step 828C, the client device 702 may use the static entropy and the time-limited entropy to derive another cryptographic key, e.g., a key used to unlock the PIN, using a KDF. For example, the key derivation function for determining the key for the PIN may also comprise the PBKDF2( ) function. In step 828D, the client device 702 may use the derived key for the PIN to decrypt the encrypted PIN.

In step 830A (and similarly step 830 illustrated in FIG. 8A), the client device 702 may compare the decrypted PIN with the PIN entered by the user. If the PINs do not match, the client device 702 may prompt the user to reenter the user's PIN. The procedure may be repeated, and key material may be scrubbed from the client device's memory. For example, the client device 702 may call again the VerifyPin( ) function illustrated in in FIGS. 8C and 8D. The client device 702 and/or server 704 may count the number of retries performed by the user. If the number of retries exceeds a threshold, the client device 702 and/or server 704 may request the user to perform a hard authentication. If, on the other hand, the PINs match, the client device 702 may use the static entropy to decrypt additional keys and/or cryptographic vaults (e.g., vaults 616) on the client device 702. The vaults may comprise additional sensitive data, such as additional authentication keys, passwords, cookies, session tickets, inactivity timers, and other data protected by managed applications.

The foregoing validation processes have several security properties that may be beneficial if the user's client device 702 is stolen or misplaced. Sensitive data stored in the vault(s) cannot be decrypted and accessed because the time-limited server entropy might not be written to memory of the client device 702 and may be scrubbed from memory after each use. Accordingly, a thief is not able to recover the key for the static entropy, which is encrypted using the time-limited server entropy. Furthermore, the static entropy might not be written to memory of the client device 702 in clear. Rather, the static entropy may be encrypted with keys derived from the PIN and/or the time-limited server entropy. Accordingly, the encrypted static server entropy may be safely stored in either program memory or on a disk of the client device 702. The encryption keys, on the other hand, might not be stored on the disk and might be temporarily stored in program memory of the client device 702 and cleared from the memory after use. Thus, if the client device 702 is stolen, and the device's disk is read, the key to decrypt the vault(s) cannot be found in memory. Moreover, the KDF is configurable and may be modified, strengthened, or changed over time. The KDF may be configured so that the time-limited server entropy is valid for less than the expected time for a thief to run a brute force attack on the KDF function, using the data that could be recovered from a stolen client device 702. Moreover, users' PINs might not be stored in a recoverable form on the server 704. Thus, an attacker who breaks into the server 704 cannot read users' PINs.

In the examples illustrated in FIGS. 7 and 8, the client device 702 obtains the time-limited server entropy from the server 704 in order to access vault keys. In these examples, the client device 702 would have to be connected to the server 704 (e.g., via the Internet), whenever the user desires to authenticate with the user's PIN. As will be described below, users may alternatively authenticate using an authentication proxy, such as a paired device, if the client device 702 cannot connect to the server 704. Accordingly, users may use software in a protected vault even if Internet connectivity is not available.

Figure 9:
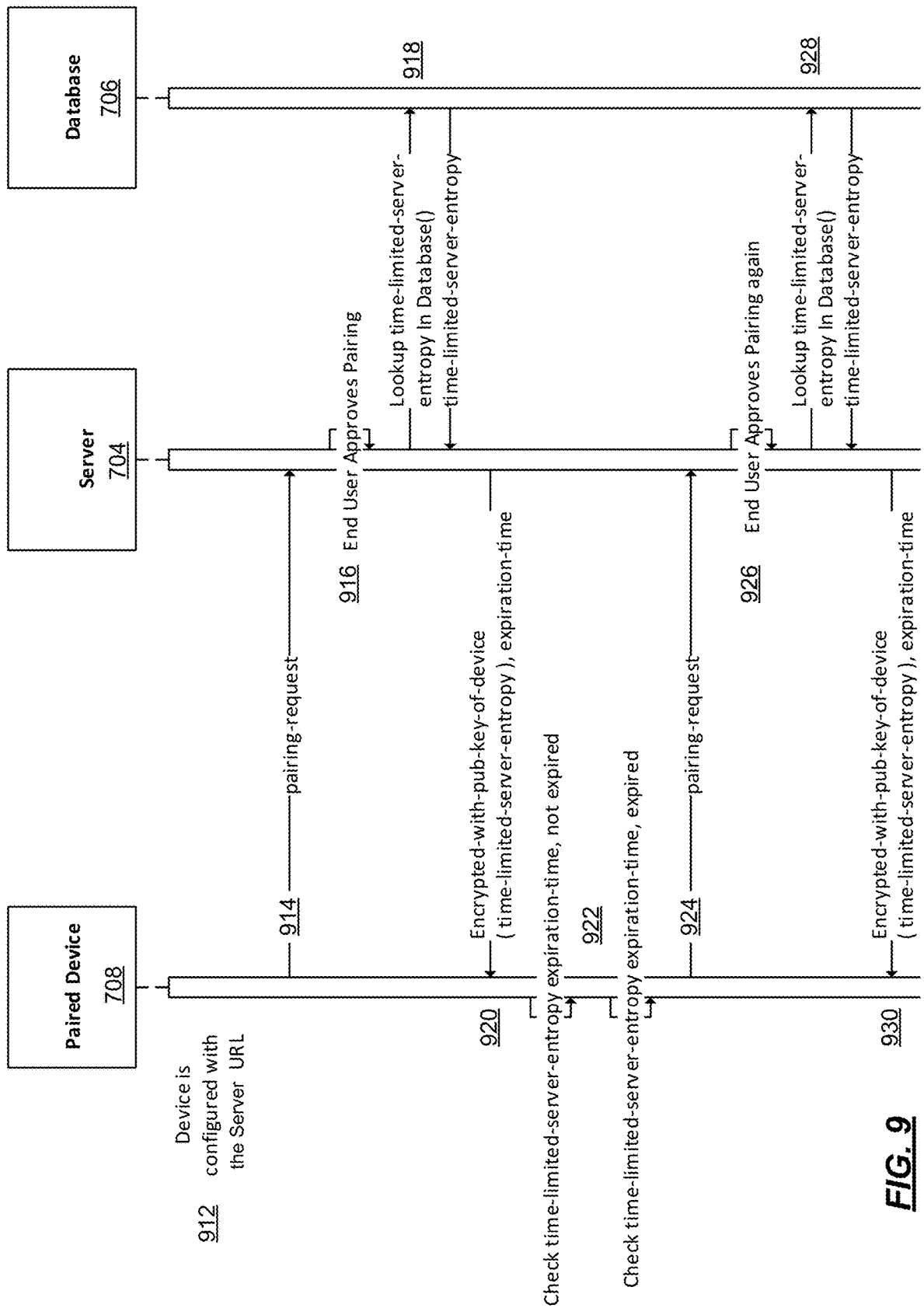
FIG. 9 illustrates an example method of registering a paired device in accordance with one or more illustrative aspects described herein.

FIG. 9 illustrates an example method of registering a paired device 708 for authenticating the client device 702 in accordance with one or more illustrative aspects described herein. As will be described below, the paired device 708 may be used to authenticate the client device 702 if the server 704 is not available. As such, the paired device 708 may serve as a proxy for the server 704. The paired device 708 may comprise any device that can be registered and/or authenticated with the server 704. In some aspects, the paired device 708 may be paired with another device, such as the client device 702, and/or with a particular user, such as the user of the client device 702. Exemplary paired devices 708 may include a mouse (e.g., the CITRIX Mouse), a smart watch, a mobile phone, a laptop computer, a desktop computer, etc. In some aspects, the paired device 708 may be wirelessly connected, such as wirelessly paired via Bluetooth, near-field communication (NFC), or Wi-Fi, or wiredly connected, such as USB, to the client device 702. The paired device 708 may also include local programmable storage.

In step 912, the device 708 may be configured with the URL of the server 704. For example, the user may manually type the server URL. Alternatively, the user may click on a URL provided in an email from a server administrator. Optionally, the user may type in a One Time Password (OTP) provided by the administrator. Alternatively, the user may click on a URL provided in an email from the administrator. The URL may contain a token, which may have been associated and pre-approved by the administrator for a specific device and user. For other devices, such as a paired mouse or smartwatch, there may be a companion application that the user may run to configure his or her device with the server URL. In the case of the mouse, the companion application may run on a paired device 708 and proxy the communication with the server 704.

In step 914, the device 708 may send a pairing request to the server 704. The pairing request may include information identifying the device 708 (e.g., make and model, MAC address, serial number, IP address, etc.) and information identifying the client device 702 and/or a user of the client device 702 (e.g., username, account number, etc.). The request may also include an OTP.

In step 916, the server 704 may receive the pairing request and request that the client device 702 and/or user approve the pairing request. For example, the server 704 may identify the client device 702 based on the information included in the pairing request and send an approval request to an application installed on the client device 702 or other device associated with the user, such as a different client device. If the user approves the pairing request, the client device 702 or other device may respond to the server's approval request. In some aspects, the pairing may be approved without user input. For example, the pairing request may include the user credentials (e.g., PIN, password, etc.), OTP, token, etc. Information from the BT or NFC connection between the client device 702 and the paired device 708 may also be used to automatically approve the request. A QR code may also be used to approve the request. For example, the server 704 may generate a QR code associated with the device 708 and to be displayed on the client device 702. The device 708 could then scan the QR code displayed on the client device 702 using, for example, a camera. The device 708 could then send the scanned QR code back to the server 704, thus completing the pairing request.

In step 918, the server 704 may look up or otherwise retrieve the time-limited server entropy from the database 706 in response to the device 708 being approved for pairing. In step 920, the server 704 may determine the expiration time of the time-limited server entropy. The server may also encrypt the time-limited server entropy with the public key of the client device 702. The server 704 may send the time-limited server entropy and the expiration time of the time-limited server entropy to the paired device 708. In some aspects, the time-limited server entropy may be encrypted, whereas the expiration time might not be encrypted. Because the time-limited server entropy is encrypted with the public key of the client device 702, the paired device 708 might not be able to read the time-limited server entropy. The expiration time, on the other hand, may be sent in clear (e.g., without encryption using the client device's key, but optionally signed by the server 704) so that the paired device 708 can read the expiration time.

The paired device 708 may locally store the encrypted time-limited server entropy and the expiration time, for future use by the client device 702. The paired device 708 may wait for a request from the client device 702 (or another device) to use the time-limited server entropy. The client device 702 accessing the time-limited server entropy stored on the paired device 708 will be described in further detail below with reference to FIGS. 10 and 11.

In step 922, the paired device may check (e.g., periodically or occasionally) whether the time-limited server entropy has expired by comparing the current time to the expiration time. If the time-limited server entropy has not expired, the paired device 708 may continue to wait for a request from the client device 702 to use the time-limited server entropy. If the time-limited server entropy has expired, the paired device 708 may again request the time-limited server entropy from the server 704 in step 924. In step 926, the server 704 may optionally obtain an approval from the user to provide the paired device 708 with the time-limited server entropy. The server 704 can be configured to request user approval for each pairing request, for the first pairing request, or via a configurable frequency (e.g., every other pairing request, every fourth pairing request, etc.).

In step 928, the server 704 may access the time-limited server entropy from the database 706. In step 930, the server 704 may determine the new expiration time of the time-limited server entropy, such as via a server (administrative) policy. The paired device 708 may query the server 704 once the expiration time of the current time-limited server entropy is reached. The server 704 may also encrypt the time-limited server entropy with the public key of the client device 702 and send the encrypted entropy and the new expiration time to the paired device 708. The paired device 708 may store the time-limited server entropy for future use by the client device 702. As previously explained, the paired device 708 may periodically or occasionally check whether the time-limited server entropy has expired.

Figure 10:
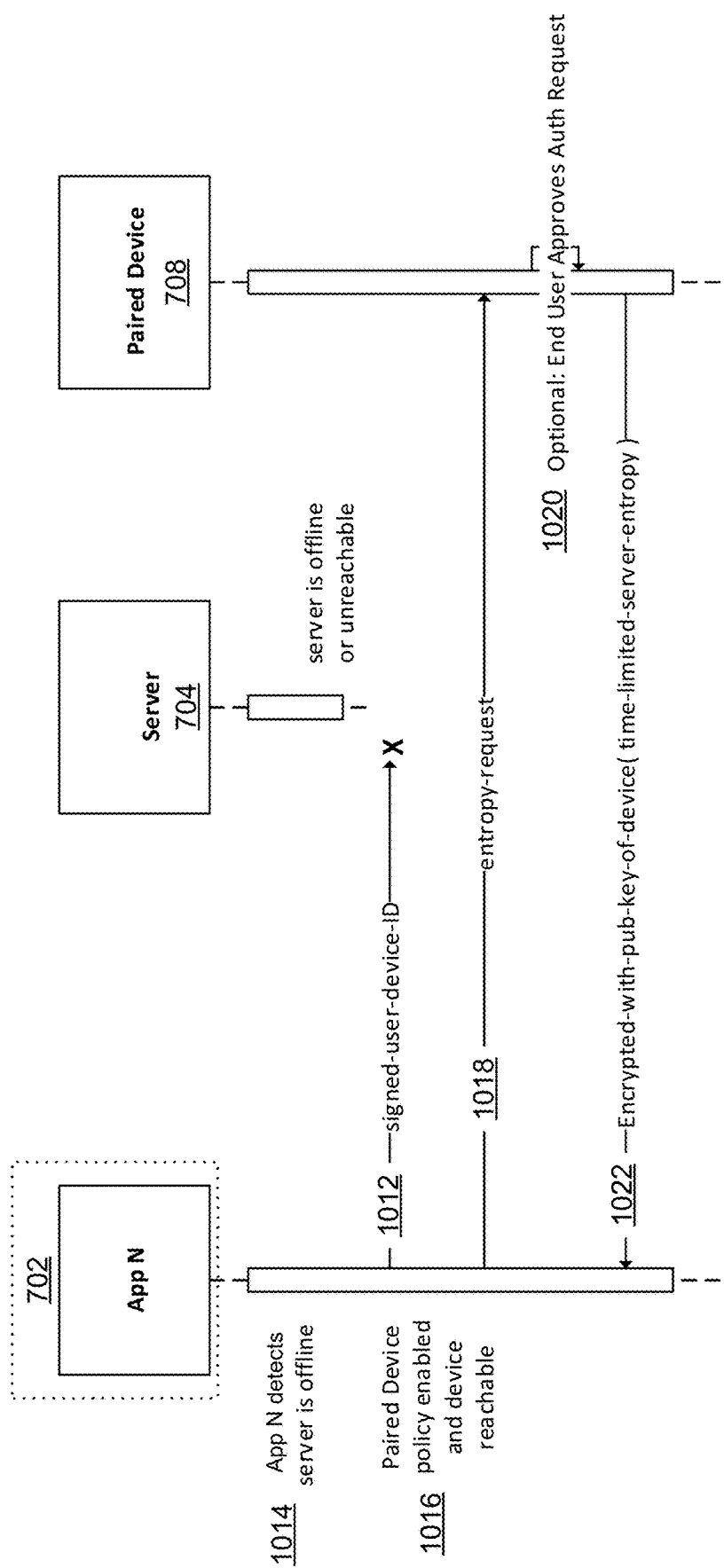
FIG. 10 illustrates an example method of authenticating a client device using a paired device in accordance with one or more illustrative aspects described herein.

FIG. 10 illustrates an example method of authenticating a client device 702 using a paired device 708 in accordance with one or more illustrative aspects described herein. In step 1012 (and similar to step 818), the client device 702 may attempt to send a request to the server 704 for the time-limited server entropy. However, the client device 702 might not receive a response to the request from the server 704 and determine, in step 1014, that the server 704 is offline or otherwise unreachable (e.g., a connection between the client device 702 and the server 704 cannot be established).

In response to determining that the server 704 is offline or otherwise unreachable, the client device 702, in step 1016, may determine whether another device, such a local device and/or a device connected to the client device 702, is reachable and/or has the time-limited server entropy. Alternatively, the client device 702 may attempt to obtain the time-limited entropy from the paired device 708 without first determining that the entropy cannot be obtained from the server 704. If the client device 702 identifies the paired device 708, the client device 702 may send, in step 1018, a request for the time-limited server entropy to the paired device 708. In step 1020, the paired device 708 may optionally receive, from the user, approval of the request for the time-limited server entropy. For example, the user may approve the request by pressing a physical or touchscreen button on the paired device 708, entering credentials for signing on to the server 704, paired device 708, and/or the client device 702, or providing other input indicating approval. Once approved, the paired device 708, in step 1022, may send the time-limited server entropy to the client device 702. As previously explained, the time-limited server entropy may be encrypted with the public key of the client device 702, and the paired device 708 might not have access to the entropy because it does not have the corresponding private key to decrypt the entropy. In other words, the paired device 708 may pass along an encrypted opaque value that the paired device 708 cannot itself interpret, read, and/or decrypt.

As previously explained with reference to FIG. 8A, the client device 702 may decrypt the encrypted time-limited server entropy and use it to decrypt the static entropy, similar to step 828 illustrated in FIG. 8A. The client device 702 may further decrypt the encrypted PIN stored at the client device 702 and compare the PIN to the PIN entered by the user, similar to step 830 illustrated in FIG. 8A. If the PINs match, the client device 702 may be granted access to additional sensitive data, such as data held in a vault at the client device 702.

Authentication without using a PIN was previously described with reference to FIGS. 7A, 7D, and 7E. Like PIN-less authentication using the server 704, PIN-less authentication may also be used when authenticating the client device 702 using the paired device 708. For example, the key for the static entropy may be generated using the time-limited server entropy, but not a PIN. Accordingly, the client device 702 may decrypt the static entropy using the time-limited server entropy received from the paired device 708, but not the PIN.

There is a security tradeoff between using a PIN and not using a PIN. A thief may be able to decrypt secure vaults without knowing the user's PIN. However, the paired device 708 may add additional layers of security in the PIN-less case (and similarly in the case using a PIN). For example, a thief that steals the client device 702 would not be able to access the time-limited entropy stored in the paired device 708 if the client device 702 is outside the communication range of the paired device 708. Accordingly, local communication network protocols having shorter communication ranges, such as Bluetooth or NFC, may be used for added security. The thief would have to steal both the client device 702 and the paired device 708 in order to decrypt the secured vaults. Moreover, the application policies can define the period of time a client device 702 may be able to fetch the time-limited server entropy from the paired device 708 and how long the entropy can be used.

Aspects described herein may be used for single sign-on (SSO) of the user over multiple devices. In other words, the data stored in encrypted vaults of a first device may be shared with other devices in the user's control. This allows the user to seamlessly roam between devices and not have to re-authenticate connections and applications when switching from one device to another.

Figure 11:
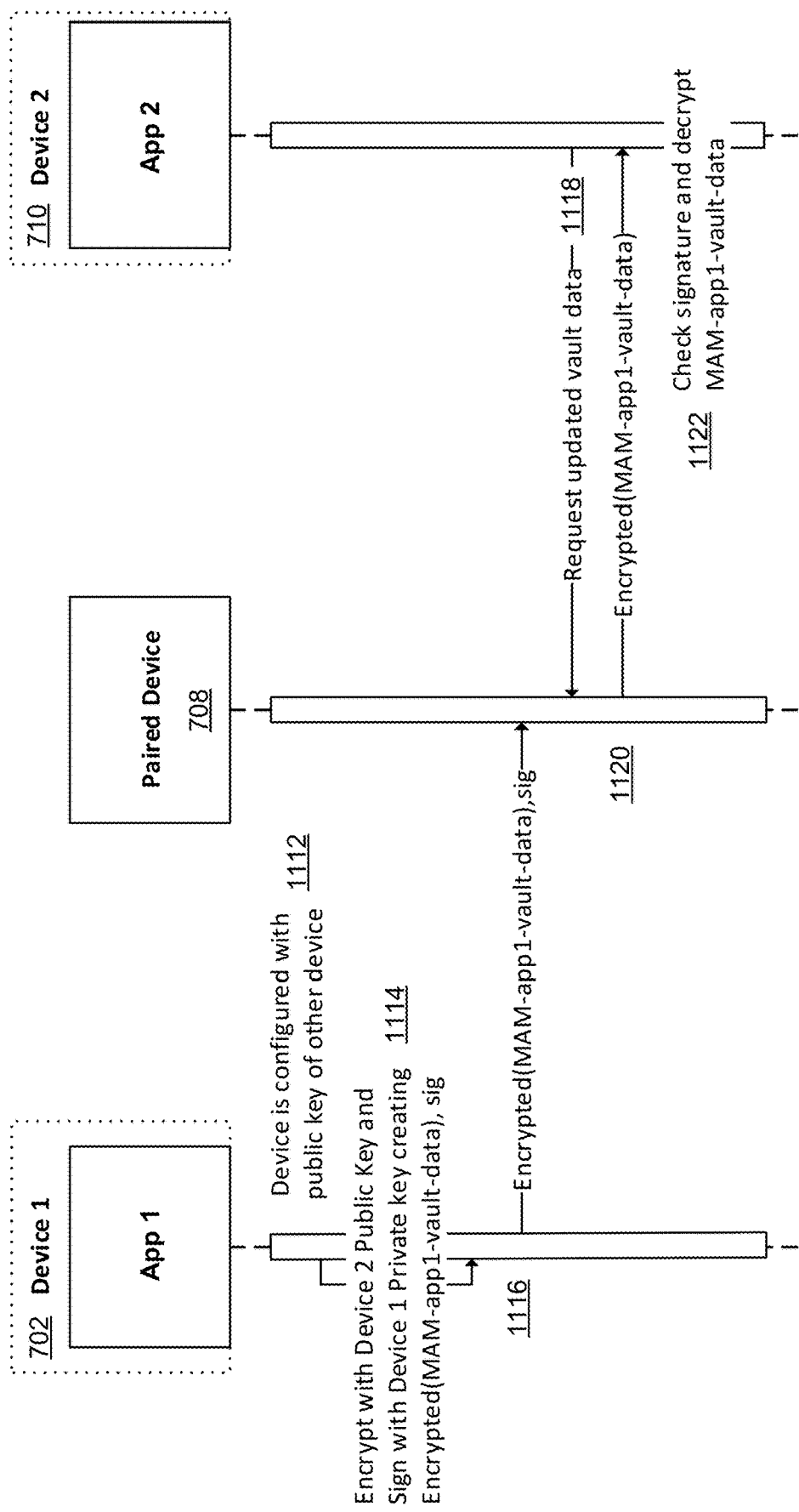
FIG. 11 illustrates an example method of a first device sharing sensitive data with a second device via a paired device in accordance with one or more illustrative aspects described herein.
Figure 12:
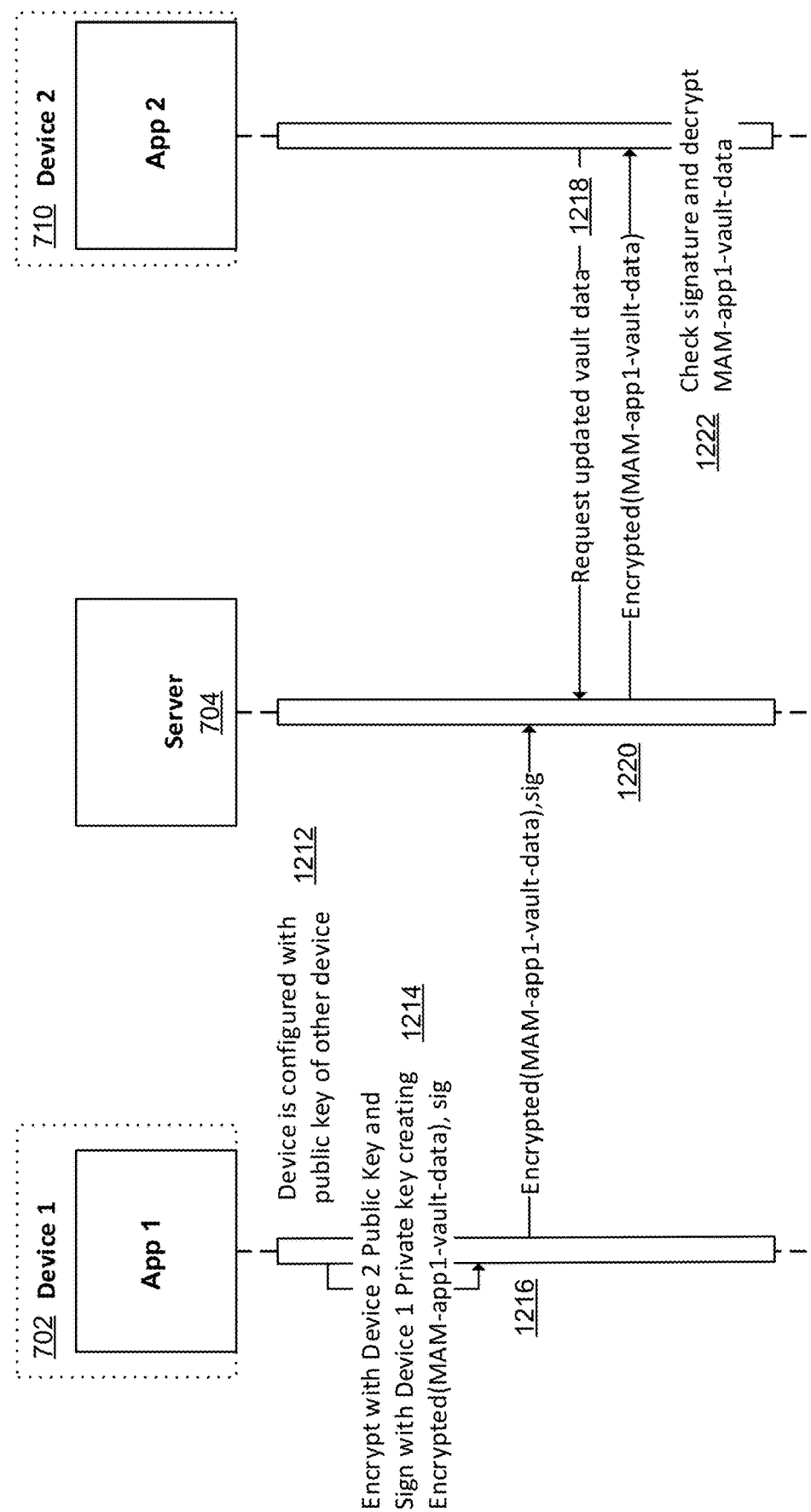
FIG. 12 illustrates an example method of a first device sharing sensitive data with a second device via a server in accordance with one or more illustrative aspects described herein.

FIG. 11 illustrates an example method of a first device 702 sharing sensitive data with a second device 710 via a paired device 708 in accordance with one or more illustrative aspects described herein. FIG. 12 illustrates an example method of the first device 702 sharing sensitive data with the second device 710 via a server 704 in accordance with one or more illustrative aspects described herein. In some aspects, the first device 702 may share sensitive data with the second device 710 via the paired device 708 if the first or second device determine that the server 704 is unavailable (e.g., the connection between the first device 702 and the server 704 and/or the connection between the second device 710 and the server 704 cannot be established). In other aspects, sensitive data may be shared via the paired device 708 without first making a determination that the server 704 is unavailable. FIGS. 11 and 12 will now be described together.

The application on the first device 702 may provide a way for the user of the first device 702 to access resources on the server 704, such as browsing corporate intranet resources using a web browser. The first device 702 may access these resources via a VPN connection, such as MicroVPN connection, to the server 704. In some aspects, the server 704 may act as a proxy allowing the web browser to access intranet resources via HTTP or HTTPS. As previously explained, the first device 702 may have vaults 616 that store sensitive data, such as authentication tickets or cookies used by the first device 702 to connect to a VPN endpoint. The vault may be encrypted by a vault encryption key that is derived from static entropy. In some aspects, accessing VPN authentication tickets may require full authentication using, for example, the user's username, password, and optionally a two-factor authentication code. From a user experience perspective, it would be advantageous to allow VPN authentication tickets to follow a user as the user switches from one device to another device.

As a brief example, assume that a managed application browser is opened on a small screen device such as a phone, and the user is reading a long document available via the intranet (e.g., at http://internal.company.tld/). The user may want to switch from the small screen device to a larger screen device, such as a tablet, to better read the document. Single sign-on to the tablet may be achieved if the VPN authentication tickets stored at the phone follow the user from the phone to the tablet. This would allow the user to instantly open the managed application browser without having to enter full authentication credentials. Inactivity timers at the phone may also follow the user to the tablet because the user is still active on the managed application.

With reference to FIGS. 11 and 12, data (e.g., VPN authentication tickets, inactivity timer, and/or other sensitive data) can be shared between two managed applications, such as App 1 on the first device 702 and App 2 on the second device 710 in two different ways. In FIG. 11, the data may be shared via the paired device 708. In this scenario, the server 704 need not be online or available for data to be shared. In some aspects, both the first device 702 and second device 710 may communicate with the paired device 708 via a short range communication protocol, such as Bluetooth, NFC, or Wi-Fi, or may be wiredly connected over USB. Alternatively and in FIG. 12, the data may be shared via the server 704.

In steps 1112 and 1212, the first device 702 may be configured with the public key of the second device 710. For example, the second device 710 may send its public key to the first device 702 directly or through a proxy, such as the paired device 708 or the server 704. Similarly, the second device 710 may be configured with the public key of the first device 702.

In steps 1114 and 1214, the first device 702 may encrypt the sensitive data (e.g., VPN authentication tickets, inactivity timer, and/or other sensitive data). The first device 702 may encrypt the data with the public key of the second device 710. The first device 702 may also sign the data with its private key. In steps 1116 and 1216, the first device 702 may send the encrypted data to the paired device 708 (FIG. 11) or the server 704 (FIG. 12). The VPN authentication tickets may be sent (e.g., shared with the paired device 708) once available in the first device 702. Alternatively, if polling is supported, the encrypted tickets may be sent on demand, and a policy may be in place to control that functionality. The paired device 708 or server 704 may verify the signature of the first device 702 and store the encrypted data locally or in a database, such as the database 706 in the case of the server 704 acting as the proxy for data transfer.

In steps 1118 and 1218, the second device 710 may request the sensitive vault data from the paired device 708 (FIG. 11) or the server 704 (FIG. 12). For example, the user may pick up the second device 710 and access the managed application, App 2, which may be the same or similar managed application as App 1 on the first device 702. The user may optionally sign on to the second device 710, such as by entering a PIN, password, or other credentials. The second device 710 may validate the credentials entered by the user.

In steps 1120 and 1220, the paired device 708 (FIG. 11) or the server 704 (FIG. 12) may send the encrypted vault data to the second device 710. As explained above, the data may be encrypted with the public key of the second device 710. In steps 1122 and 1222, the second device 710 may receive the encrypted data. The second device 710 may decrypt the data using its private key. The second device 710 may also sign a hash of the encrypted data with its private key. After the data is decrypted, the second device 710 may use the data to access one or more resources, such as corporate intranet resources via a VPN connection. As previously explained, the inactivity timer may continue running and may be included with the data sent to the second device 710. Alternatively, the second device 710 may initiate a new inactivity timer for the application.

In the foregoing examples, the server 704 acts as a source of entropy for the static entropy and time-limited entropy used by the client device 702. In alternative aspects, the system may use the paired device 708 as an additional source of entropy. With reference to FIG. 7A (e.g., at or about step 726), the paired device 708 may generate time-limited paired device entropy and send the entropy to the server 704. The paired device 708 may send the entropy directly to the server 704 or through a proxy, such as the client device 702. The paired device 708 may generate the time-limited paired device entropy using, for example, a random number generator at the paired device 708. The server 704 may receive the time-limited paired device entropy and optionally store the entropy in the database 706, which may be beneficial if the paired device 708 is lost.

In step 732, the server 704 may combine both time-limited entropy sources to generate the expiration ticket. In particular and with reference to FIG. 7D, the server 704, in step 732E, may input both the time-limited server entropy and the time-limited paired device entropy into a KDF, such as PBKDF2, in order to generate the key for the static server entropy. The server and paired device server entropies may expire at the same time or expire at different times. The server 704, in step 732F, may input both time-limited entropies (in addition to the static server entropy) to generate the key for the PIN, if a PIN is used.

In alternative aspects, the server 704 may use the time-limited paired device entropy (and not the time-limited server entropy) to generate the keys for the static server entropy and/or the PIN. In other words, the time-limited paired device entropy may replace the time-limited server entropy in the foregoing examples. The server 704 may similarly replace the static server entropy with static paired device entropy.

In some aspects, the paired device 708 may function like the server 704 with respect to managing entropy and generating keys. For example, the paired device 708 may generate its own static paired device entropy and may generate a key for the static paired device entropy using time-limited paired device entropy, without involvement by the server 704.

In some aspects, the client device 702 may generate entropy and keys for the entropy on its own, without server involvement. After the initial PIN prompt during the first time use, the client device 702 may directly use a passphrase and the PIN to generate entropy and keys. The passphrase may include enough entropy to construct the encryption keys. The client device 702 may send the generated entropy and any additional metadata (e.g., data identifying the client device 702) to the server 704 and/or database 706 for storage. After this initial modified bootstrapping step by the client device 702, the method may proceed as described above.

Additional Aspects of Authenticating a Client Device or User

Aspects described herein may be useful for mobile and wearable devices where user interaction is often brief and seamless, but at the same time secure. These concepts are also useful with any end-user computing devices, including desktop computers or online/cloud-based services.

Advancements in smart and always on technologies, such as smartphones, watches, or other mobile or wearable devices, may allow users to carry strong secrets (e.g., encryption keys), which they could unlock and use to authenticate to other devices. The unlocking of secrets may be explicit via a PIN, gesture/swipe, or watch/mouse wheel entry. In addition, policies may allow users to forgo manually unlocking (e.g., authenticating) and authorizing use of their strong secret in some settings, such as in a designated office. These enhancements may reduce the friction in device and application hopping, delight the end user, and improve both security and overall user experience with authentication and roaming.

Aspects described herein may allow credential input from another device, such as a mouse, a wearable device (e.g., a smartwatch), or any other mobile device. For example, the user may enter credentials using the wheel and/or buttons of the mouse or the smartwatch. Credentials may also be input using gestures and/or voice. The user interface may be hidden for extra security (e.g., to prevent shoulder surfing). If the device used for credential input is temporarily unavailable (or a feature, such as the display screen, of the device is unavailable for credential input), an on-screen slider and/or buttons may be displayed on the primary device for credential input. A time limit for the on-screen slider and/or buttons may be used.

Aspects described herein may allow delegated authentication to another (e.g., trusted) device. Other authentication methods include a mouse/watch wheel, gesture, voice, smartcard, and/or biometrics. These authentication methods may offer unique user experience and/or security.

Aspects described herein may relate to policies for contextual authentication. For example, authentication may comprise multifactor authentication and/or may use entropy from an Internet of Things (IoT) device mesh. The authentication state may be transferred in the IoT device mesh. Geographical location and/or proximity authentication or security may be utilized. A restricted access token may be used. For example, for features and/or resources, an HDX session may have drive mapping disabled or an AG/NSG token restricted to E-Mail/Exchange (STA) ticket. For time, a user may unlock an application on a remote device for a limited time. Heuristics may be used to reduce the frequency or strength of authentication. Step-up authentication may be used to regain or extend an access token. Devices may be whitelisted or blacklisted. Security groups may be created.

These and additional aspects will be appreciated with the benefit of the disclosures discussed in further detail below.

Figure 13:
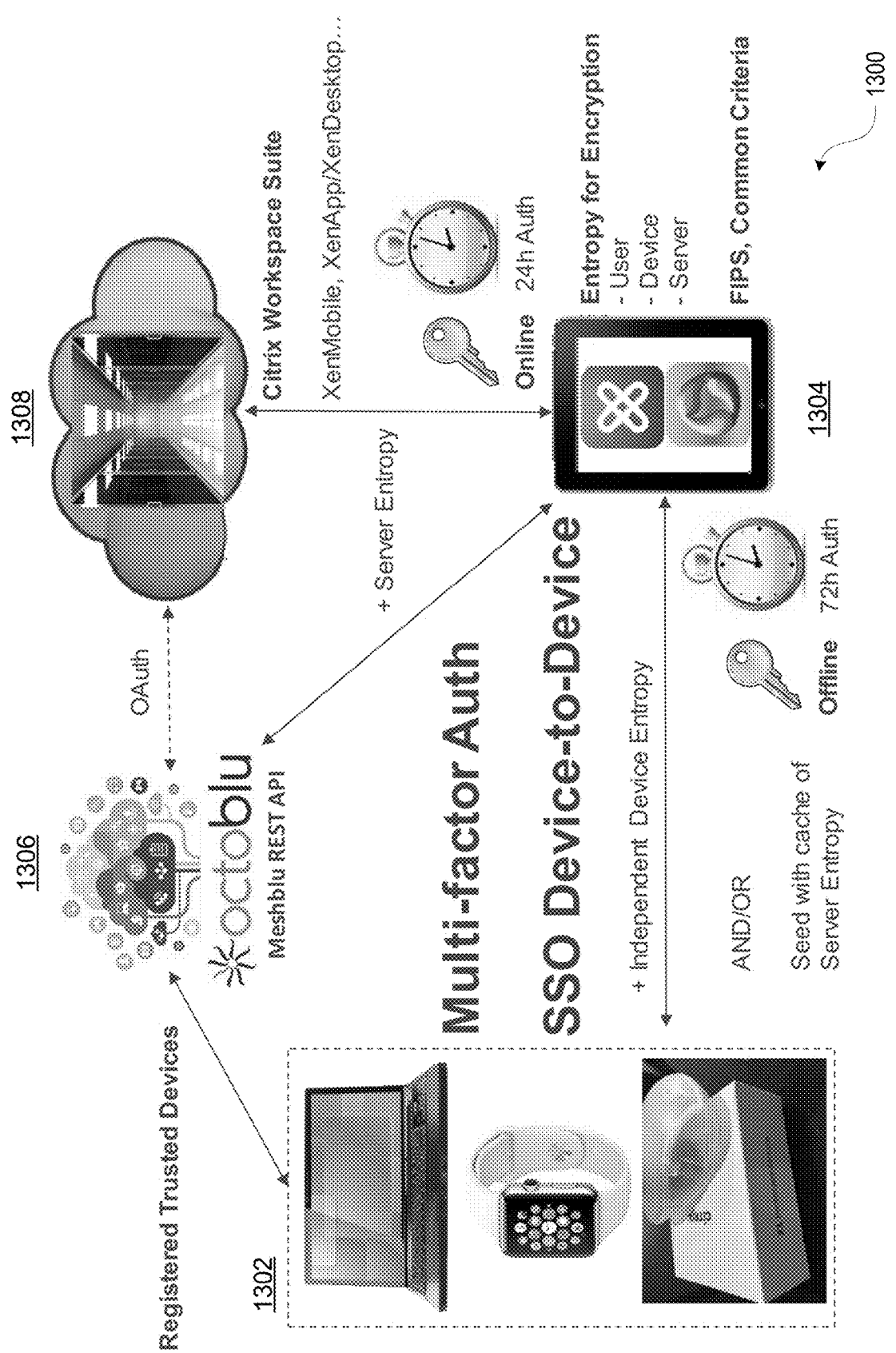
FIG. 13 depicts an illustrative mesh-based system architecture that may be used in accordance with one or more illustrative aspects described herein.

FIG. 13 depicts an illustrative mesh-based system architecture 1300 that may be used in accordance with one or more illustrative aspects described herein. The system 1300 may comprise registered and/or trusted devices 1302, additional user devices 1304, one or more device mesh 1306, such as an IoT device mesh, and one or more resources 1308, which may include workspace resources. The registered and/or trusted devices 1302 may comprise, for example, tablets, laptop computers, desktop computers, smartwatches, input devices (e.g., a mouse), and the like. The system 1300 may comprise one or more other devices 1304, which may also be registered and/or trusted by the system 1300. The devices 1304 may be used to, for example, request access to one or more resources 1308.

The IoT device mesh 1306 may be implemented in the context of any IoT providers, such as in terms of Citrix Octoblu/Meshblu, Microsoft Azure, open source platforms such as AllJoyn/AllSeen, or any other IoT providers. These providers 1306 may enable IoT device and application communications and interoperability. The solutions described herein may apply to, for example, XenMobile, XenApp/XenDesktop, GoToMyPC, GoToMeeting, GoToAssist, ShareFile, other Citrix Systems or non-Citrix Systems products using end-user authentication and/or roaming authentication context.

Entropy for encryption may come from a user (e.g., password, PIN, or other user information), a device (e.g., from one or more of the registered and/or trusted devices 1302 or the device mesh 1306), a server, or any other source of entropy. The combination of user, device, and/or server entropy from an IoT device mesh 1306 may allow the derivation of longer keys for encryption that meet future stricter FIPS and Common Criteria standards, such as in government and regulated environments. Aspects described herein may eliminate asking a user to enter a 256 AES key as their PIN. Any device may provide multifactor contextual authentication and entropy, such as a device that is able to store user or server entropy (e.g., a secret), a device that is able to authenticate the request for entropy from another device, and/or a device that is able to forward the stored entropy to a requesting device.

In some examples, direct device connectivity may be available. For example, a smartwatch could be connected, via a Bluetooth connection, to a paired user's phone. The user may want to unlock not just the phone, but any device in their mesh of registered trusted devices, e.g., their tablet, their laptop, their desktop computer, etc. An IoT mesh API, such as the Octoblu Meshblu REST API, may be leveraged as a platform to establish a mesh of owned and/or trusted devices. For example, Meshblu may support messaging as a broadcast or to specific devices in the mesh. Device public key exchange may be used to send encrypted data. Device registration may prompt the user to confirm a new device by accepting a notification on an already trusted device in the mesh.

Additional restrictions may be applied for security. For example, a user may be able to unlock co-located devices based on geo-fencing or unlock a second device for a limited time, or with some application features disabled until a step-up authentication is performed locally on that second device.

Figure 14:
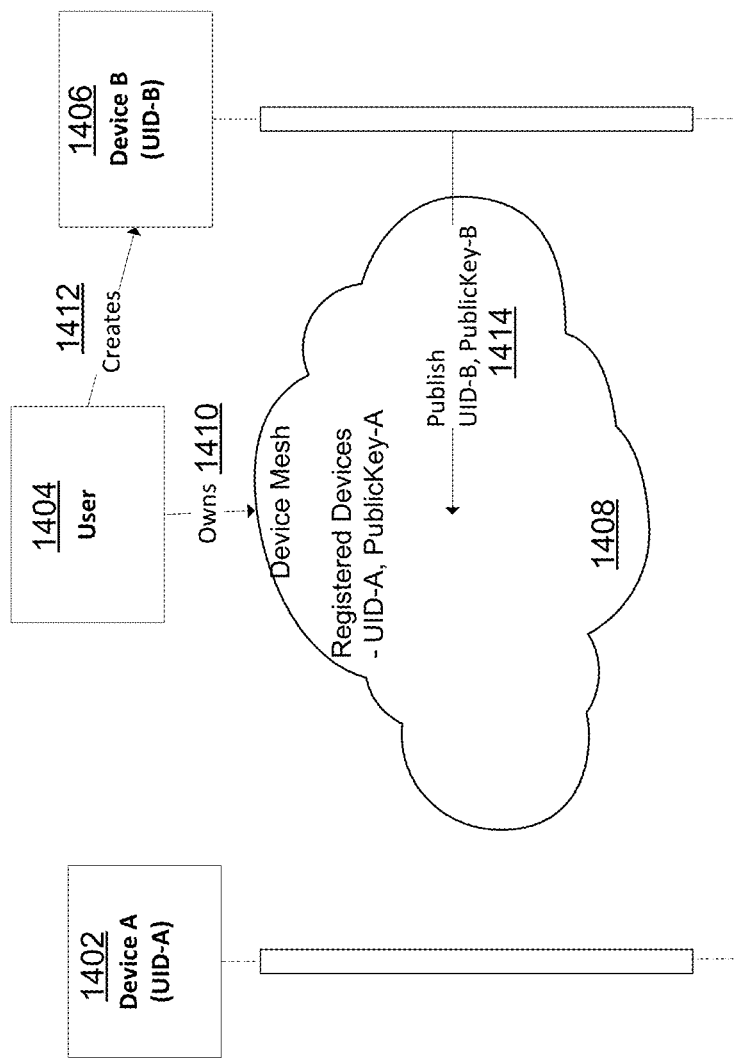
FIG. 14 illustrates an example method of enrolling a device in accordance with one or more illustrative aspects described herein.

FIG. 14 illustrates an example method of enrolling a device in accordance with one or more illustrative aspects described herein. In device enrollment, a device (e.g., device B 1406) may join a device mesh (e.g., mesh 1408) if another device (e.g., device A 1402) owned by a user (e.g., user 1404) claims the first device 1406 as commonly owned and/or trusted. The device mesh 1408 may comprise an Octoblu/Meshblu IoT device mesh. Devices in a particular mesh may query to see which other devices are currently joined in their mesh. The device mesh may allow a device and a device owner to publish whitelists that limit which other devices a specific device may communicate with. This may be used to prevent devices in the mesh from spending time processing messages from devices not part of the device mesh.

FIG. 14 illustrates a user 1404 owning 1410 a device mesh 1408, a device A 1402 having a unique identifier (e.g., UID-A), and a device B 1406 having a unique identifier (e.g., UID-B). Device A 1402 may already be registered as a trusted device in the device mesh 1408. Accordingly, the unique identifier UID-A and/or the public key of device A 1402 (e.g., PublicKey-A) may be registered and/or published in the device mesh 1408. Other devices may be enrolled in the device mesh. For example, during device enrollment, a user 1404 may create 1412 a new device (e.g., Device B 1406) and claim ownership of the new device. To enable secure communications to and from Device B 1406 in the device mesh 1408, an asymmetric (public and private) key pair, PublicKey-B and PrivateKey-B, may be generated. A device unique identifier, e.g., UID-B, may also be generated for Device B. The public key of Device B (PublicKey-B) could be registered and published 1414 in the device mesh 1408. For example, PublicKey-B may be made available to the other devices in the device mesh 1408 after Device B 1406 has been registered as part of the device mesh 1408. Each device in the device mesh 1408 may also store its own private key. Accordingly, a device in the mesh (e.g., Device A 1402) may be able to find the public key of another device in the mesh (e.g., Device B 1406) that the first device desires to communicate with. The device mesh 1408 illustrated in FIG. 14 and described herein is not limited to ownership and/or management by one user and may comprise a mesh owned and/or managed by multiple users.

Figure 15:
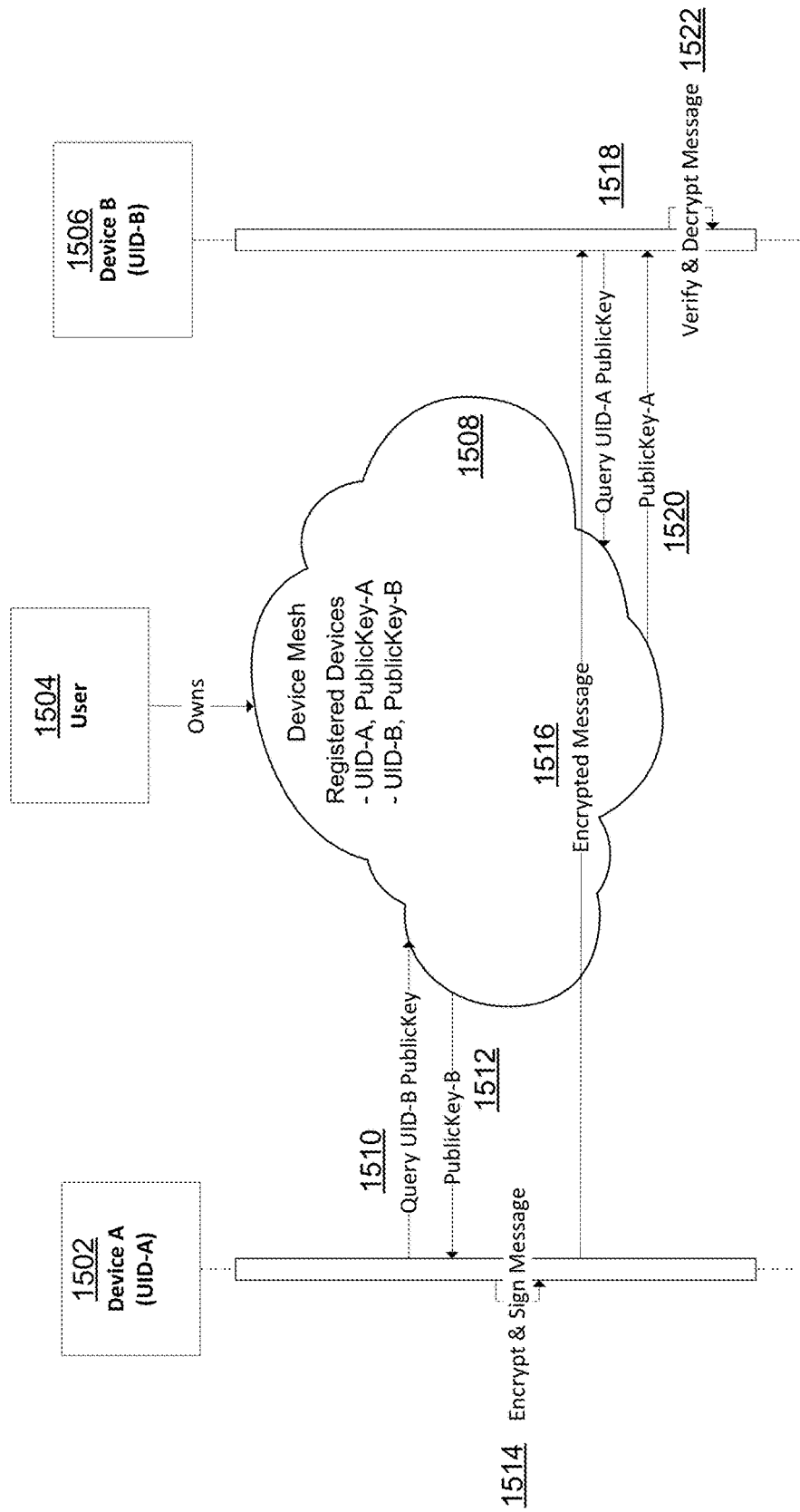
FIG. 15 illustrates an example method of secure communications in accordance with one or more illustrative aspects described herein.

FIG. 15 illustrates an example method of secure communications in accordance with one or more illustrative aspects described herein. FIG. 15 illustrates the user 1504 (or users) owning and/or managing a device mesh 1508. The device mesh 1508 may comprise registered device A 1502 (having an identifier UID-A and public key PublicKey-A), registered device B 1506 (having an identifier UID-B and public key PublicKey-B), and/or any other registered devices. As previously explained with reference to FIG. 14, device B 1506 may have been added to the device mesh 1508 during device enrollment. If device A 1502 desires to send device B 1506 a message, device A 1502 may query 1510 the device mesh 1508 for the public key of device B 1506 (e.g., PublicKey-B). The device mesh 1508 may return 1512 PublicKey-B to device A 1502 in response to the query. Device A 1502 may use device B's public key to encrypt 1514 the message. To prevent tampering with the encrypted message, the message may be signed by the sending device A's private key. Device A 1502 may send 1516 the encrypted message to device B 1506.

The secure communication illustrated in FIG. 15 and subsequent sections may also rely on publishing additional metadata in the device mesh. A device's public key may be encapsulated in, for example, an x509 certificate. Furthermore, the public keys published in the device mesh may be used by the devices to establish mutually authenticated TLS connections or another secure communication protocols, such as IPSec. The communication protocol described in subsequent sections may involve generating message authentication codes (MACs) and/or may rely on symmetric encryption keys. A device may sign the MACs and/or encrypt the symmetric encryption keys using its private key and/or the recipient's public key in certain order of operations. The specific encryption, MACs, signatures and order of operations used may depend on the message protocol devices use to communicate within the mesh.

Upon receipt of the message, device B 1506 may query 1518 the mesh 1508 for device A's public key (e.g., PublicKey-A). In the same query or a different query, device B 1506 may also verify that device A 1502 is indeed a part of the user's device mesh 1508. For example, device B 1506 may confirm that device A 1502 is registered with the device mesh 1508 and/or that the identifier for device A (e.g., UID-A) is stored in the mesh. Once the device mesh 1508 sends 1520 device A's public key (e.g., PublicKey-A) to device B 1506, device B 1506 can check the signature on the message to determine the message's authenticity. Once the message is determined to be authentic 1522, device B 1506 may use its private key to decrypt the message.

Figure 16:
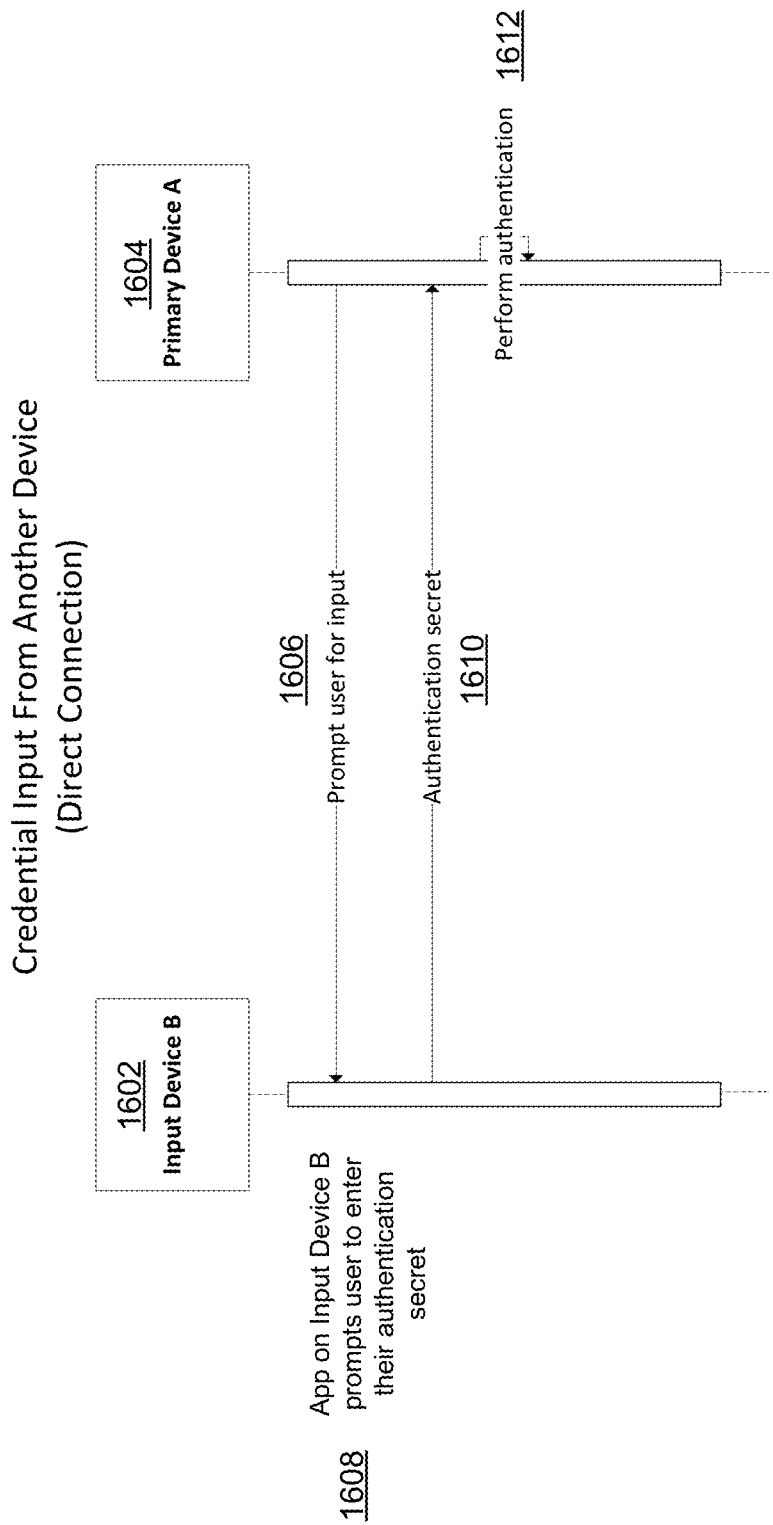
FIG. 16 illustrates an example method of credential input from another device in accordance with one or more illustrative aspects described herein.

FIG. 16 illustrates an example method of credential input from another device in accordance with one or more illustrative aspects described herein. In particular, an input device B 1602 (e.g., a smartwatch, a portable mouse, or any other wearable and/or mobile device) may be used to input credentials for accessing resources on a primary device A 1604 (e.g., a tablet, a desktop computer, a laptop computer, etc.). In some aspects, the input device B 1602 may be paired with the primary device A 1604, using any of the pairing mechanisms described herein, including registration with a server, a local Bluetooth connection between the primary device A 1604 and the input device B 1602, a Wi-Fi connection between the devices, an NFC connection between the devices, and the like. If a direct connection is available between the primary device A 1604 and the input device B 1602, the devices may be connected directly via a locally available network such as Bluetooth, NFC, or Wi-Fi. The communication may optionally be secured using a protocol, such as TLS.

The primary device A 1604 may receive a request from a user of the device 1604 to access one or more resources via the device 1604. In step 1606, the primary device A 1604 (or other device in need of authentication) may send a message to the input device B 1602 to request a user to input a credential (e.g., an authentication secret) via the input device B 1602. In step 1608, an application on input device B 1602 may prompt the user to enter the user's authentication secret. Additionally or alternatively, as in the case of an input device without a display (e.g., a mouse, such as the Citrix Mouse), the prompting application may run on the primary device A 1604 having a display. The user may input his or her authentication secret into the input device B.

The authentication secret/credentials may comprise information that the user knows and inputs, such as a numeric PIN, a password, a gesture/swipe, or a mouse/watch wheel entry. Other examples of secrets were previously explained above, and yet other examples of secrets will be described below. Voice entry may be used to provide a secret, similar to fingerprint image pattern. For example, one or more device, such as the primary device A 1604 or the input device B 1602, may support creating a voice pattern (e.g., a fingerprint) from a user's voice. The voice pattern may be used to derive a secret. If the derived secret is sufficiently long (e.g., provides enough entropy), then the secret may be used to derive an encryption key.

In step 1610, the input device B 1602 may send the entered authentication secret to the primary device A 1604, and, in step 1612, the primary device A 1604 may authenticate the user, e.g., directly. For example, the primary device A 1604 may compare the user's input to the known authentication secret or by performing a computation on the user's input, such as running the PBKDF2-SHA1 algorithm on the user's secret and comparing the result with the known trusted value. As will be described below, the input device B 1602, as a delegated authentication device, may also directly authenticate the user.

Figure 17:
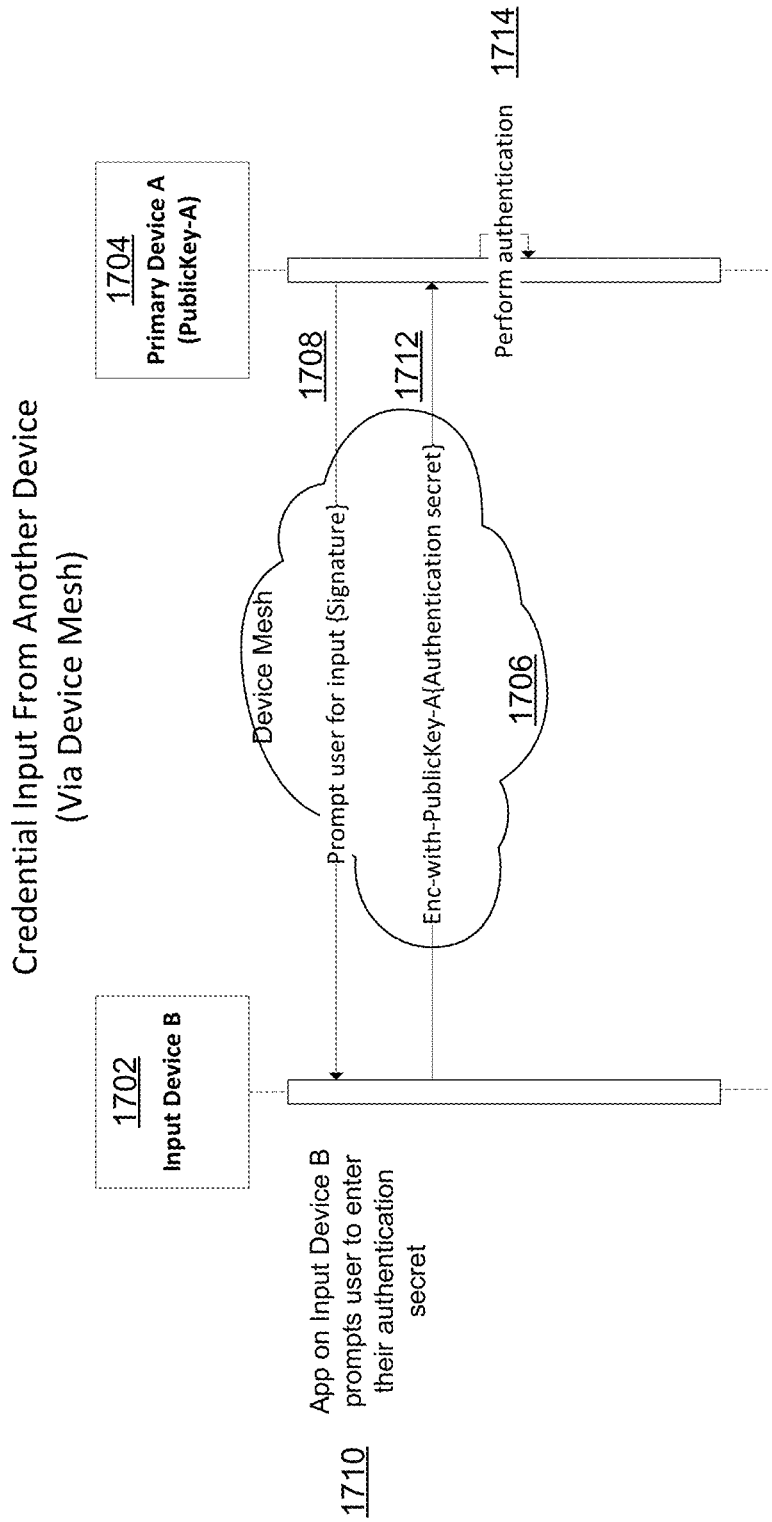
FIG. 17 illustrates another example method of credential input from another device in accordance with one or more illustrative aspects described herein.

FIG. 17 illustrates another example method of credential input from another device in accordance with one or more illustrative aspects described herein. In particular, the input device B 1702 and the primary device A 1704 may communicate and be connected via a device mesh 1706, such as an Octoblu device mesh. As previously explained, the input device B 1702 and the primary device A 1704 may be registered with the same device mesh 1706. The primary device A 1704 may receive a request from a user of the device 1704 to access one or more resources via the device 1704. In step 1708, the primary device A 1704 may send a message to the input device B 1702 to prompt the user to input the user's secret on the input device B 1702. Optionally, this message may be time-stamped, encrypted, and/or signed by the primary device A's private key, PrivateKey-A. Because input device B 1702 is part of the device mesh 1706, input device B 1702 may fetch the primary device A's public key PublicKey-A to verify the request. Optionally, the input device B 1702 may check the timestamp of the message to make sure that the message is not replayed, and that it was sent within an allowed grace period (e.g., that the message is no more than 1 minute old). In this example, the input device B 1702 may have a good and trusted source of time (e.g., a tick value, a system clock, or other time indicator that cannot be easily changed or otherwise tampered with).

After the input device B 1702 validates the integrity and timeliness of the request from the primary device A 1704, in step 1710, an application on input device B 1702 may prompt the user to enter the user's authentication secret. Additionally or alternatively, as in the case of an input device without a display (e.g., a mouse, such as the Citrix Mouse), the prompting application may run on the primary device A 1704 having a display. The user may input his or her authentication secret into the input device B. The input device B 1702 may encrypt the authentication secret entered by the user with PublicKey-A. In step 1712, the input device B 1702 may send the encrypted authentication secret to the primary device A 1704, such as by using a transport mechanism of the device mesh 1706. In step 1714, the primary device A 1704 may authenticate the user based on the authentication secret, as previously described. During authentication, the primary device A 1704 may fetch additional data from an authentication server (not illustrated). For example, the authentication server may provide the primary device A 1704 with additional encryption keys or secrets used to create encryption keys. If authentication is successful, the primary device A 1704 may be unlocked and/or the primary device A 1704 may otherwise be provided access to one or more resources, such as enterprise resources.

Figure 18A:
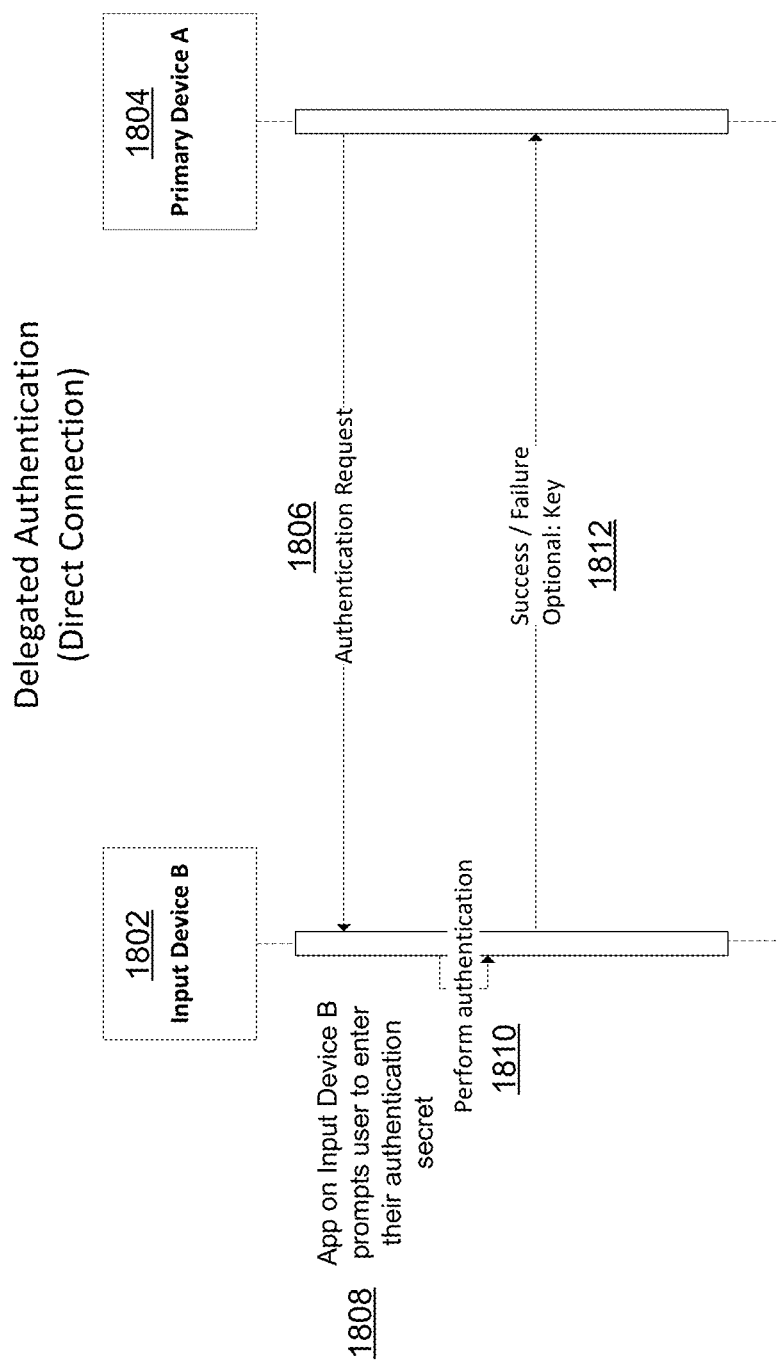
FIG. 18A illustrates an example method of delegated authentication in accordance with one or more illustrative aspects described herein.

FIG. 18A illustrates an example method of delegated authentication in accordance with one or more illustrative aspects described herein. In particular, a device (e.g., primary device A 1804) may delegate authentication to another device (e.g., input device B 1802). In step 1806, the primary device A 1804 (or other device in need of authentication) may send an authentication request to the input device B 1802, which may be paired with the primary device A 1804. In step 1808, the input device B 1802 may challenge the user to provide the user's authentication secret, as described above. The user may enter the secret into the input device B, as also described above. In the delegated authentication scenario, the input device B 1802 may perform the authentication (e.g., rather than the primary device A 1804 performing the authentication), such as in step 1810. The input device B 1802 may communicate with an authentication server (not illustrated) to validate the user's authentication secret. If authentication is successful, the input device B 1802 may send a success message to the primary device A 1804 in step 1812. In step 1812, the input device B 1802 may optionally send a secret (e.g., a key) to the primary device A 1804. In response to receiving the authentication success message, the primary device A 1804 may be unlocked. To prevent replay attacks, the message sent from the input device B 1802 to the primary device A 1804 may be encrypted and/or contain a validity time period within which the message is valid. Optionally, the communication may be secured using, for example, TLS.

Figure 18B:
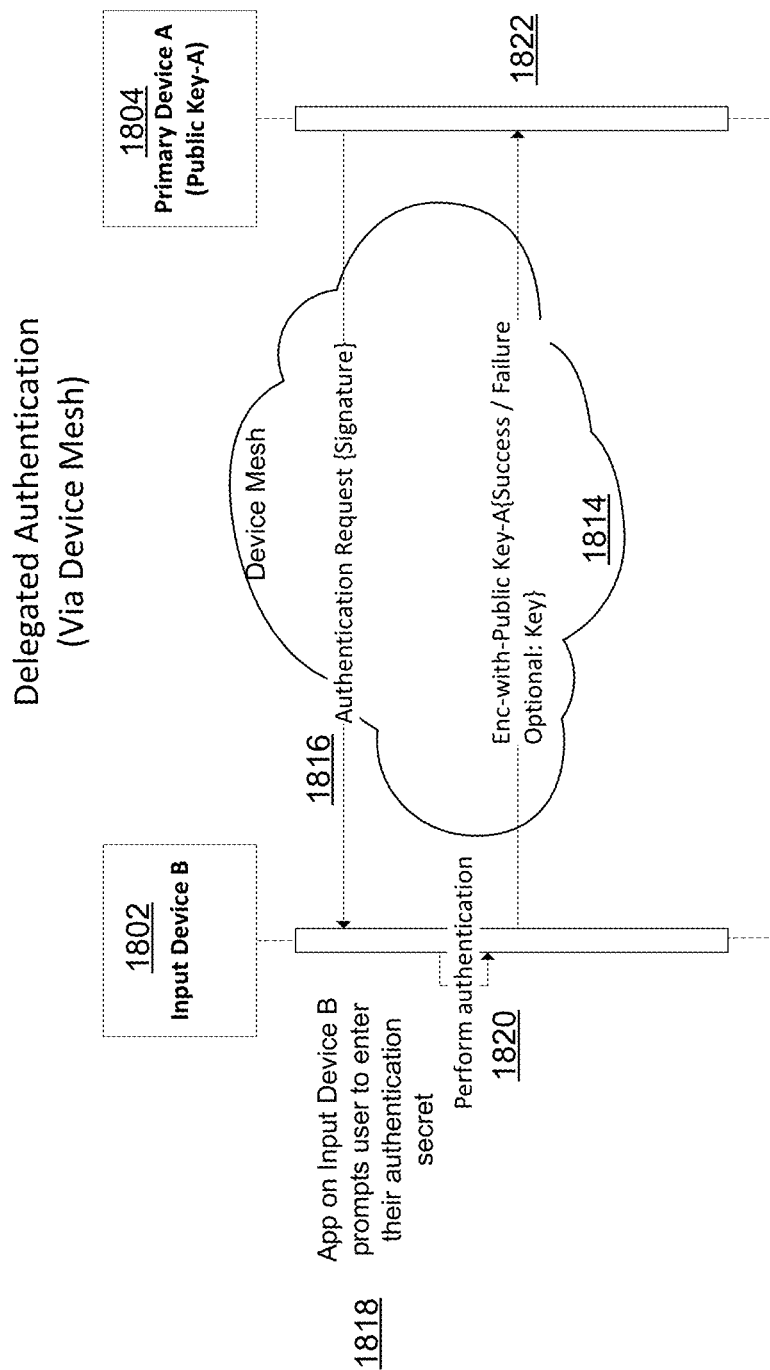
FIG. 18B illustrates another example method of delegated authentication in accordance with one or more illustrative aspects described herein.

FIG. 18B illustrates another example method of delegated authentication in accordance with one or more illustrative aspects described herein. For example, a device mesh 1814 may be used to delegate authentication to the input device B 1802. In step 1816, the primary device A 1804 may send an authentication request to the input device B 1802 via the device mesh 1814. The request may be signed with, for example, the primary device A's private key. The input device B 1802 may receive the request, and may prompt the user to enter the authentication secret in step 1818. In step 1820, the input device B 1802 may perform the authentication, as previously explained. Once the user is authenticated, the input device B 1802, in step 1822, may send a message to the primary device A 1804 indicating that the authentication is successful. The message may be encrypted with PublicKey-A and may contain the success or failure message and an optional encryption key that the primary device 1804 may use to unlock additional vaults for the user.

Figure 19:
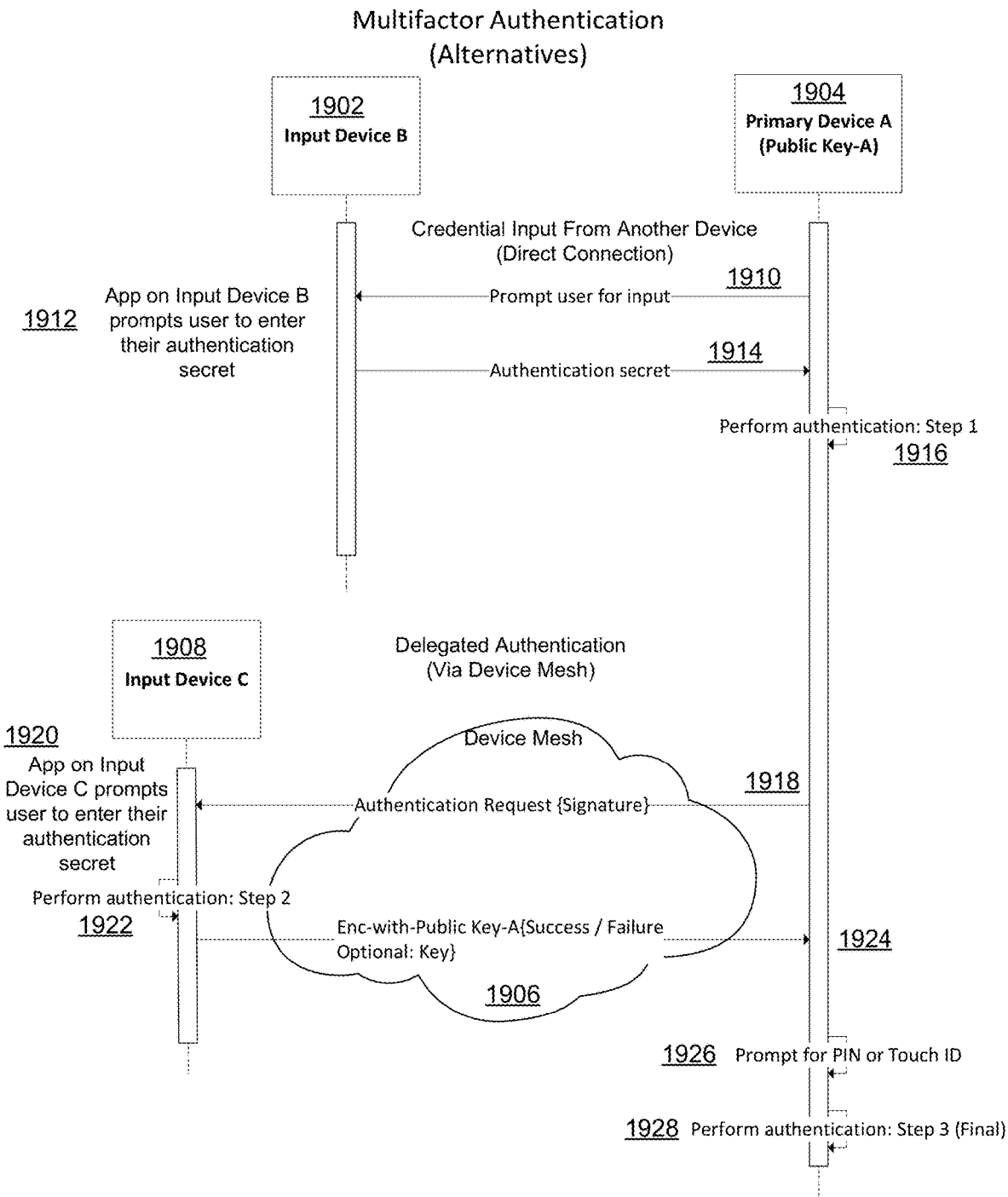
FIG. 19 illustrates an example method of multifactor authentication in accordance with one or more illustrative aspects described herein.

FIG. 19 illustrates an example method of multifactor authentication in accordance with one or more illustrative aspects described herein. A primary device A 1904 may request credential input from and/or delegate authentication to one or more secondary devices, such as input device B 1902 and input device C 1908. Although two secondary devices are illustrated in FIG. 19, any number of secondary devices may be used for credential input and/or delegated authentication, such as three secondary devices, four secondary devices, etc. The number of devices may depend on the level of security desired (a greater number of secondary devices for a higher level of security and a lower number of secondary devices for a lower level of security). Moreover, any of the secondary devices may be used for credential input or delegated authentication. For example, the primary device A 1904 may delegate authentication to two secondary devices. Alternatively the primary device A 1904 may request credential input from two secondary devices, but perform the authentication itself. The primary device A 1904 can interact with any of the secondary devices directly or via a device mesh, as previously described. The primary device A 1904 may use any one of the methods illustrated in FIGS. 16, 17, 18A, and 18B in any combination to perform multifactor authentication.

In the example illustrated in FIG. 19, the primary device A 1904 may request credential input from the input device B 1902 and delegate authentication to the input device C 1908. Similar to the example illustrated in FIG. 16, the primary device A 1904, in step 1910, may send a message to the input device B 1902 to request a user to input an authentication secret via the input device B 1902. In step 1912, an application on input device B 1902 may prompt the user to enter the user's authentication secret, and the user may input his or her authentication secret into the input device B 1902. In step 1914, the input device B 1902 may send the entered authentication secret to the primary device A 1904. In step 1916, the primary device A 1904 may authenticate the user (e.g., directly), as previously described.

After the primary device A 1904 authenticates the user via the secret provided by input device B 1902, the primary device A 1904 may delegate a second authentication to the input device C 1908. Similar to the example illustrated in FIG. 18B, in step 1918, the primary device A 1904 may send an authentication request to the input device C 1908 via the device mesh 1906. The request may be signed with, for example, the primary device A's private key. In step 1920, the input device C 1908 may receive the request and may prompt the user to enter the authentication secret. In step 1922, the input device C 1908 may perform the authentication, as previously explained. Once the user is authenticated, in step 1924, the input device C 1908 may send a message to the primary device A 1904 indicating that the authentication is successful. The message may be encrypted with PublicKey-A and may contain the success or failure message and an optional encryption key that the primary device 1904 may use to unlock additional vaults for the user.

In step 1926, the primary device A 1904 may optionally request credential input, such as a short numeric PIN or Touch ID, for additional authentication on primary device A 1904 itself. This may be a weak authentication request designed to, for example, unlock primary device A 1904 or an application running on primary device A 1904. In step 1928, the primary device A 1904 may perform a final authentication and permit the user to access one or more resources on primary device A 1904.

Authentication from input devices B or C may be in the form of implicit authorization. For example, one of the devices (e.g., input device B 1902) may comprise a proximity-based token, and the first authentication illustrated in FIG. 19 may be performed once the primary device A 1904 is within a predetermined distance from the input device B 1902. In some aspects, distance may be determined based on, for example, Bluetooth ranging. As another example, input device B 1902 may comprise a server and/or service providing entropy, such as, a XenMobile server or service or an Octoblu/Meshblu server or service. In these examples, the user may perceive authentication as a single-factor from input device C 1908, or as two-factor if specific registered input device C 1908 (with embedded secret key) is used, even though multi-factor authentication is actually performed.

Figure 20:
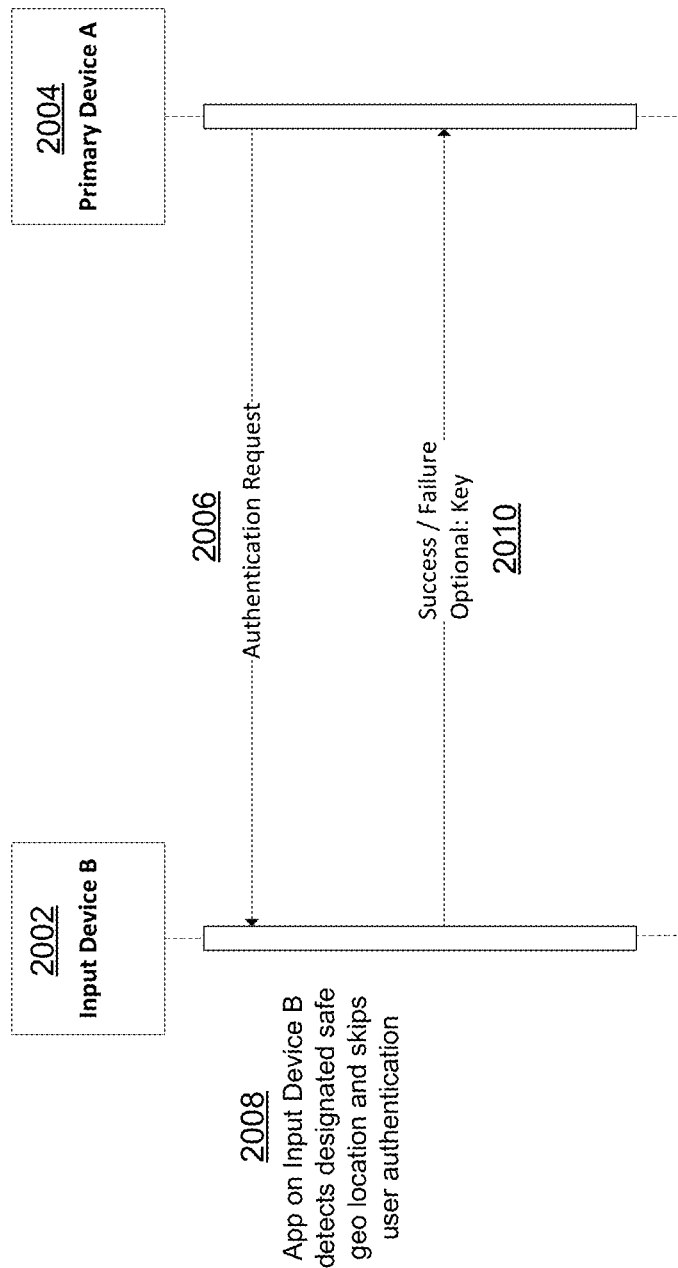
FIG. 20 illustrates an example method of contextual authentication in accordance with one or more illustrative aspects described herein.

FIG. 20 illustrates an example method of contextual authentication in accordance with one or more illustrative aspects described herein. Examples of contextual authentication include geolocation or proximity, restricted access tokens (e.g., feature or resource access limits, time limits, etc.), the use of heuristics to reduce frequency or strength of authentication, step-up authentication, transfer of authentication tokens and state in IoT device mesh, and white and black list of devices or security groups.

With reference to FIG. 20, the input device B 2002, in step 2006, may receive an authentication request from the primary device A 2004. If, in step 2008, the input device B 2002 detects that it is physically located in or near the user's designated safe zone (e.g., their office), the input device B 2002 may skip prompting the user for the authentication secret, trust the location information, and forward a success message (and an optional key) to the primary device A 2004 in step 2010. The policy may be based on geo-location or proximity information. For example, the input device B's GPS chip may report the location of the input device B 2002, or a beacon (e.g., a Bluetooth beacon, Wi-Fi beacon) inside the user's office may provide location information to the input device B 2002.

For restricted access tokens, bypassing authentication may be done in a restricted way. For example, if authentication is bypassed, limits may be placed on features or access to resources. A user may be granted the ability to perform certain actions without additional authentication, but with lower privileges or with some application features disabled. Full privileges may be restored when the user performs step-up authentication (e.g., locally) on the primary device A.

Applications on the primary device A may include Mobile Application Management (MAM) and/or Mobile Device/User Experience (MDX) that allow mobile applications to leverage the Citrix Worx suite functionality (e.g., MicroVPN, secret vaults, etc.). A user may unlock an application, such as an MDX/MAM application, for use on primary device A, but without access to some resources, such as network-based enterprise resources. For example, the user may be permitted to use WorxWeb, but without secure browse or micro-VPN functionality. The user may be granted access to WorxMail offline content, but without the ability to sync new e-mails or calendar items. The user may be allowed access to an inventory app and its persistent or cached data, but without access to the online enterprise SQL server database, or other online data.

An AG/NSG token may be obtained on the input device B, containing full enterprise access privileges. However, in the context of the primary device A, the primary device A may be restricted to certain resources or applications, such as E-Mail/Exchange access. The restricted access may be achieved in, for example, the form of a Secure Ticket Authority (STA) ticket.

In another example, a virtual and/or hosted session (e.g., an HDX, virtual or hosted, session) may be started without authentication on primary device A. However, some features, such as features that enable exfiltration of sensitive data, may be disabled. Examples of these features include drive mapping, clipboard mapping, remote drag-and-drop, etc.

In yet another example, another device, such as a device D may be part of the user's device mesh. A virtual/hosted session may be triggered and/or otherwise running at device D. Device D may be connected to, for example, a conference room projector. Primary device A may be running a PowerPoint presentation, such as via an e-mail attachment in WorxMail, for an operating system, such as iOS. The PowerPoint presentation may be instantly opened on another device, such as device D, which may comprise a Windows device. This may be achieved by the primary device A sharing the PowerPoint file via an API, such as the ShareFile REST API. Device D may launch a remote presentation application, such as a remote HDX Microsoft PowerPoint application, and the application may reference the ShareFile link to the PowerPoint. In this example, HDX features that may enable exfiltration of sensitive data may be disabled. Accordingly, the user may achieve the objective of being able to share the PowerPoint directly from their primary device A (e.g., a mobile device) with other meeting attendees watching the large presentation screen.

In some aspects, restrictions may come in the form of time limits. An application for a user on a remote device may be unlocked for a limited time. For example, a doctor currently in a patient room and using input device B could unlock a hospital billing application or a patient records application for a nurse using a primary device A in another room in the hospital. However, the application may be unlocked for a limited amount of time, such as 15 minutes. After the 15 minute time period, the unlocked application(s) may be locked again on primary device A used by the nurse.

Heuristics may be used to reduce the frequency or strength of authentication. For example, if a user has previously performed full two-factor authentication within an allowed grace period, e.g., within the last 4 hours, and the user's location is reported to be in a trusted location, such as the user's office, the user may authenticate via simpler and/or quicker authentication methods, such as swipe gestures. The user might not be required to perform one or two factor authentication.

As another example, input device B may be used as second-factor authentication, but the input device B may temporarily be unavailable or inconvenient to use. For example, the user might be on an airplane or train, and the input device B might be at an inconvenient location, such as the overhead compartment, the checked-bag compartment, etc. The user may be allowed to use single-factor authentication on the primary device A within a certain grace period. In these examples, the user may enter their credentials on the primary device A. Primary device A may emulate or otherwise display credential input buttons available on the input device B. For example, the input device B is a mouse having a scroll wheel and right and left buttons. If the input device B is unavailable, the primary device A may generate a display of a scroll wheel, a left click button, and a right click button on its touch screen display. Examples are illustrated in FIG. 25, FIG. 35, FIG. 38, FIG. 58, FIG. 61, and FIG. 62.

In some aspects, SSO between devices and/or applications may be enabled using the aspects described herein. For example, authentication tokens and/or state information may be transferred between devices in the same device mesh. A user may authenticate on one device, such as input device B. The authentication tokens and state (e.g., AG, SAML tokens, certificates, inactivity timers, etc.) may be transferred over the mesh (e.g., Octoblu mesh) to the primary device A (or other device) in the user's mesh. Examples of devices sharing authentication tokens and/or state were previously described above with reference to FIG. 11 and FIG. 12, and are included herein by reference in their entirety. The user may be allowed to quickly unlock an application on the primary device A (to confirm that the user is still in charge of the device), e.g., with touch ID. Then the user may use the transferred tokens and state for SSO to applications and enterprise resources from primary device A.

In some aspects, the input devices illustrated in FIGS. 16-20 (e.g., input device 1602, input device 1702, input device 1802, input device 1902, input device 1908, or input device 2002) may comprise a thin client device. The thin client device may comprise thin client hardware (e.g., RASPBERRY PI or other computing device), an operating system (e.g., RASPIAN, LINUX, WINDOWS 10 IoT Core, etc.), and client agent software configured to add functionality to allow pairing of the thin client device with an external device, such as a tablet, laptop, smartphone, and the like.

The client agent software on the thin client device may be enhanced with additional functionality to allow pairing of a user device, such as a tablet, to the thin client device. In some aspects, a client agent may run on the user device and may be used to access remote and/or hosted applications or desktops. The thin client device may be connected to, for example, a display (which may be larger than the display on the user device), a keyboard, a mouse, or other input device. The client agent on the thin client may receive and display at the connected larger display, graphics rendered from the client agent on the user device and respectively the graphics of the hosted applications or desktops accessed from the user device. The client agent on the thin client may send keyboard and mouse events, data from tethered USB devices, etc., to the client agent on the user device and the hosted applications and/or desktops accessed from the user device. Thus, the user may seamlessly continue and/or roam their workspace from the user device to the thin client and back, e.g., as the user device gets closer to the thin client device (e.g., proximity-based) or the user issues a specific command to pair with the thin client device, e.g., with a flick gesture or some other command.

In some aspects, the thin client may serve as a second trusted device, and the user device may serve as a first trusted device. The devices may be paired directly, e.g., via Bluetooth or via a device mesh. The thin client device may be used for credential input as previously described or as a device performing the authentication as also previously described. The thin client device may also receive and reuse the authentication state (e.g., tokens, inactivity timers, etc.) already established on the user device by the client agent on the user device. In the context of the thin client device and using this shared authentication state, other local or remote applications may be launched or authenticated, or network/cloud-based resources may be accessed from the thin client device. The reverse may also be used. For example, the user device may be used for credential input, or the authentication state may be transferred from the thin client device to a paired device.

In some aspects, security groups and/or a blacklist or whitelist of devices may be used to guide the application of any of the aforementioned policies.

As previously explained, the user may input his or her authentication secret (e.g., credentials) via a secondary input device (e.g., a smartwatch, a mouse, a smartphone, etc.) or a primary device (e.g., a tablet, a laptop computer, a desktop computer, etc.). FIGS. 21-64 illustrate exemplary display screens and/or devices that the user may use to set, provide, confirm, etc., his or her authentication secret.

Figure 21:
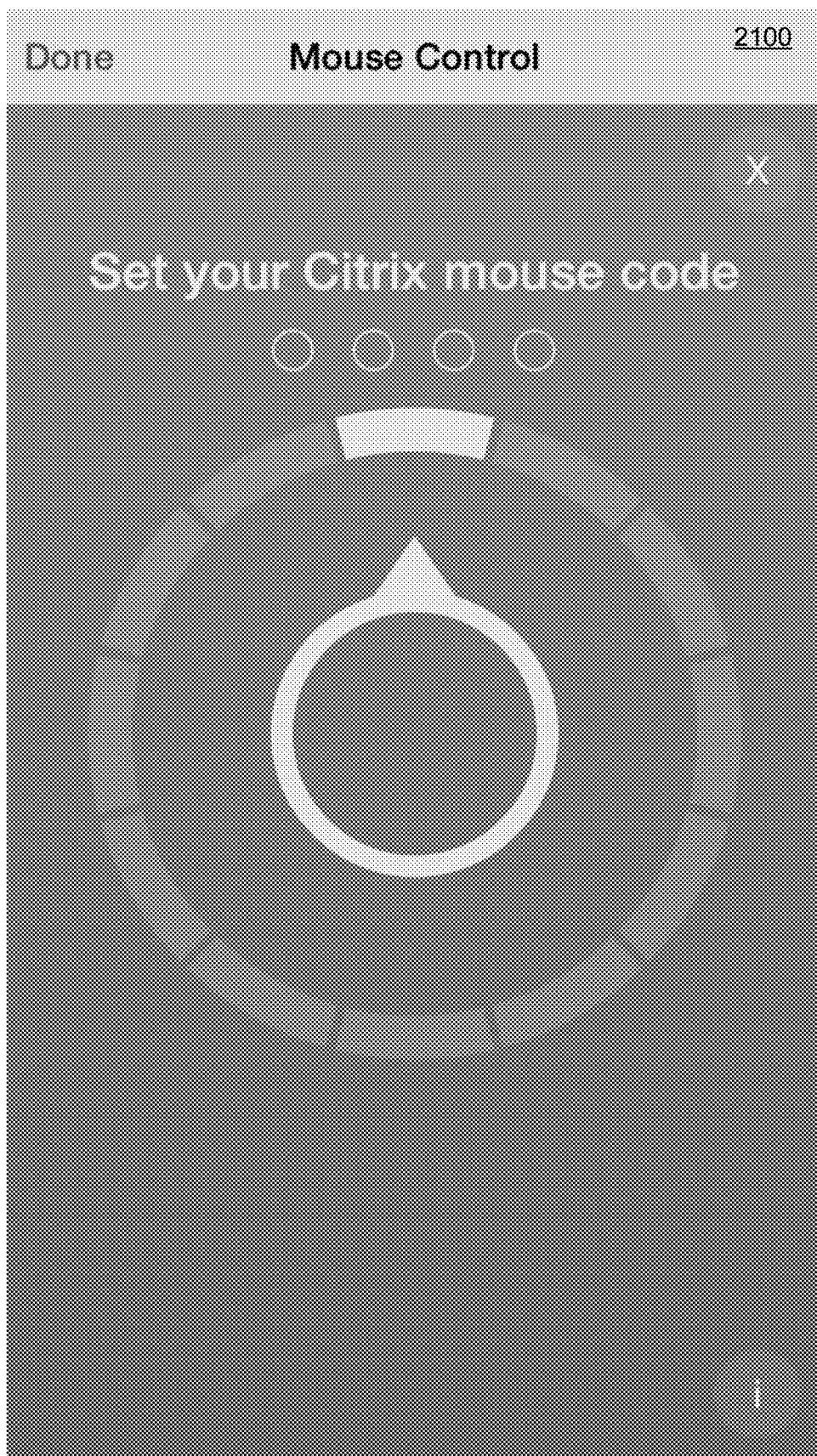
FIG. 21 illustrates an example display screen for setting a mouse wheel authentication code in accordance with one or more illustrative aspects described herein.

FIG. 21 illustrates an example display screen 2100 for setting a mouse wheel authentication code in accordance with one or more illustrative aspects described herein.

Figure 22:
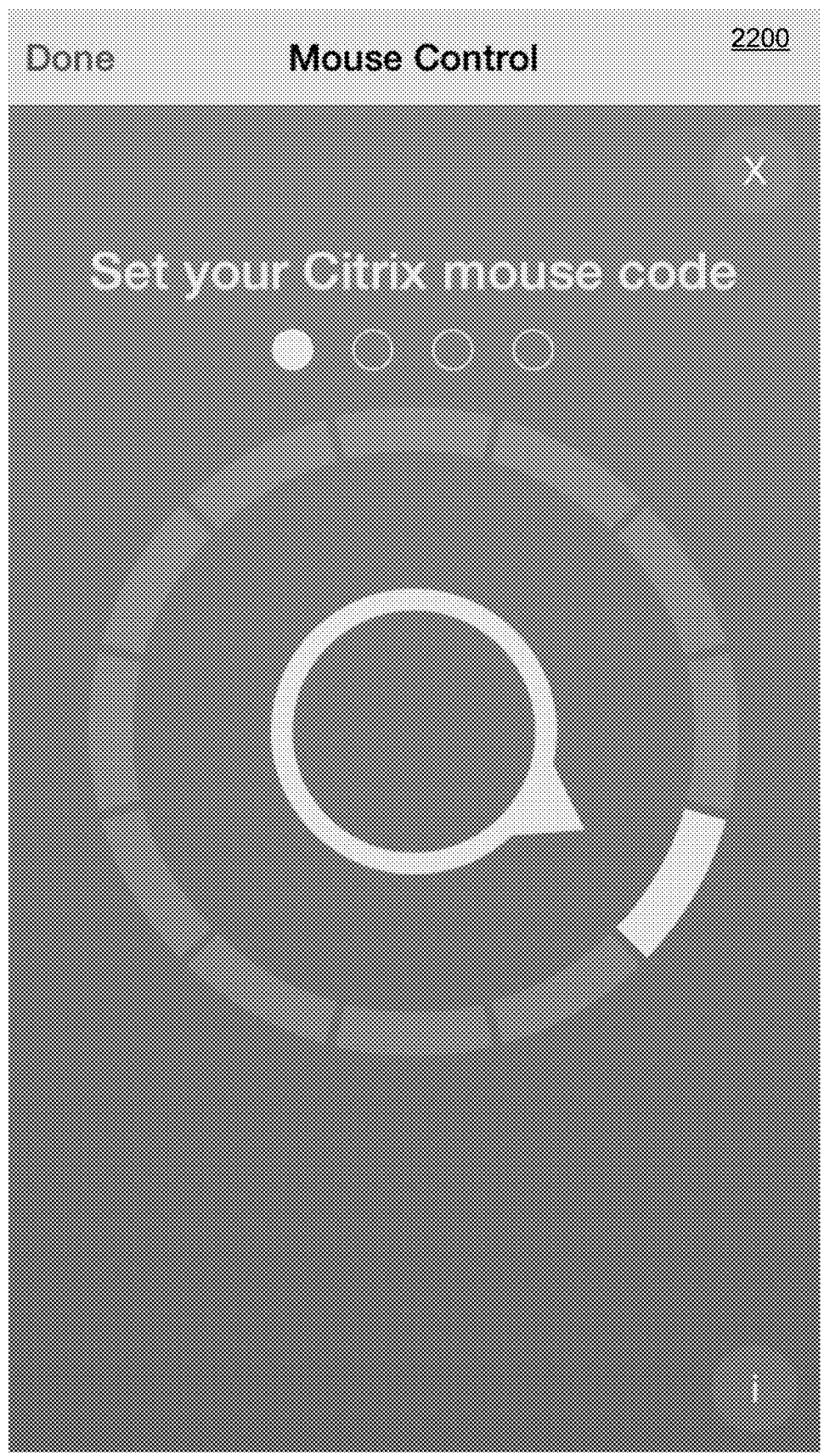
FIG. 22 illustrates an example display screen for setting a mouse wheel authentication code in accordance with one or more illustrative aspects described herein.

FIG. 22 illustrates an example display screen 2200 for setting a mouse wheel authentication code in accordance with one or more illustrative aspects described herein.

Figure 23:
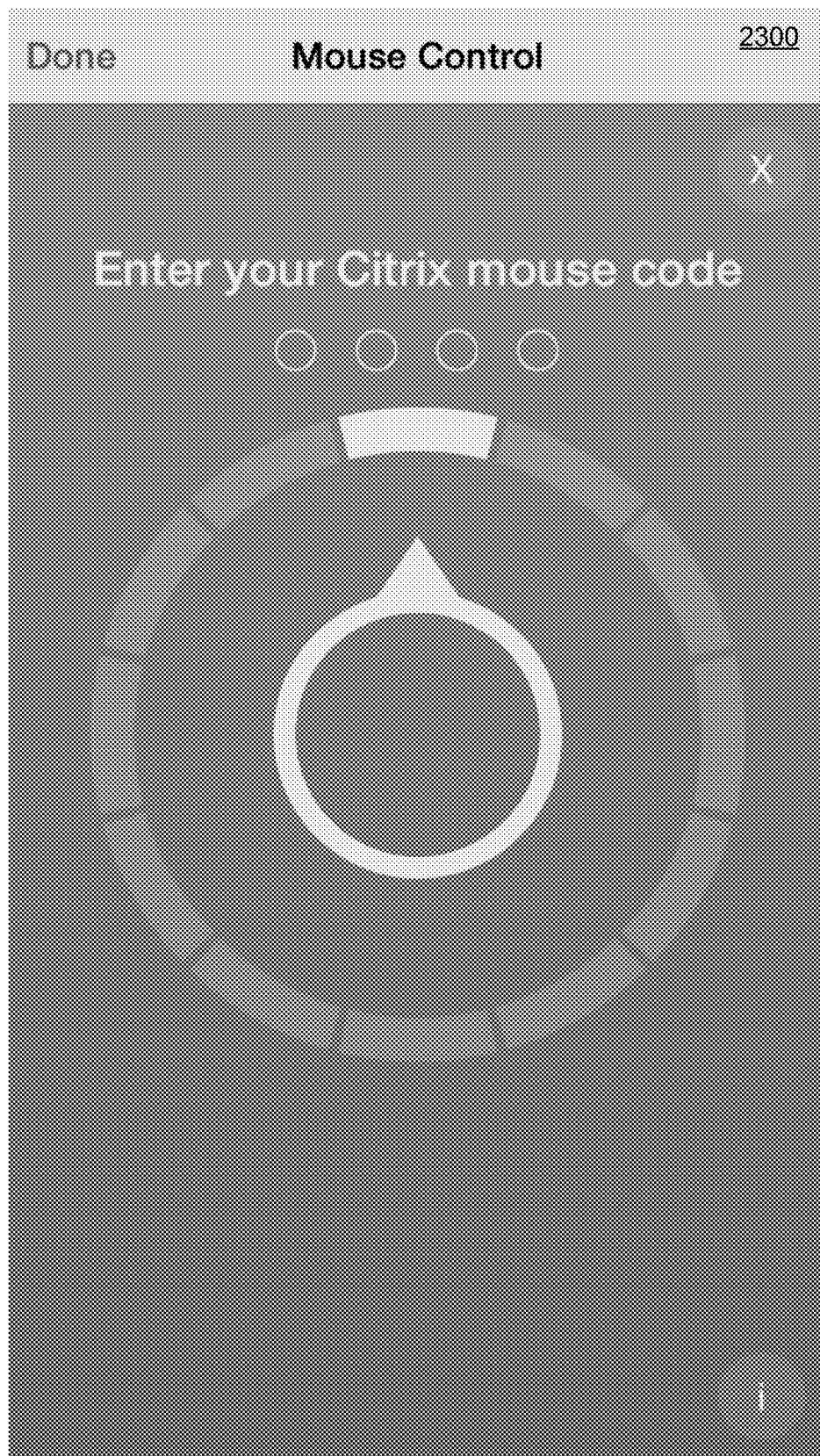
FIG. 23 illustrates an example display screen for entering a mouse wheel authentication code in accordance with one or more illustrative aspects described herein.

FIG. 23 illustrates an example display screen 2300 for entering a mouse wheel authentication code in accordance with one or more illustrative aspects described herein.

Figure 24A:
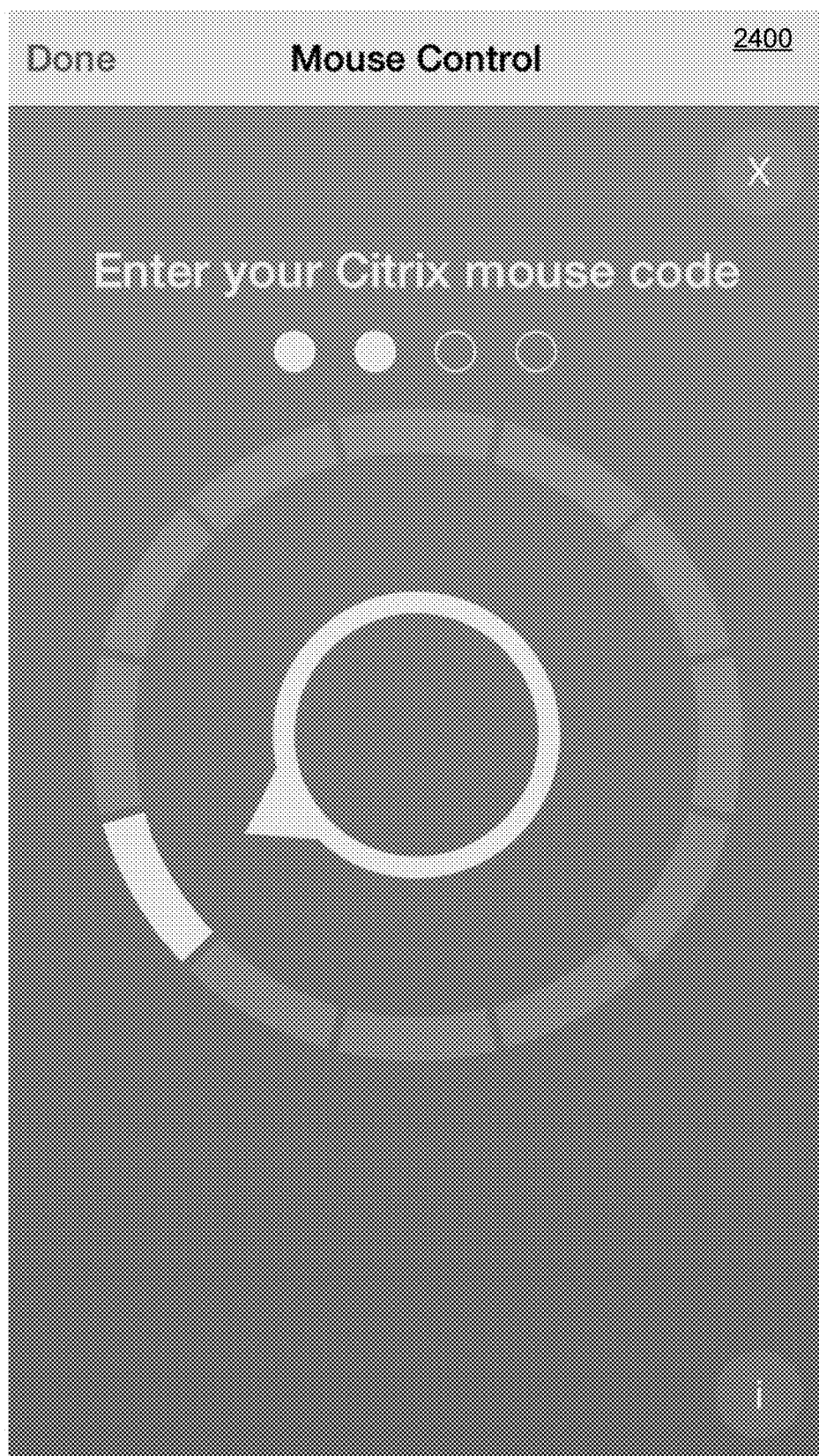
FIGS. 24A-C illustrate example display screens for entering a mouse wheel authentication code in accordance with one or more illustrative aspects described herein.
Figure 24B:
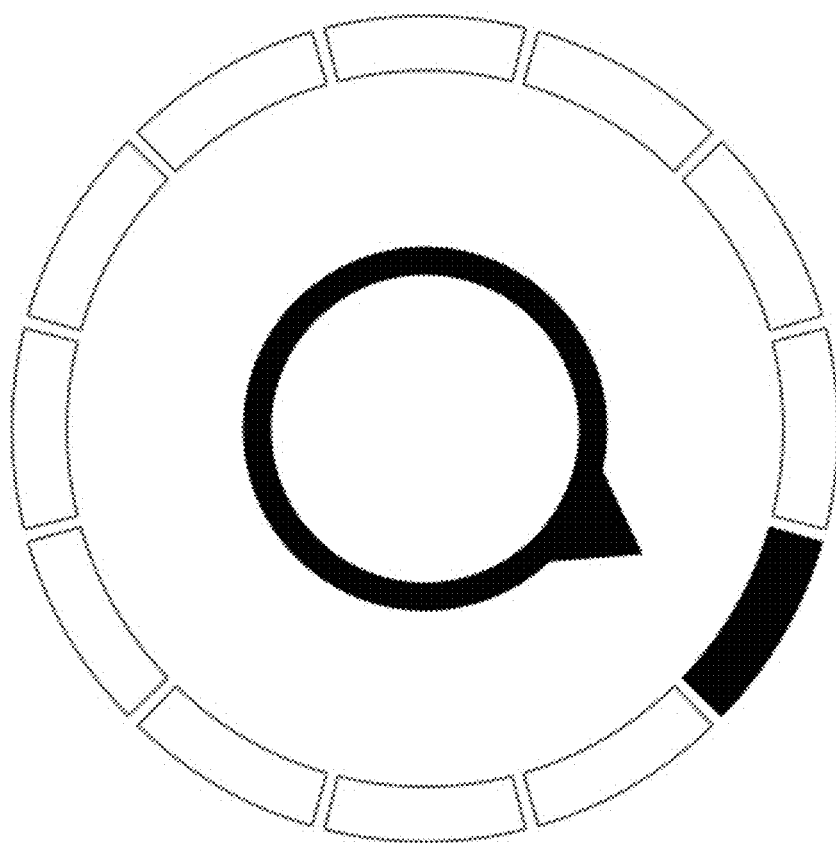
Figure 24C:
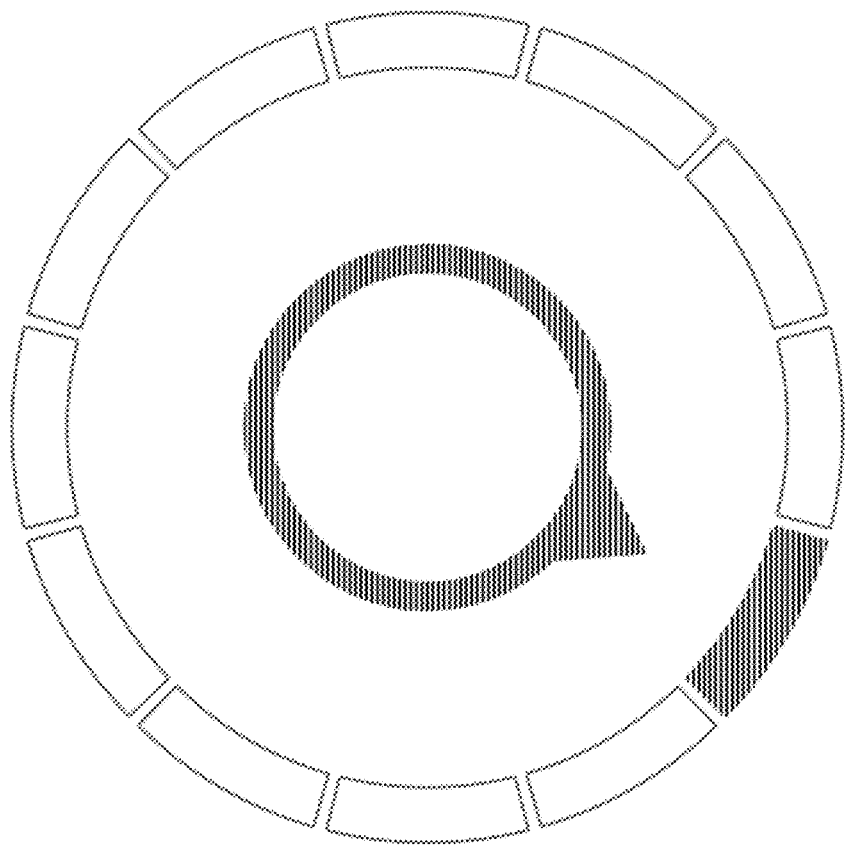

FIGS. 24A-C illustrate example display screens 2400, 2420, and 2440 for entering a mouse wheel authentication code in accordance with one or more illustrative aspects described herein.

Figure 25A:
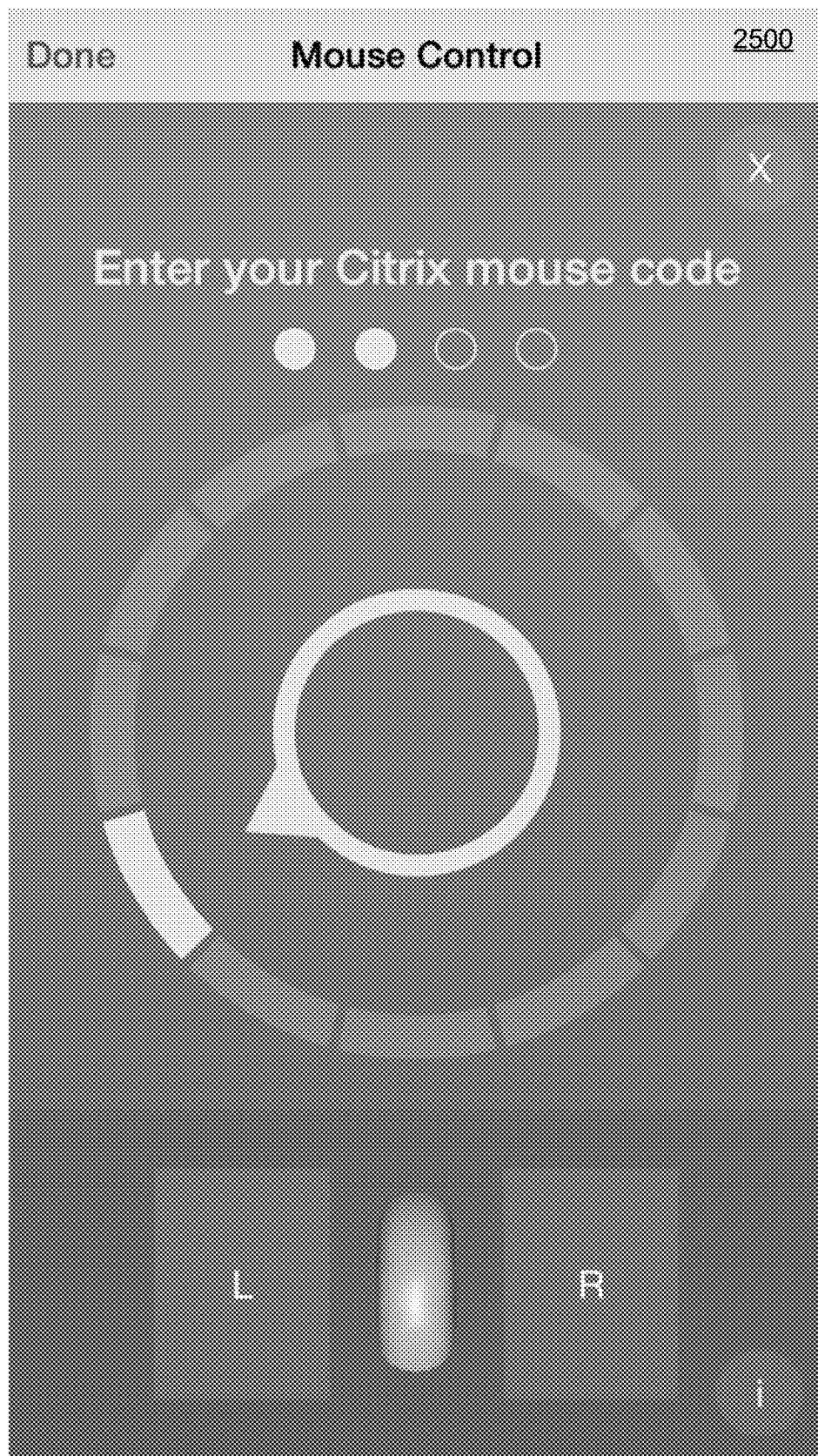
Figure 25C:
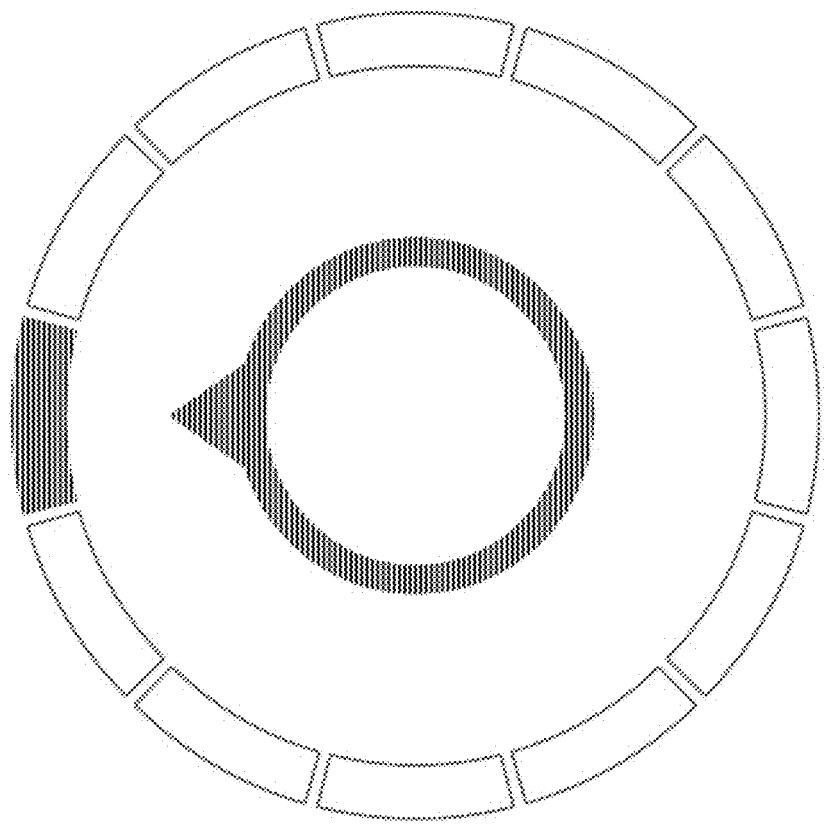

FIGS. 25A-C illustrate example display screens 2500, 2520, and 2540 for entering a mouse wheel authentication code in accordance with one or more illustrative aspects described herein.

Figure 26:
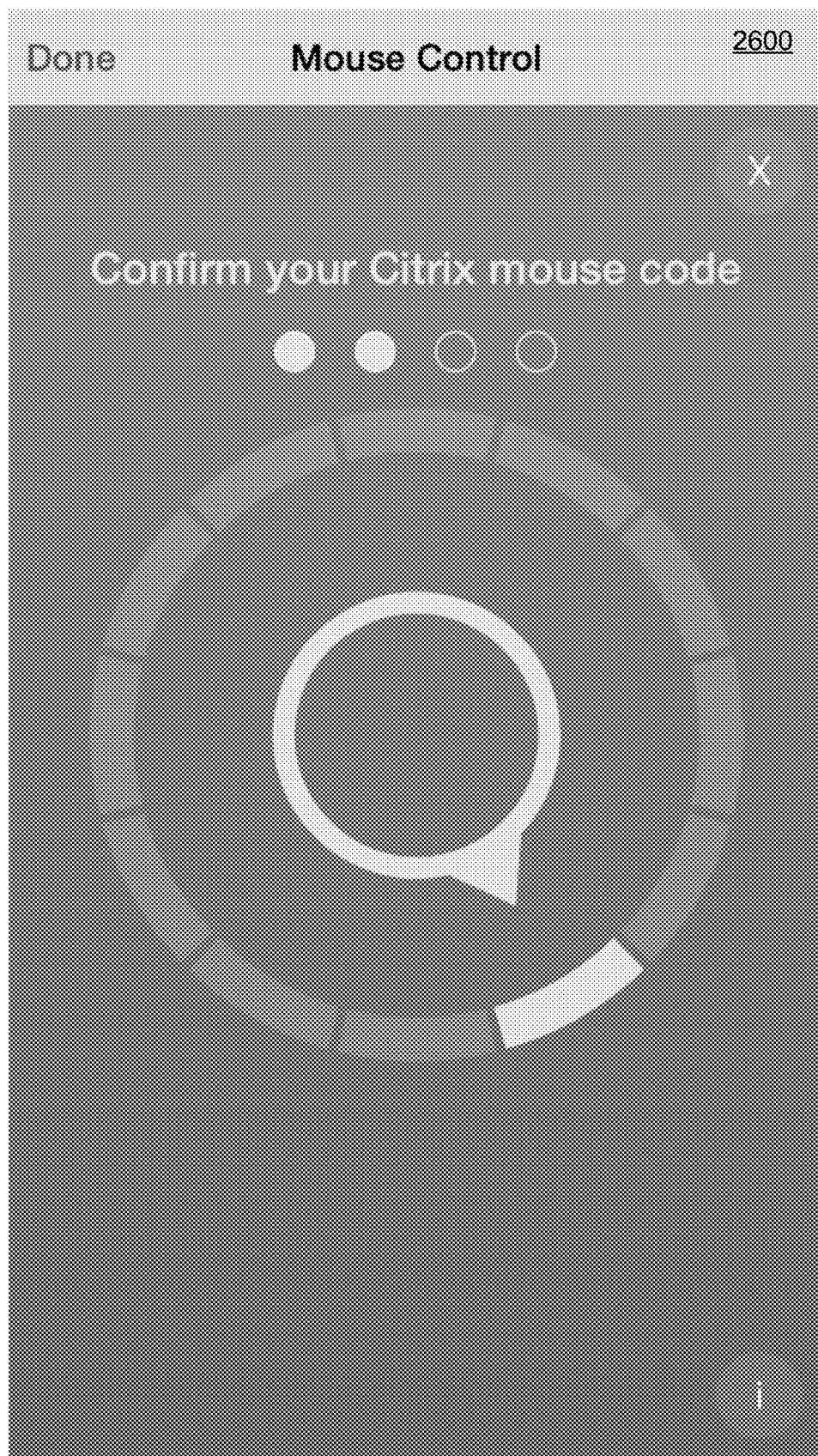
FIG. 26 illustrates an example display screen for confirming a mouse wheel authentication code in accordance with one or more illustrative aspects described herein.

FIG. 26 illustrates an example display screen 2600 for confirming a mouse wheel authentication code in accordance with one or more illustrative aspects described herein.

Figure 27:
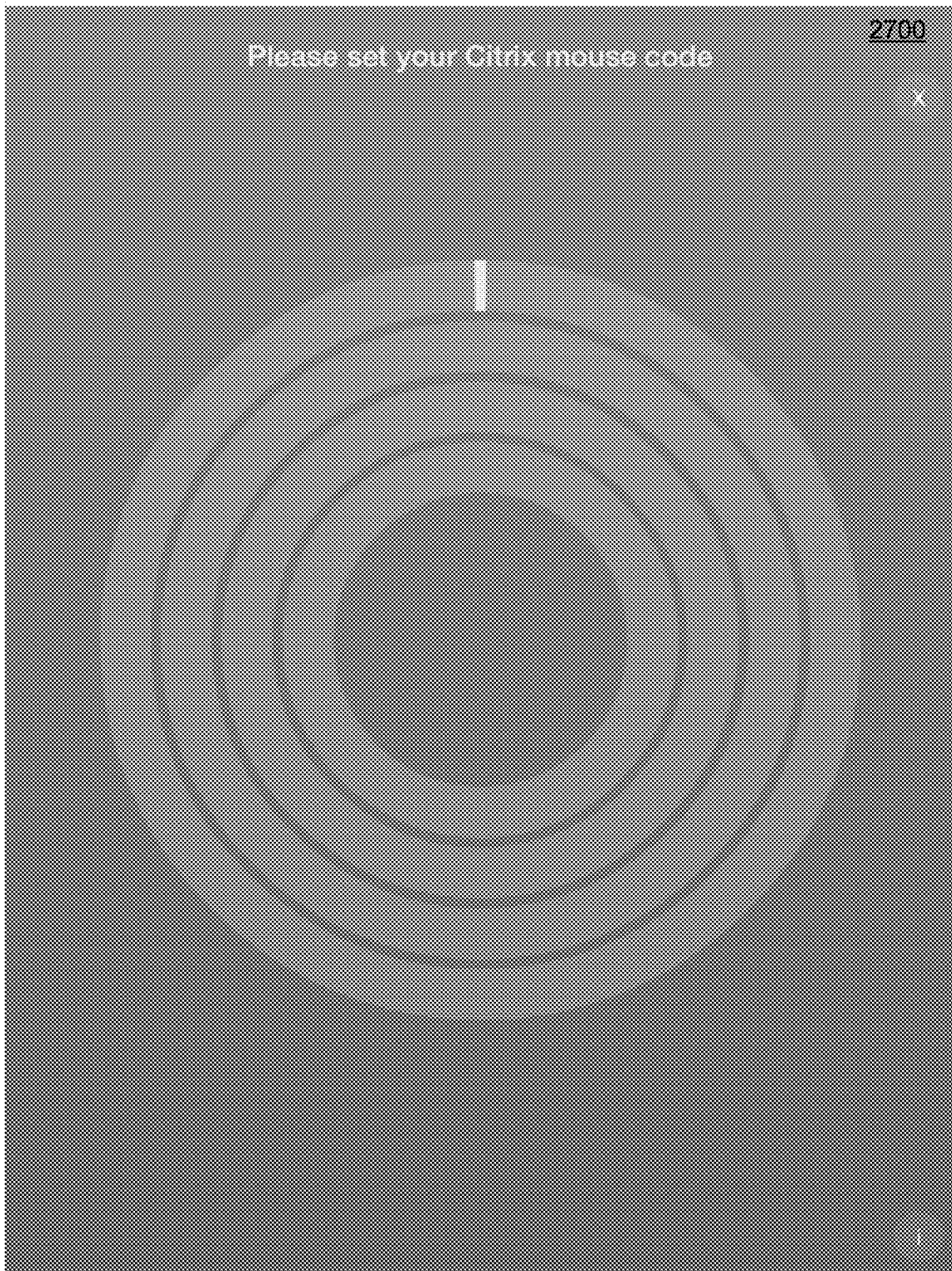
FIG. 27 illustrates an example display screen for setting a mouse wheel authentication code in accordance with one or more illustrative aspects described herein.

FIG. 27 illustrates an example display screen 2700 for setting a mouse wheel authentication code in accordance with one or more illustrative aspects described herein.

Figure 28:
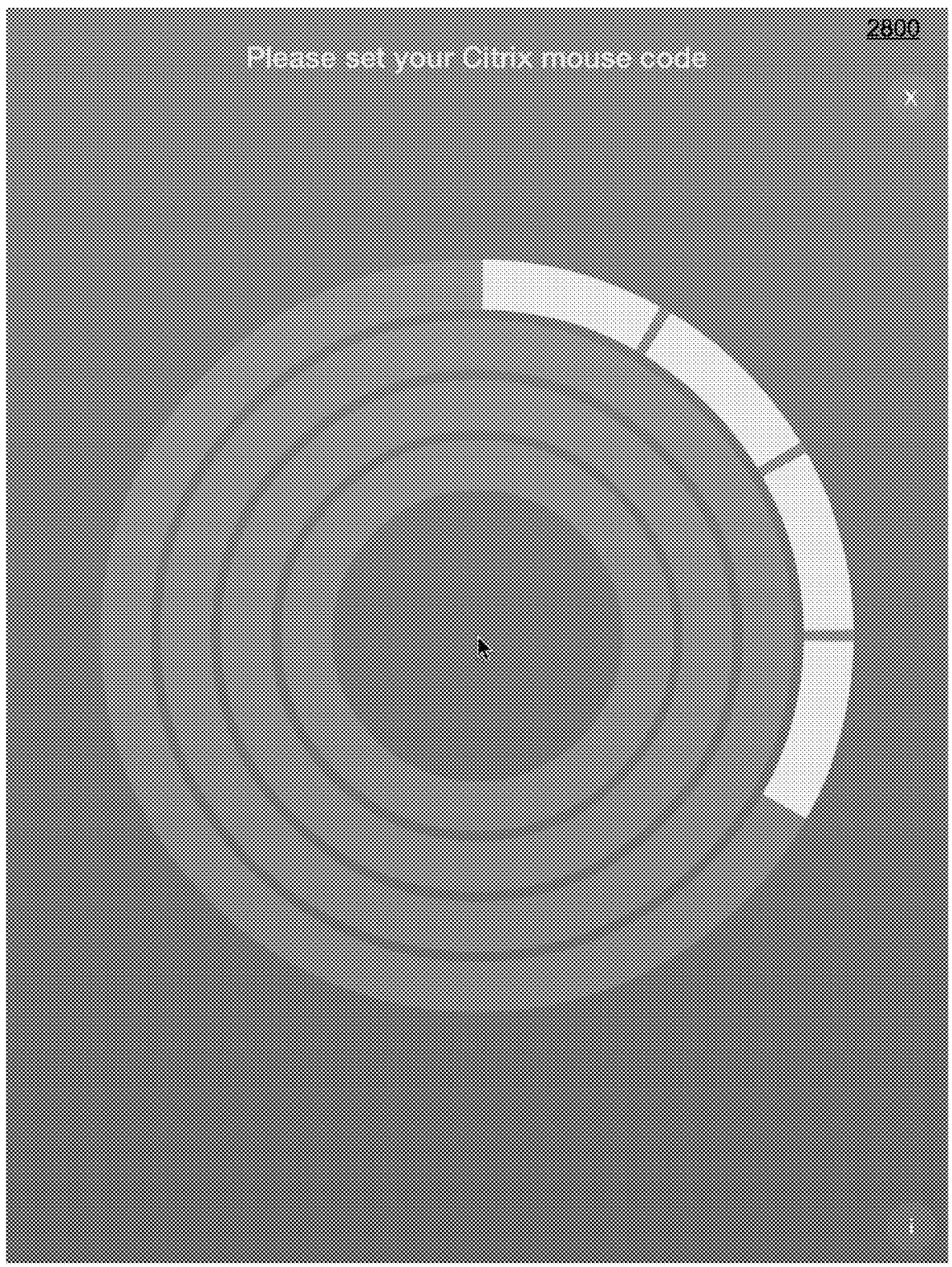
FIG. 28 illustrates an example display screen for setting a mouse wheel authentication code in accordance with one or more illustrative aspects described herein.

FIG. 28 illustrates an example display screen 2800 for setting a mouse wheel authentication code in accordance with one or more illustrative aspects described herein.

Figure 29:
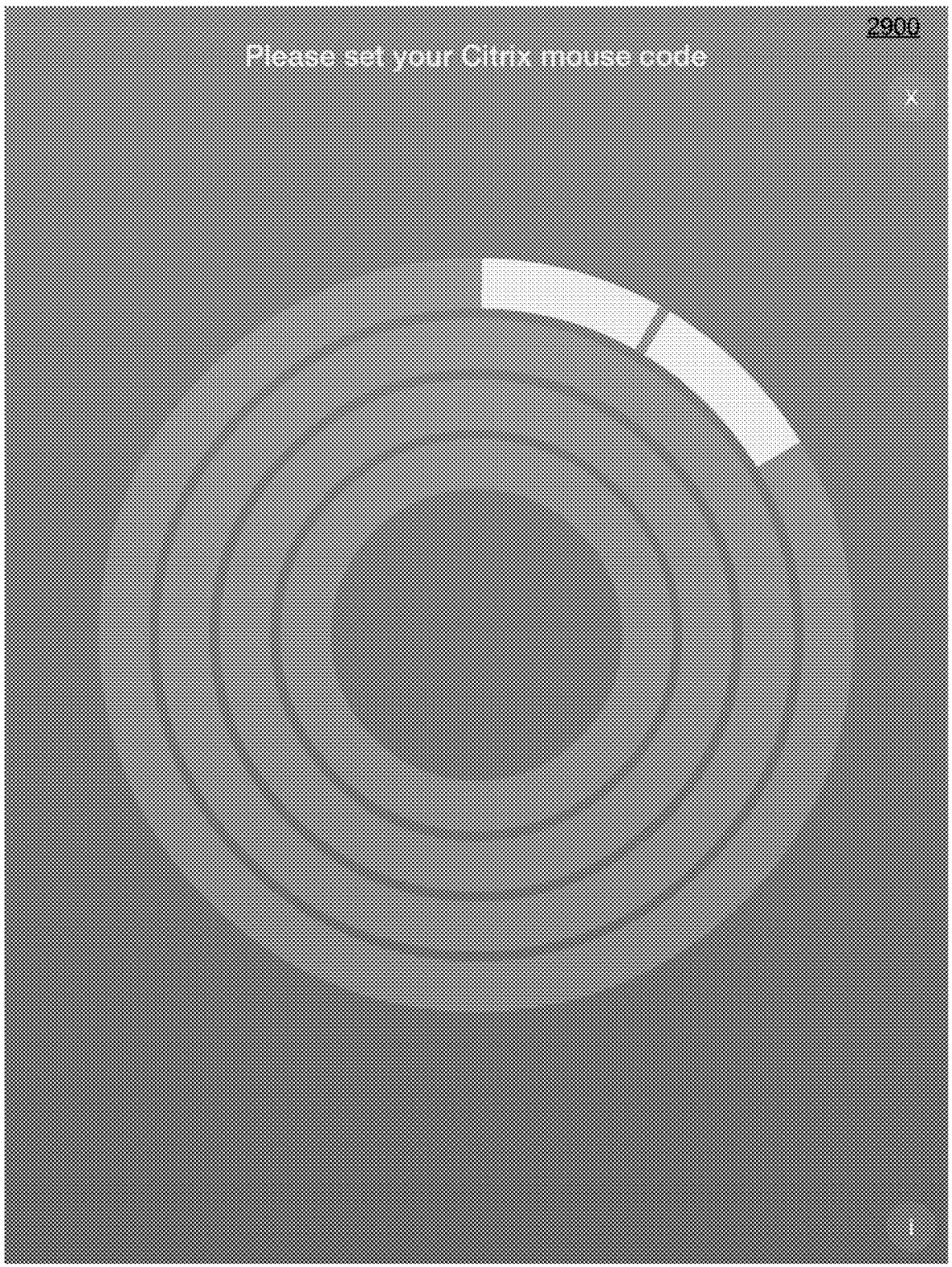
FIG. 29 illustrates an example display screen for setting a mouse wheel authentication code in accordance with one or more illustrative aspects described herein.

FIG. 29 illustrates an example display screen 2900 for setting a mouse wheel authentication code in accordance with one or more illustrative aspects described herein.

Figure 30A:
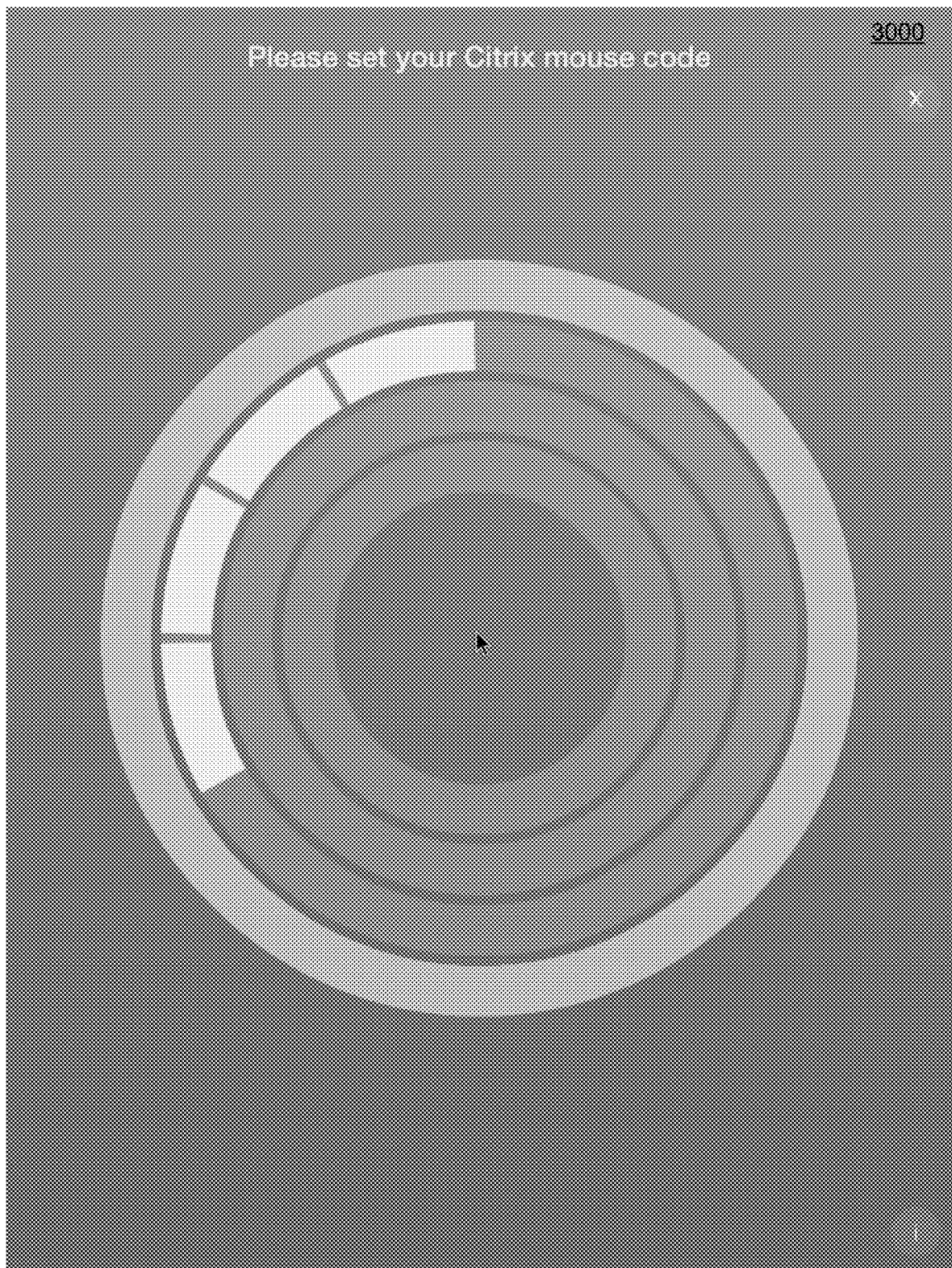
FIGS. 30A-C illustrate example display screens for setting a mouse wheel authentication code in accordance with one or more illustrative aspects described herein.
Figure 30B:
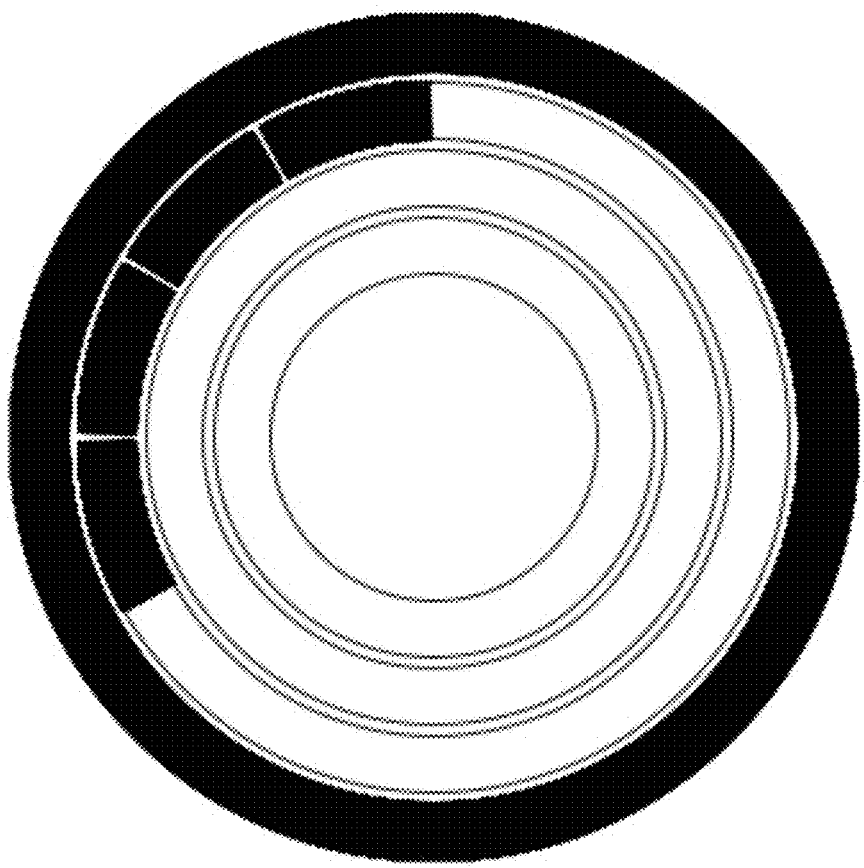
Figure 30C:
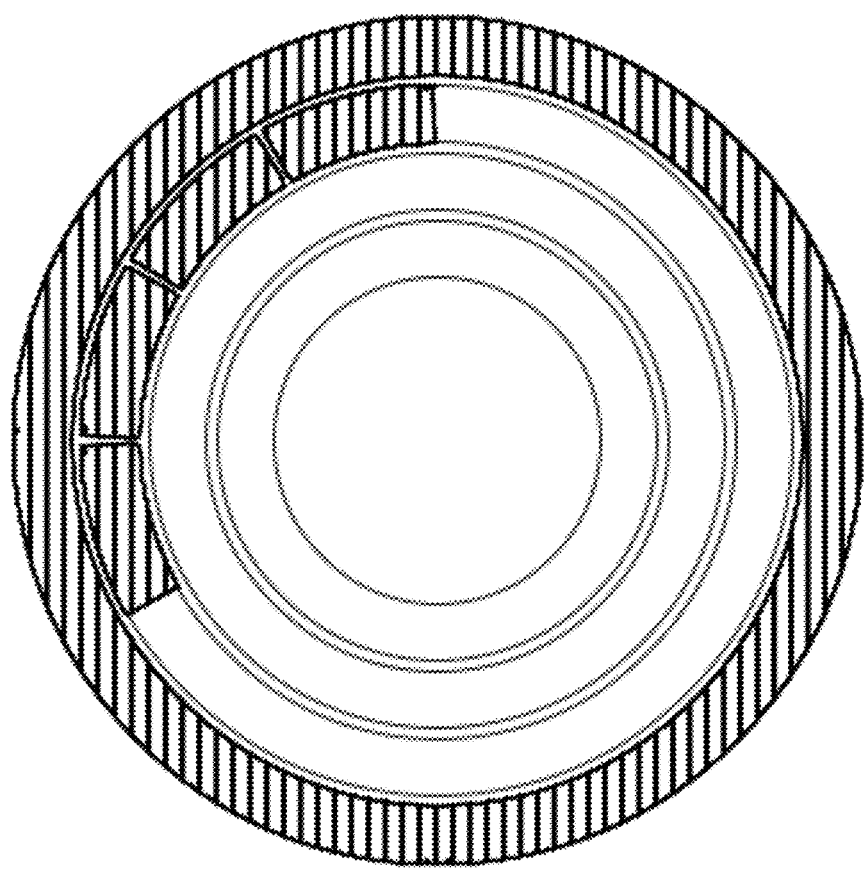

FIGS. 30A-C illustrate example display screens 3000, 3020, and 3040 for setting a mouse wheel authentication code in accordance with one or more illustrative aspects described herein.

Figure 31:
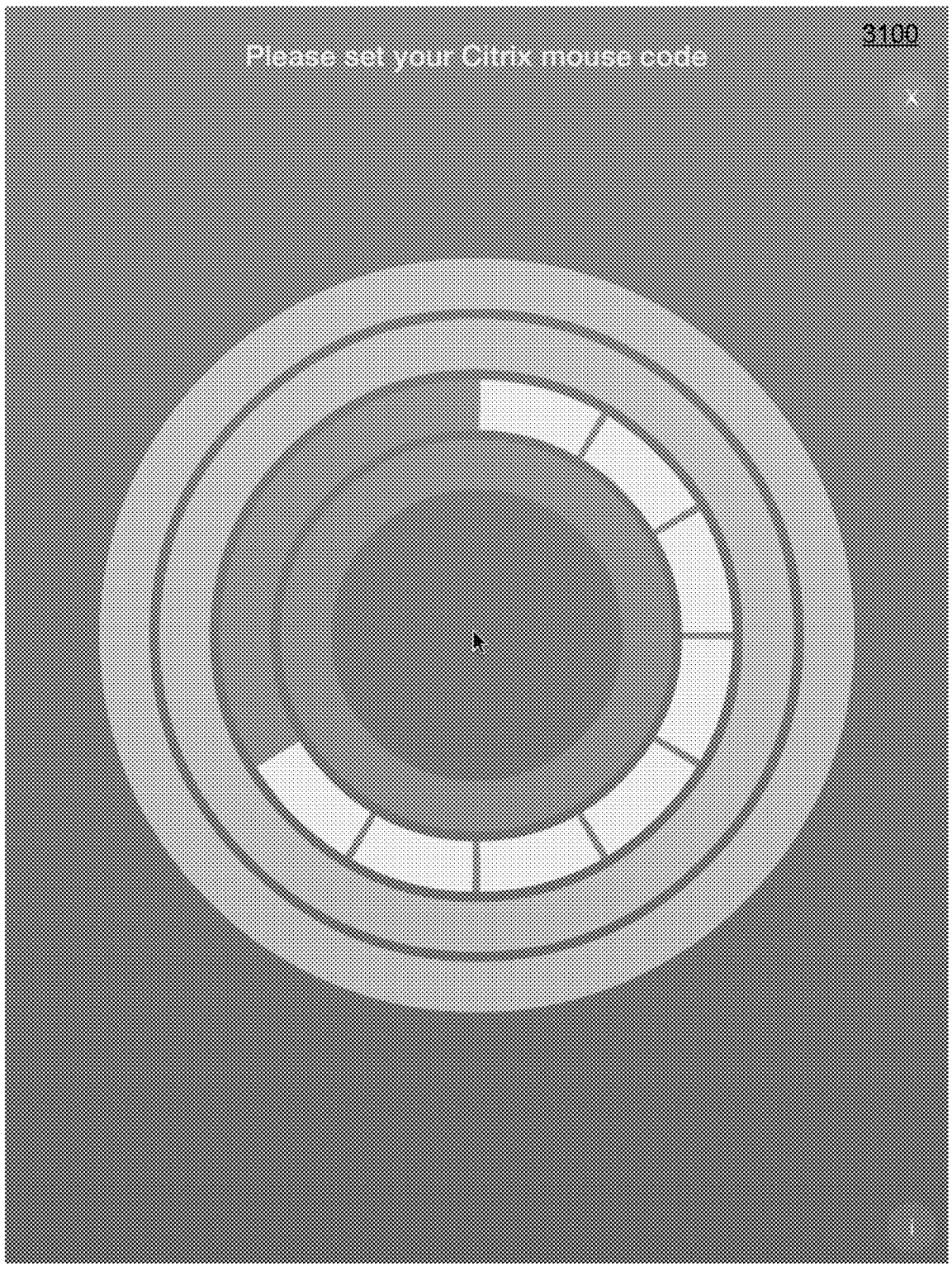
FIG. 31 illustrates an example display screen for setting a mouse wheel authentication code in accordance with one or more illustrative aspects described herein.

FIG. 31 illustrates an example display screen 3100 for setting a mouse wheel authentication code in accordance with one or more illustrative aspects described herein.

Figure 32:
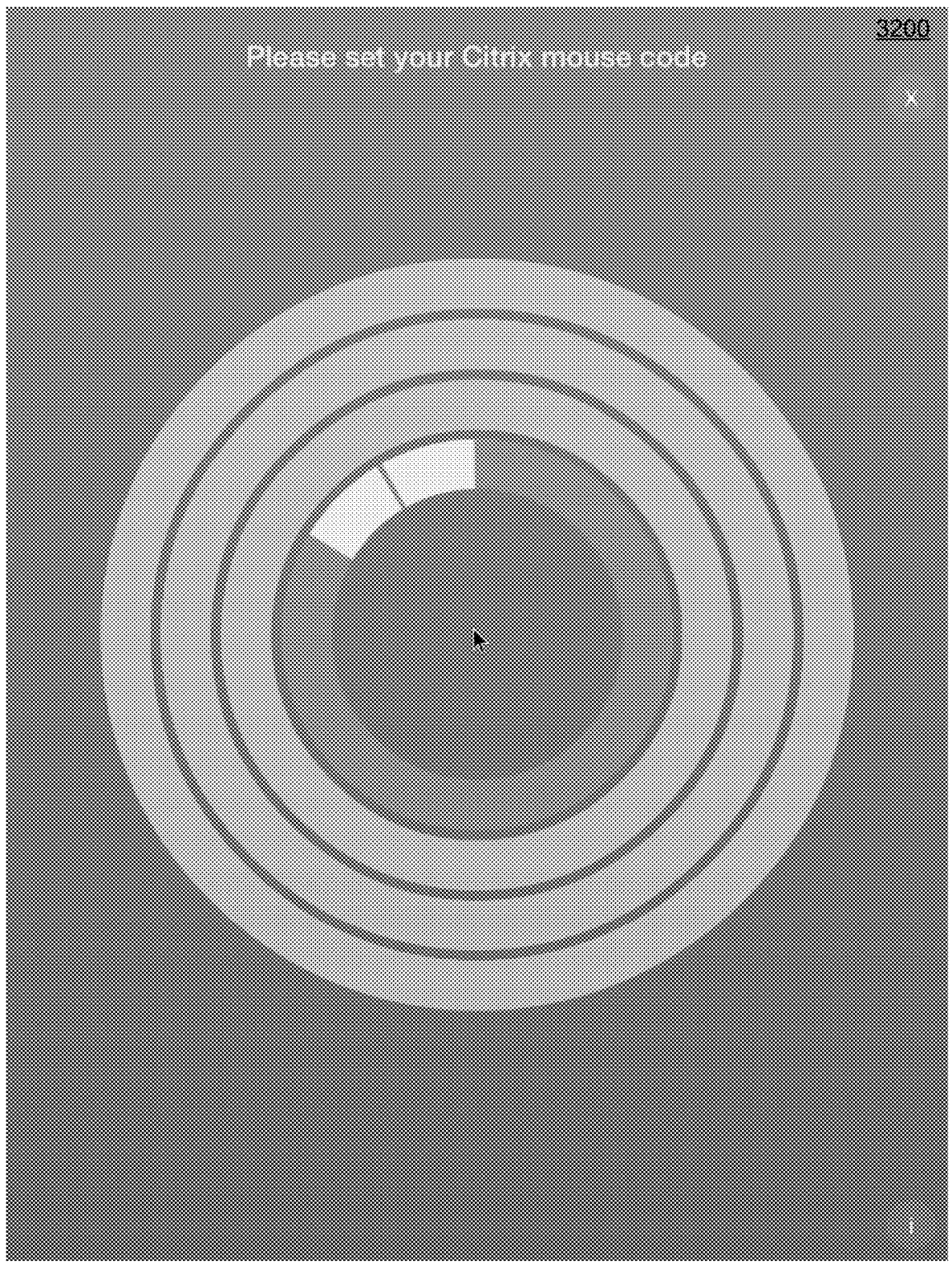
FIG. 32 illustrates an example display screen for setting a mouse wheel authentication code in accordance with one or more illustrative aspects described herein.

FIG. 32 illustrates an example display screen 3200 for setting a mouse wheel authentication code in accordance with one or more illustrative aspects described herein.

Figure 33:
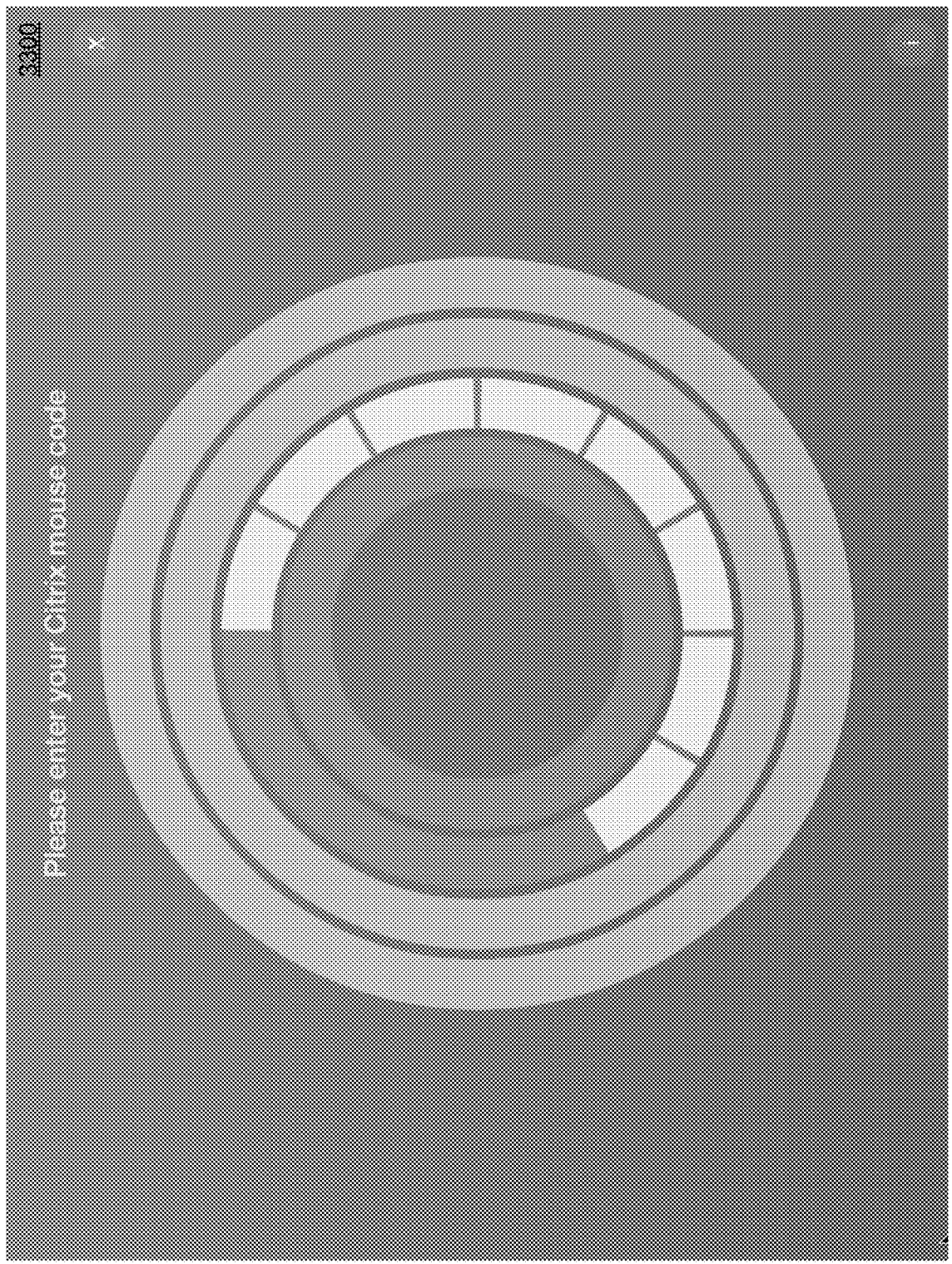
FIG. 33 illustrates an example display screen for entering a mouse wheel authentication code in accordance with one or more illustrative aspects described herein.

FIG. 33 illustrates an example display screen 3300 for entering a mouse wheel authentication code in accordance with one or more illustrative aspects described herein.

Figure 34:
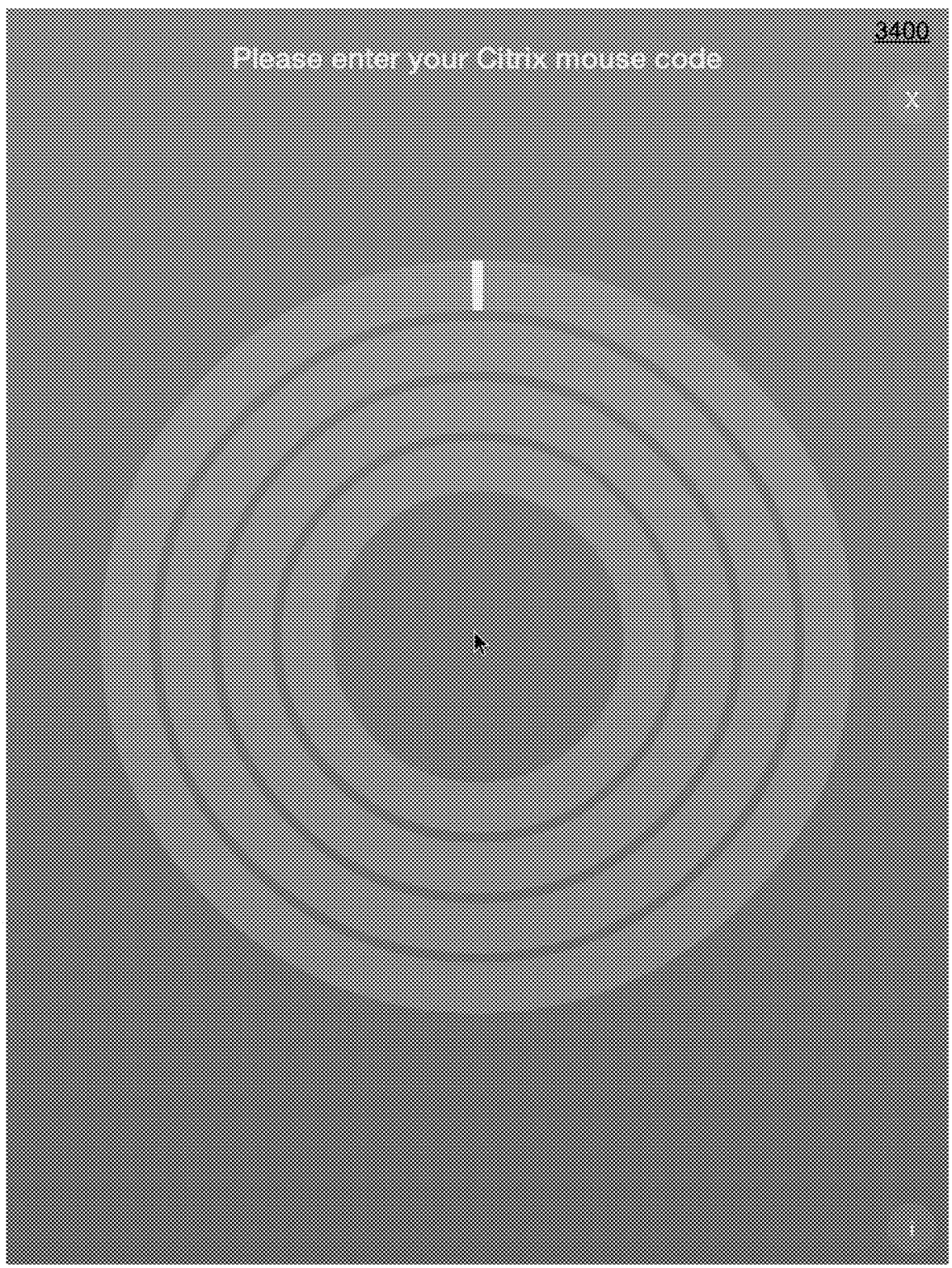
FIG. 34 illustrates an example display screen for entering a mouse wheel authentication code in accordance with one or more illustrative aspects described herein.

FIG. 34 illustrates an example display screen 3400 for entering a mouse wheel authentication code in accordance with one or more illustrative aspects described herein.

Figure 35A:
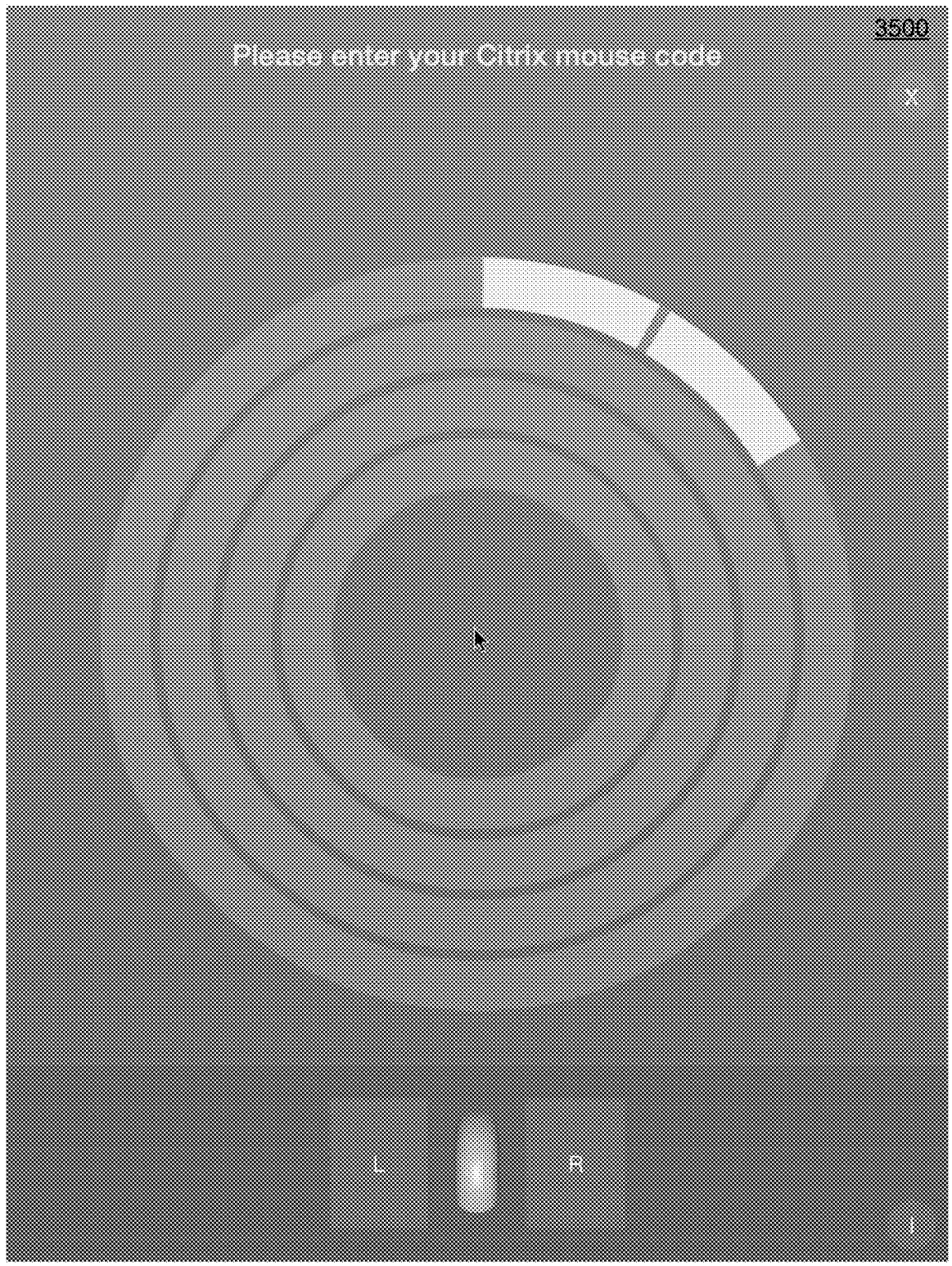

FIGS. 35A-C illustrate example display screens 3500, 3520, and 3540 for entering a mouse wheel authentication code in accordance with one or more illustrative aspects described herein.

Figure 36:
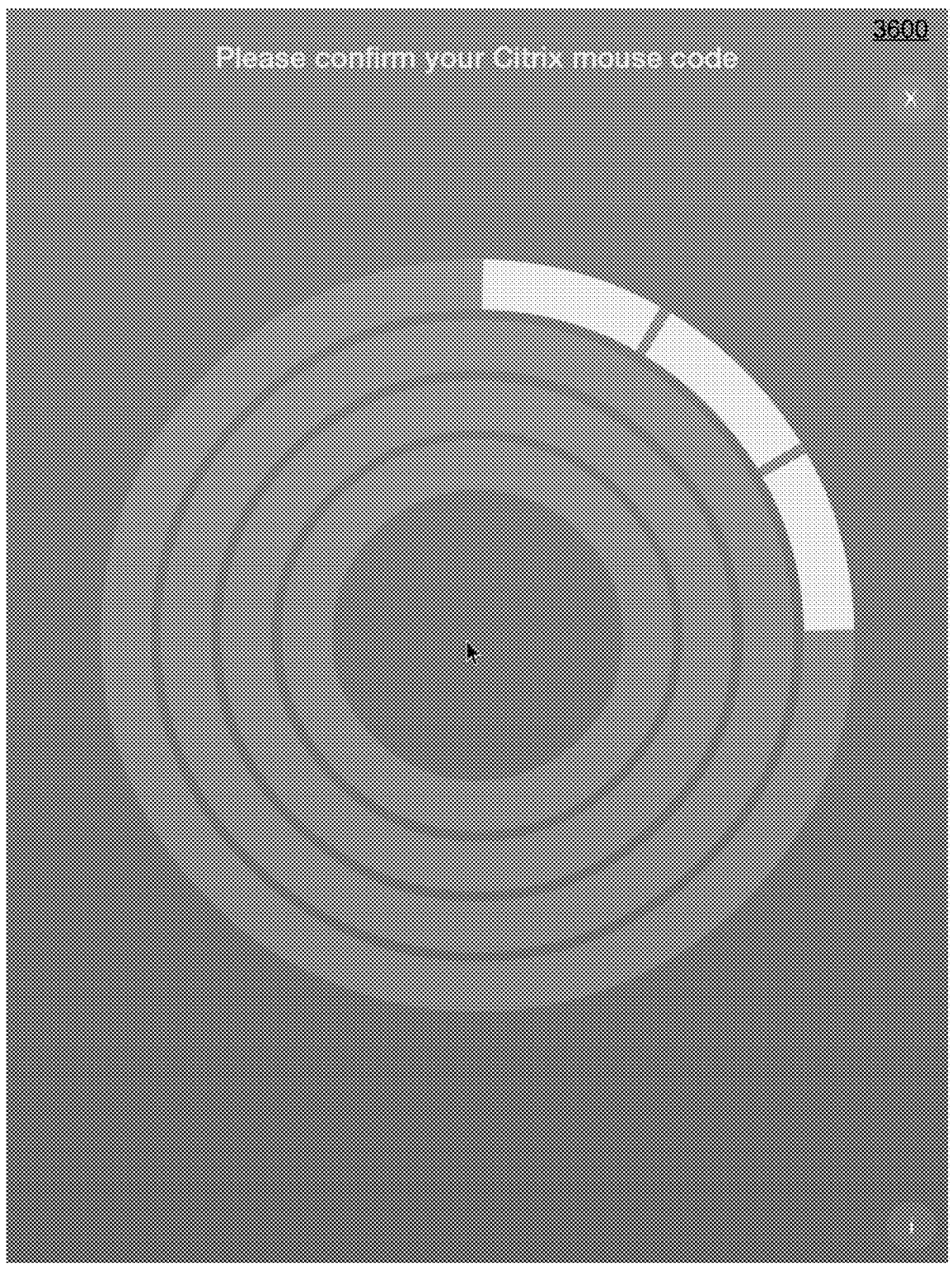
FIG. 36 illustrates an example display screen for confirming a mouse wheel authentication code in accordance with one or more illustrative aspects described herein.

FIG. 36 illustrates an example display screen 3600 for confirming a mouse wheel authentication code in accordance with one or more illustrative aspects described herein.

Figure 37:
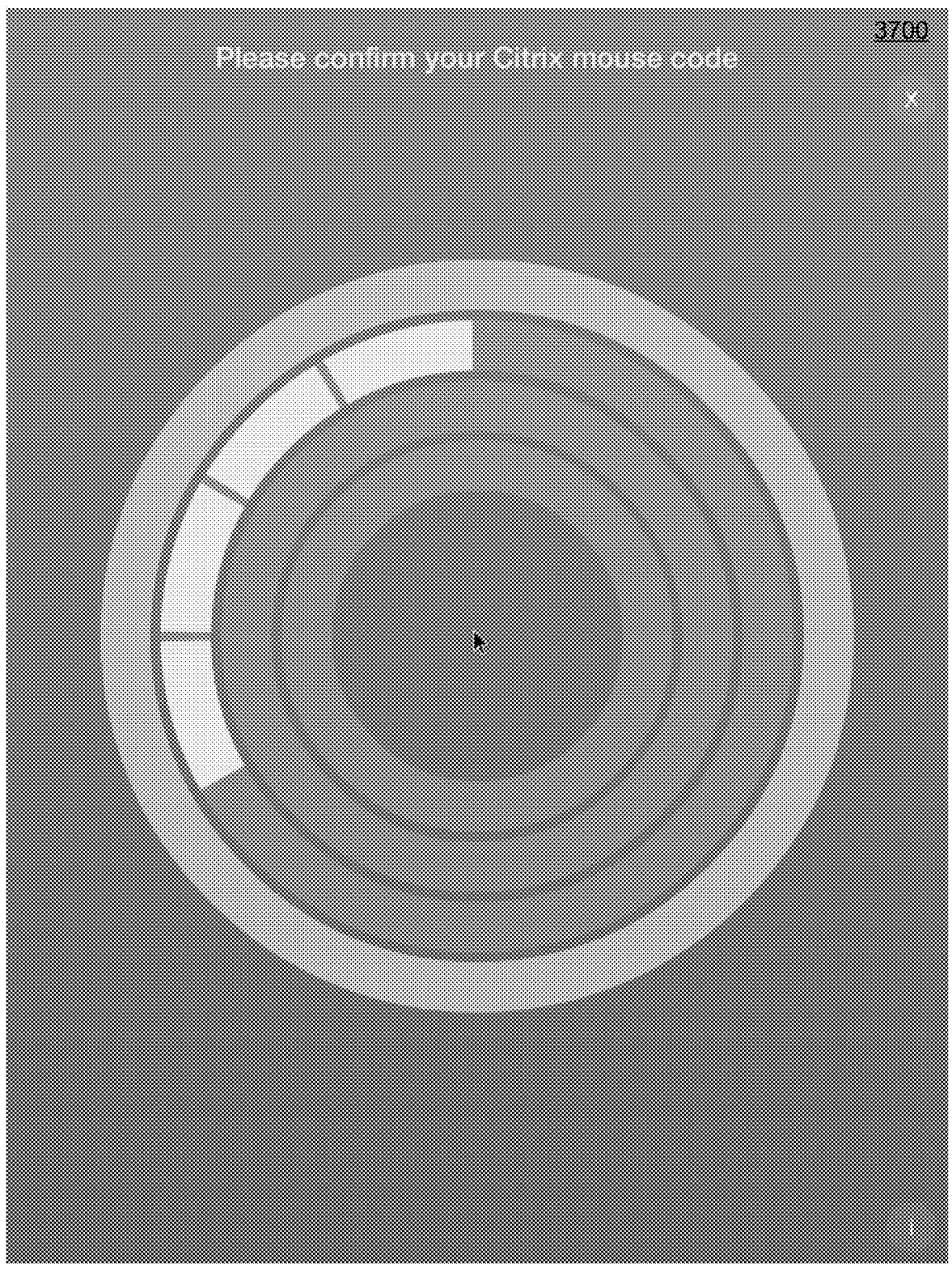
FIG. 37 illustrates an example display screen for confirming a mouse wheel authentication code in accordance with one or more illustrative aspects described herein.

FIG. 37 illustrates an example display screen 3700 for confirming a mouse wheel authentication code in accordance with one or more illustrative aspects described herein.

Figure 38:
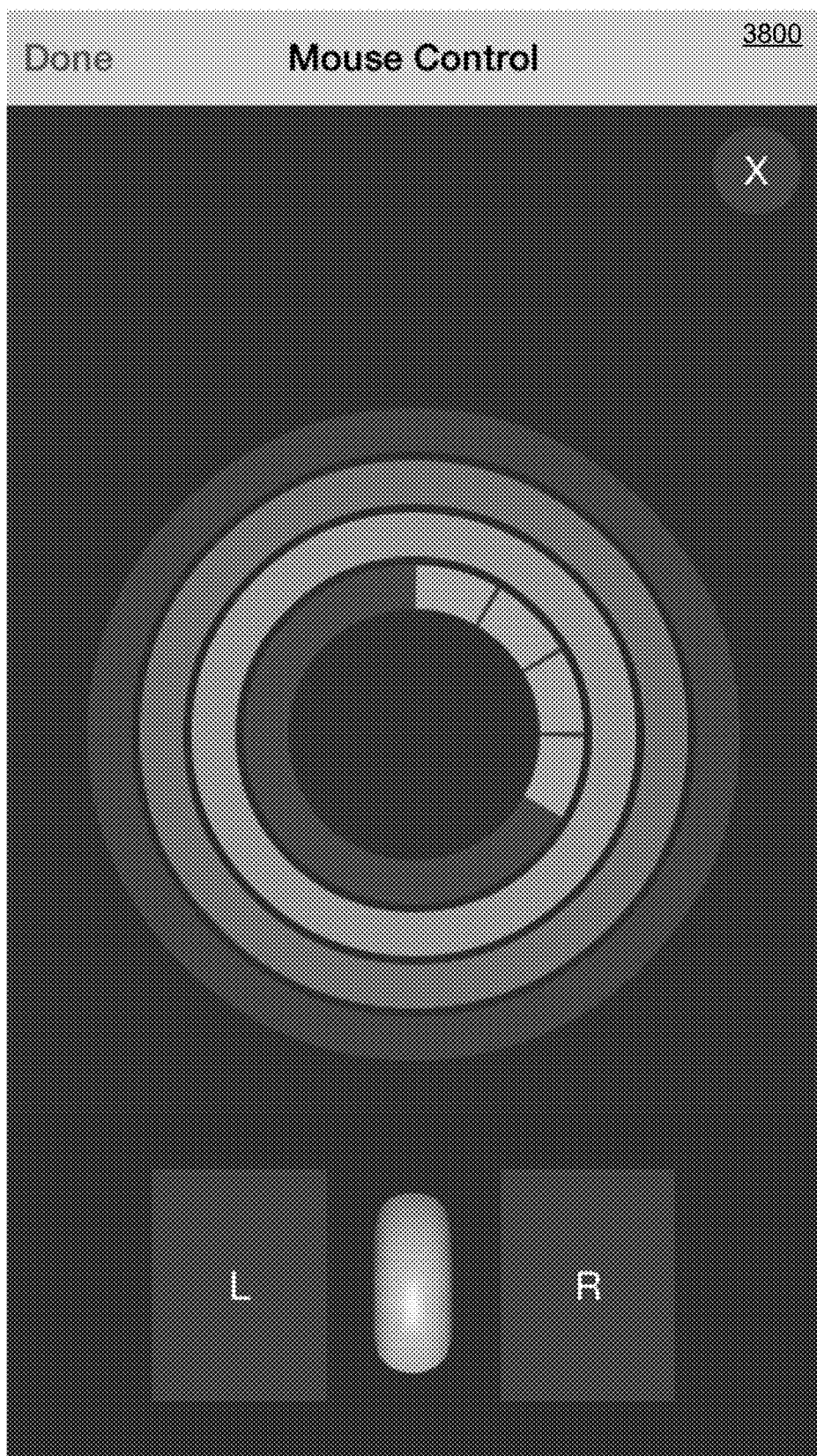
FIG. 38 illustrates an example display screen for a color scheme for a mouse wheel authentication in accordance with one or more illustrative aspects described herein.

FIG. 38 illustrates an example display screen 3800 for a color scheme for a mouse wheel authentication in accordance with one or more illustrative aspects described herein.

Figure 39A:
FIGS. 39A-C illustrate example devices or display screens for setting an authentication code on a device in accordance with one or more illustrative aspects described herein.
Figure 39B:
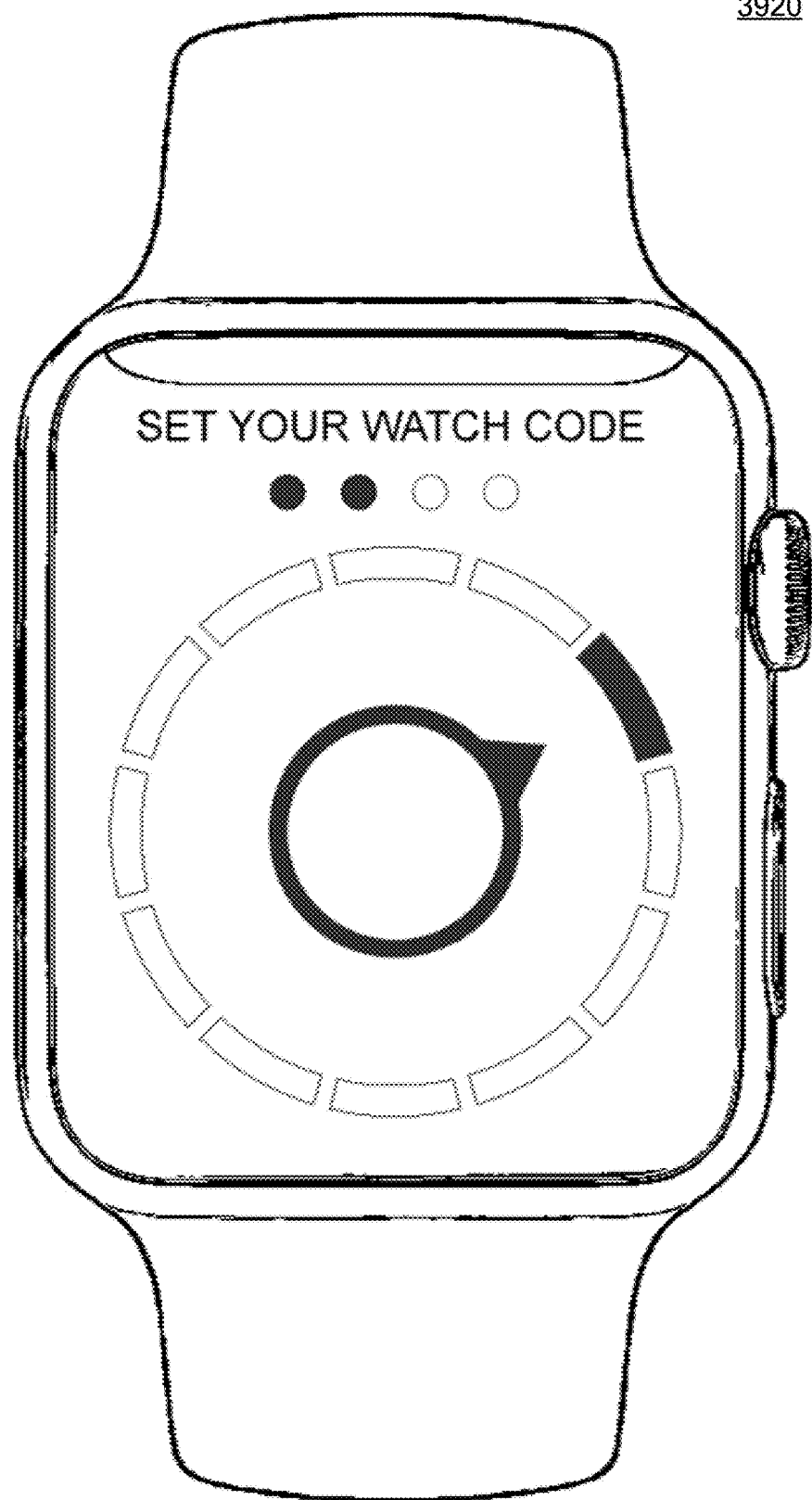
Figure 39C:
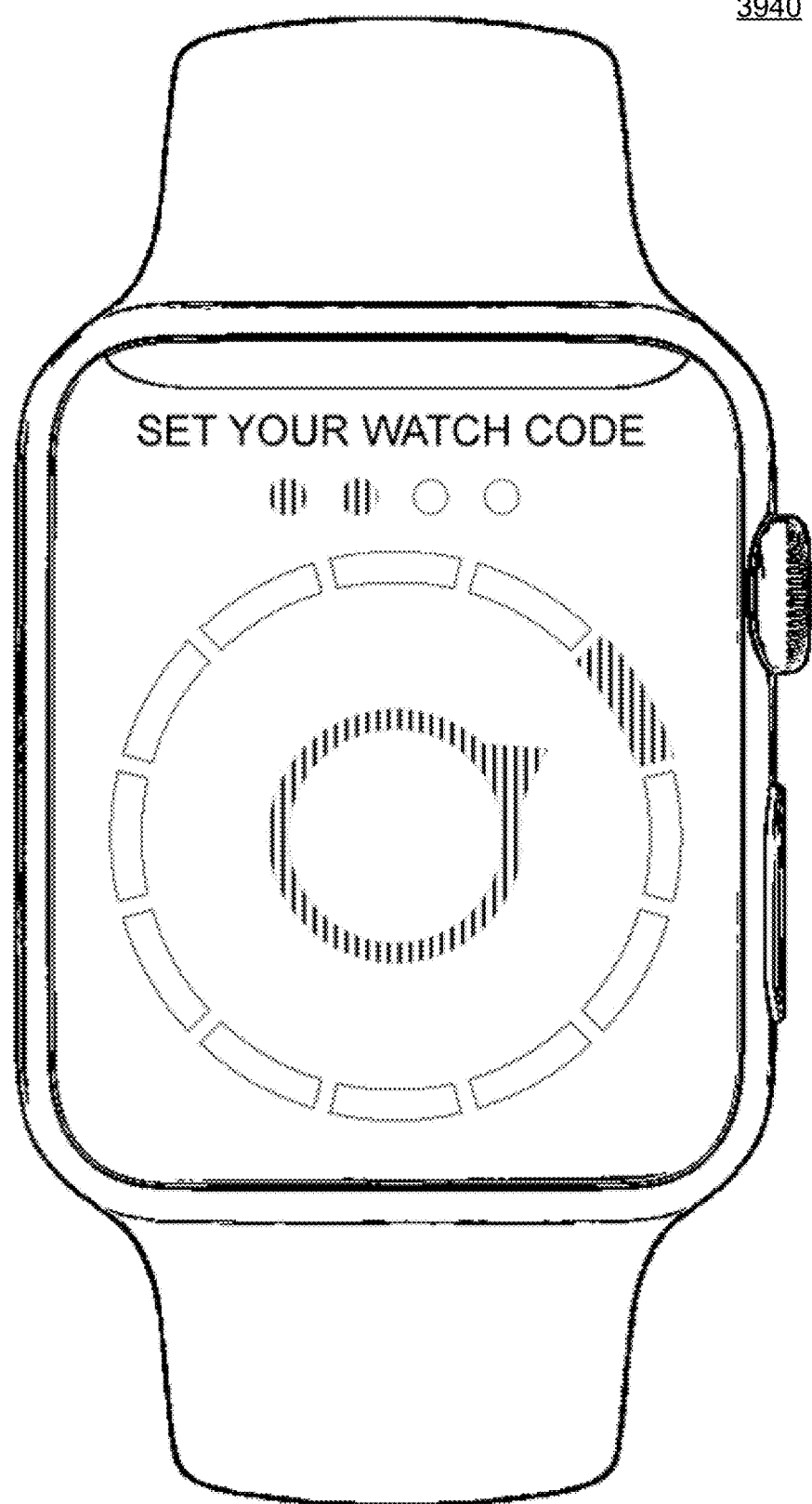

FIGS. 39A-C illustrate example devices or display screens 3900, 3920, and 3940 for setting an authentication code on a device in accordance with one or more illustrative aspects described herein.

Figure 40A:
FIGS. 40A-B illustrate example devices or display screens for entering an authentication code on a device in accordance with one or more illustrative aspects described herein.
Figure 40B:
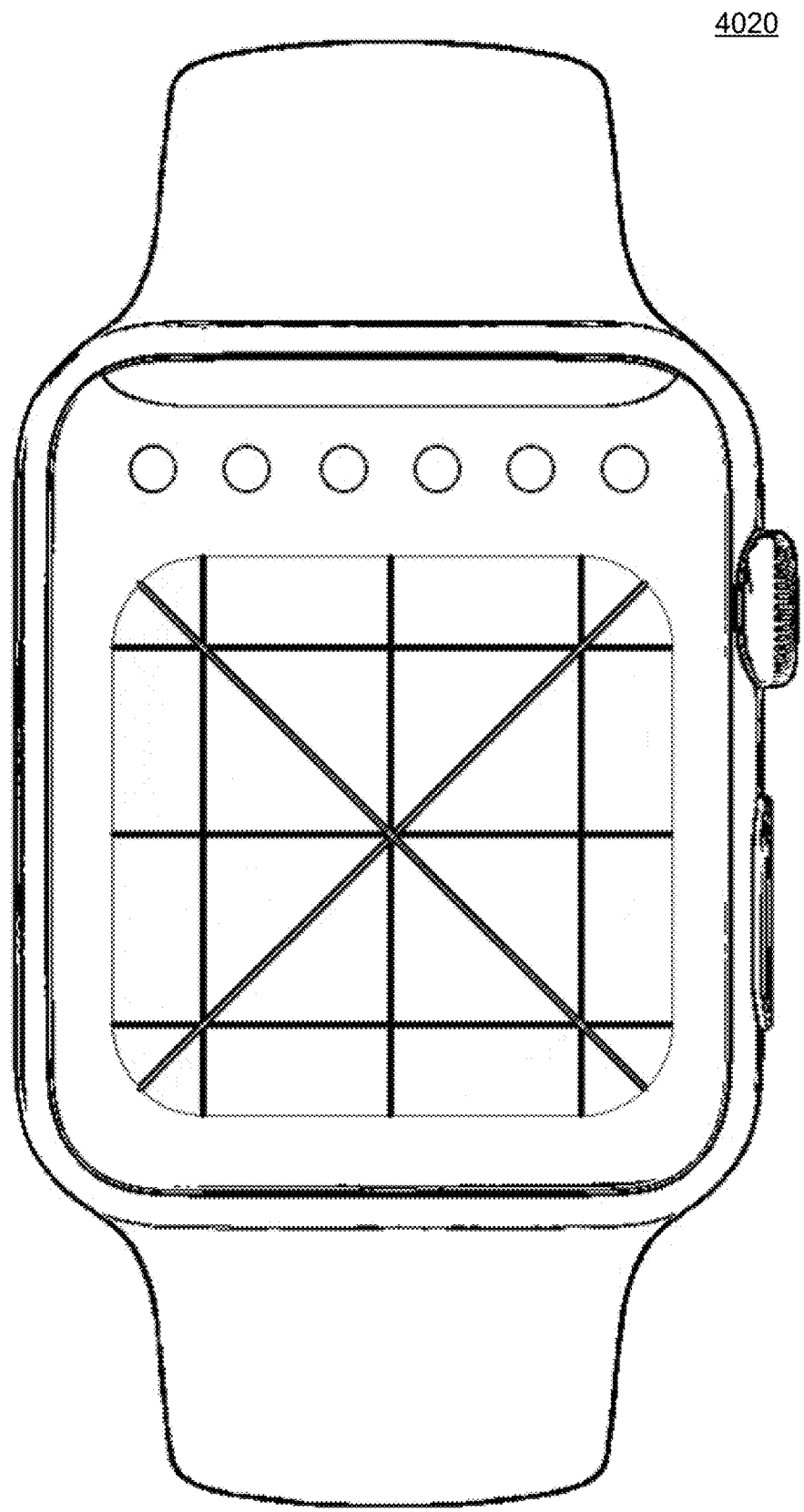

FIGS. 40A-B illustrate example devices or display screens 4000 and 4020 for entering an authentication code on a device in accordance with one or more illustrative aspects described herein.

Figure 41:
FIG. 41 illustrates an example device or display screen for entering an authentication code on a device in accordance with one or more illustrative aspects described herein.

FIG. 41 illustrates an example device or display screen 4100 for entering an authentication code on a device in accordance with one or more illustrative aspects described herein.

Figure 42A:
FIGS. 42A-C illustrate example devices or display screens for entering an authentication code on a device in accordance with one or more illustrative aspects described herein.
Figure 42B:
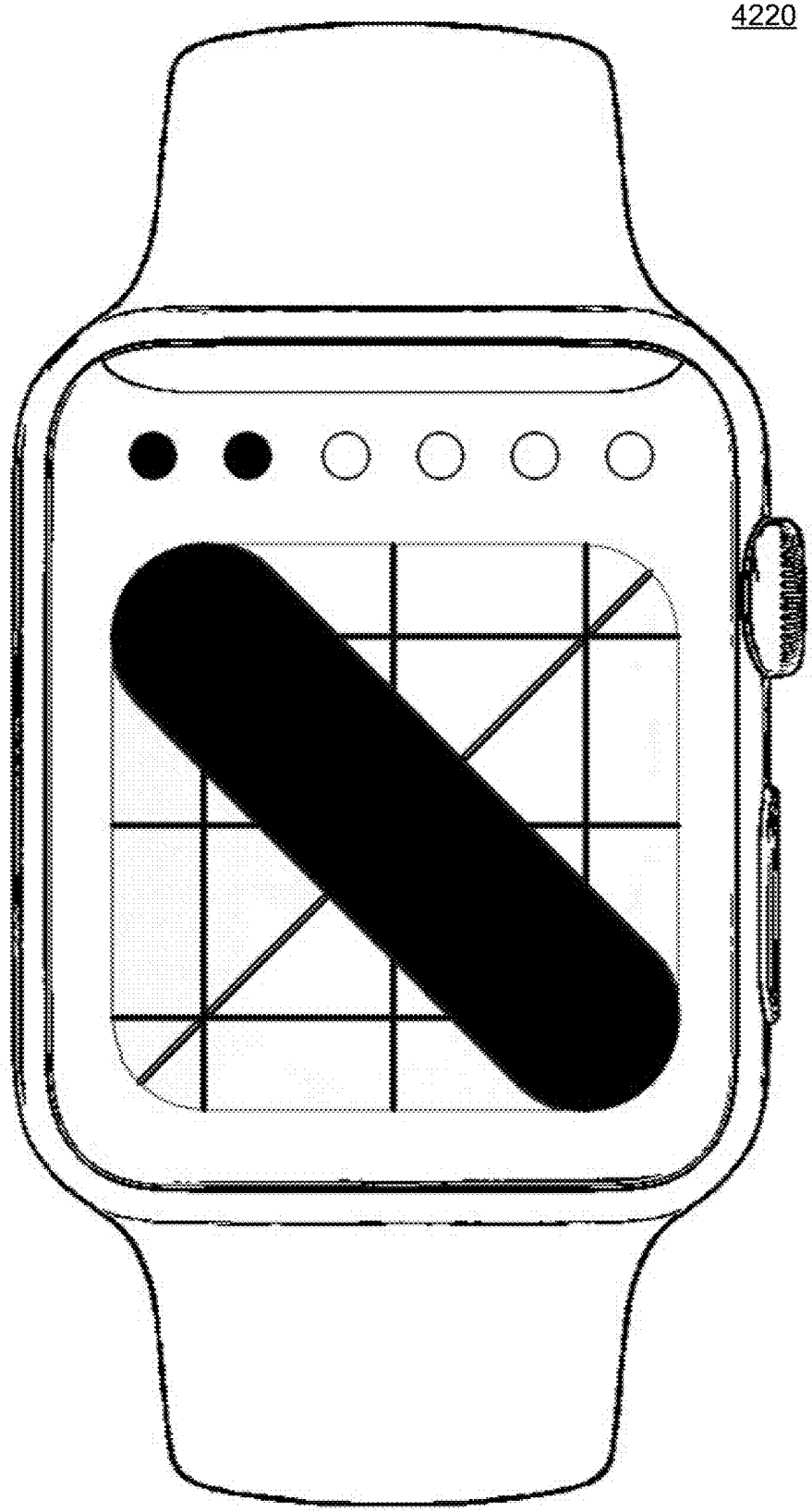
Figure 42C:
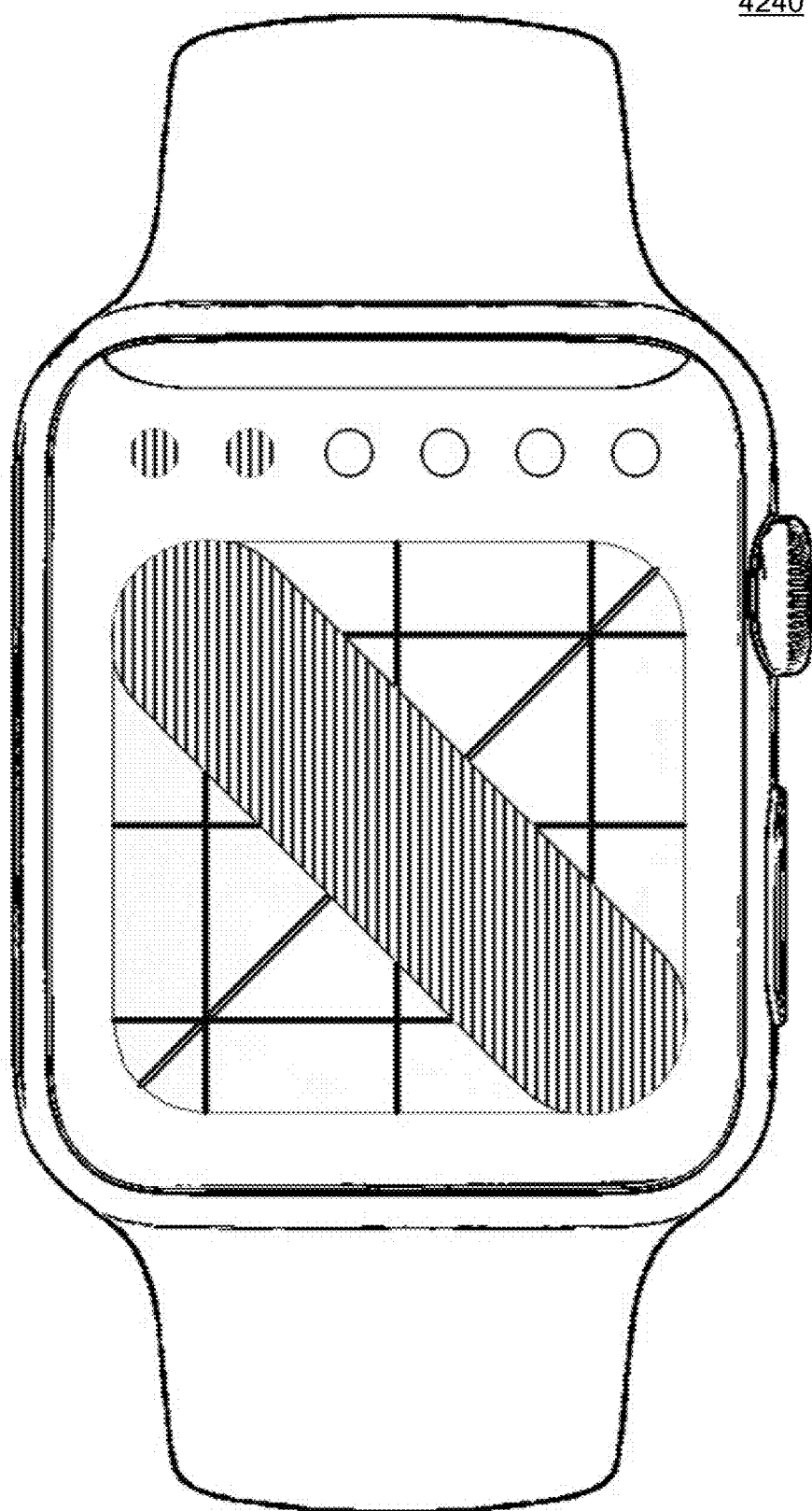

FIGS. 42A-C illustrate example devices or display screens 4200, 4220, and 4240 for entering an authentication code on a device in accordance with one or more illustrative aspects described herein.

Figure 43:
FIG. 43 illustrates an example display device or screen for entering an authentication code on a device in accordance with one or more illustrative aspects described herein.

FIG. 43 illustrates an example display device or screen 4300 for entering an authentication code on a device in accordance with one or more illustrative aspects described herein.

Figure 44:
FIG. 44 illustrates an example device or display screen for voice authentication on a device in accordance with one or more illustrative aspects described herein.

FIG. 44 illustrates an example device or display screen 4400 for voice authentication on a device in accordance with one or more illustrative aspects described herein.

Figure 45A:
FIGS. 45A-B illustrate example devices or display screens for voice authentication on a device in accordance with one or more illustrative aspects described herein.
Figure 45B:

FIGS. 45A-B illustrate example devices or display screens 4500 and 4520 for voice authentication on a device in accordance with one or more illustrative aspects described herein.

Figure 46:
FIG. 46 illustrates an example device or display screen for voice authentication on a device in accordance with one or more illustrative aspects described herein.

FIG. 46 illustrates an example device or display screen 4600 for voice authentication on a device in accordance with one or more illustrative aspects described herein.

Figure 47:
FIG. 47 illustrates an example display screen for setting a device authentication code in accordance with one or more illustrative aspects described herein.

FIG. 47 illustrates an example display screen 4700 for setting a device authentication code in accordance with one or more illustrative aspects described herein.

Figure 48:
FIG. 48 illustrates an example display screen for entering a device authentication code in accordance with one or more illustrative aspects described herein.

FIG. 48 illustrates an example display screen 4800 for entering a device authentication code in accordance with one or more illustrative aspects described herein.

Figure 49:
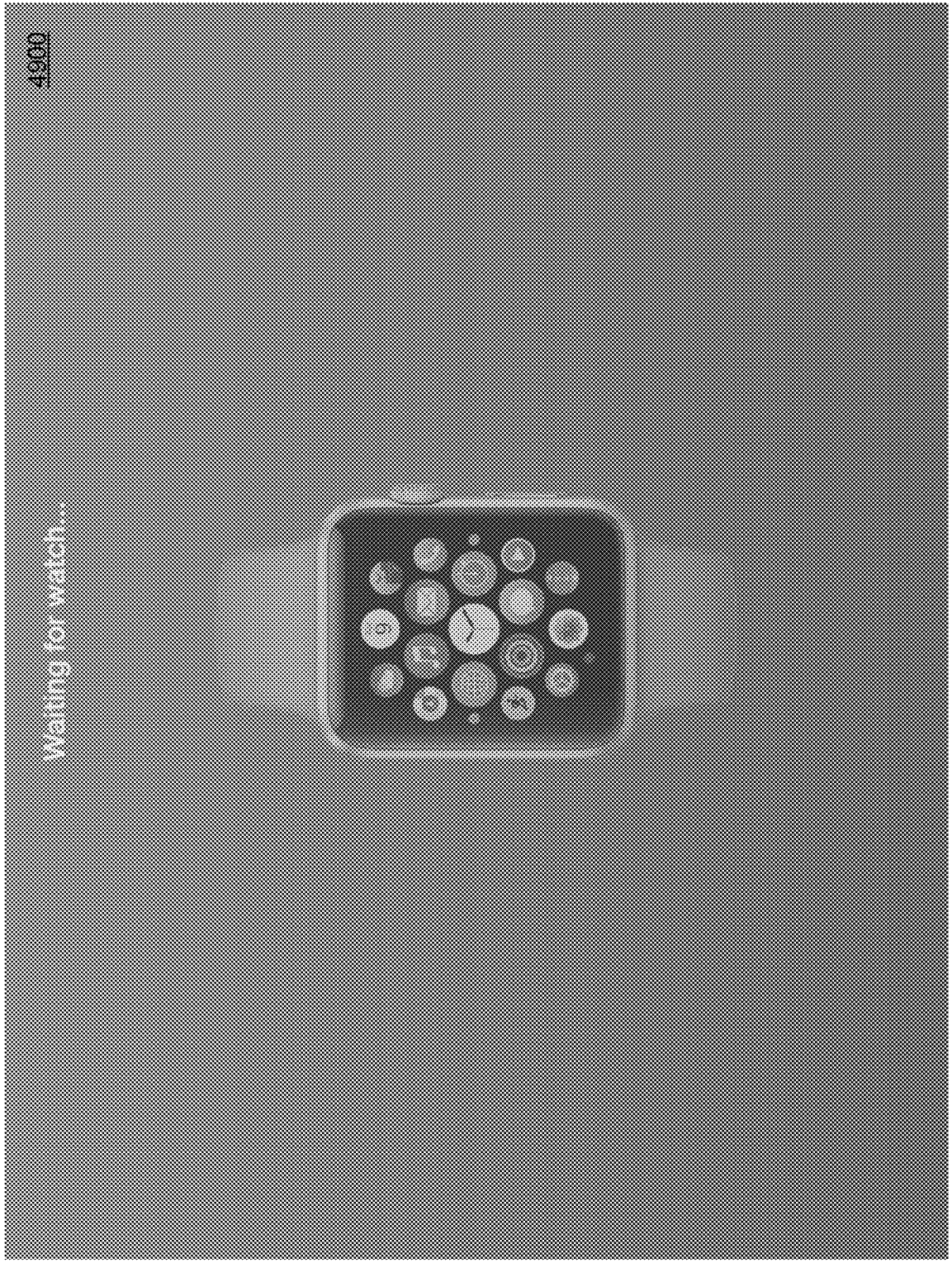
FIG. 49 illustrates an example display screen for waiting for entry of a device authentication code in accordance with one or more illustrative aspects described herein.

FIG. 49 illustrates an example display screen 4900 for waiting for entry of a device authentication code in accordance with one or more illustrative aspects described herein.

Figure 50:
FIG. 50 illustrates an example display screen for confirming a device authentication code in accordance with one or more illustrative aspects described herein.

FIG. 50 illustrates an example display screen 5000 for confirming a device authentication code in accordance with one or more illustrative aspects described herein.

Figure 51:
FIG. 51 illustrates an example display screen for entering a device authentication code in accordance with one or more illustrative aspects described herein.

FIG. 51 illustrates an example display screen 5100 for entering a device authentication code in accordance with one or more illustrative aspects described herein.

Figure 52:
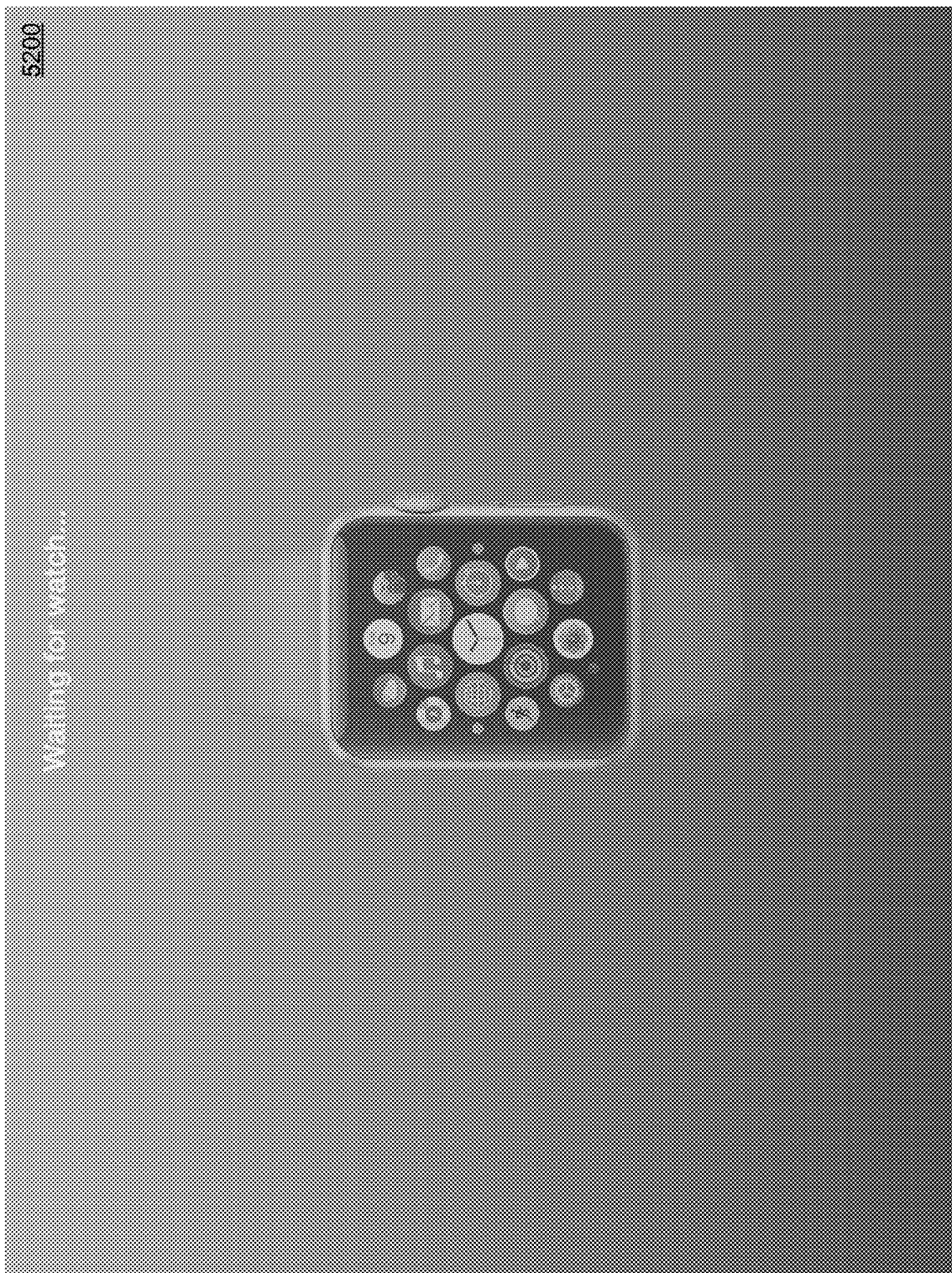
FIG. 52 illustrates an example display screen for waiting for entry of a device authentication code in accordance with one or more illustrative aspects described herein.

FIG. 52 illustrates an example display screen 5200 for waiting for entry of a device authentication code in accordance with one or more illustrative aspects described herein.

Figure 53:
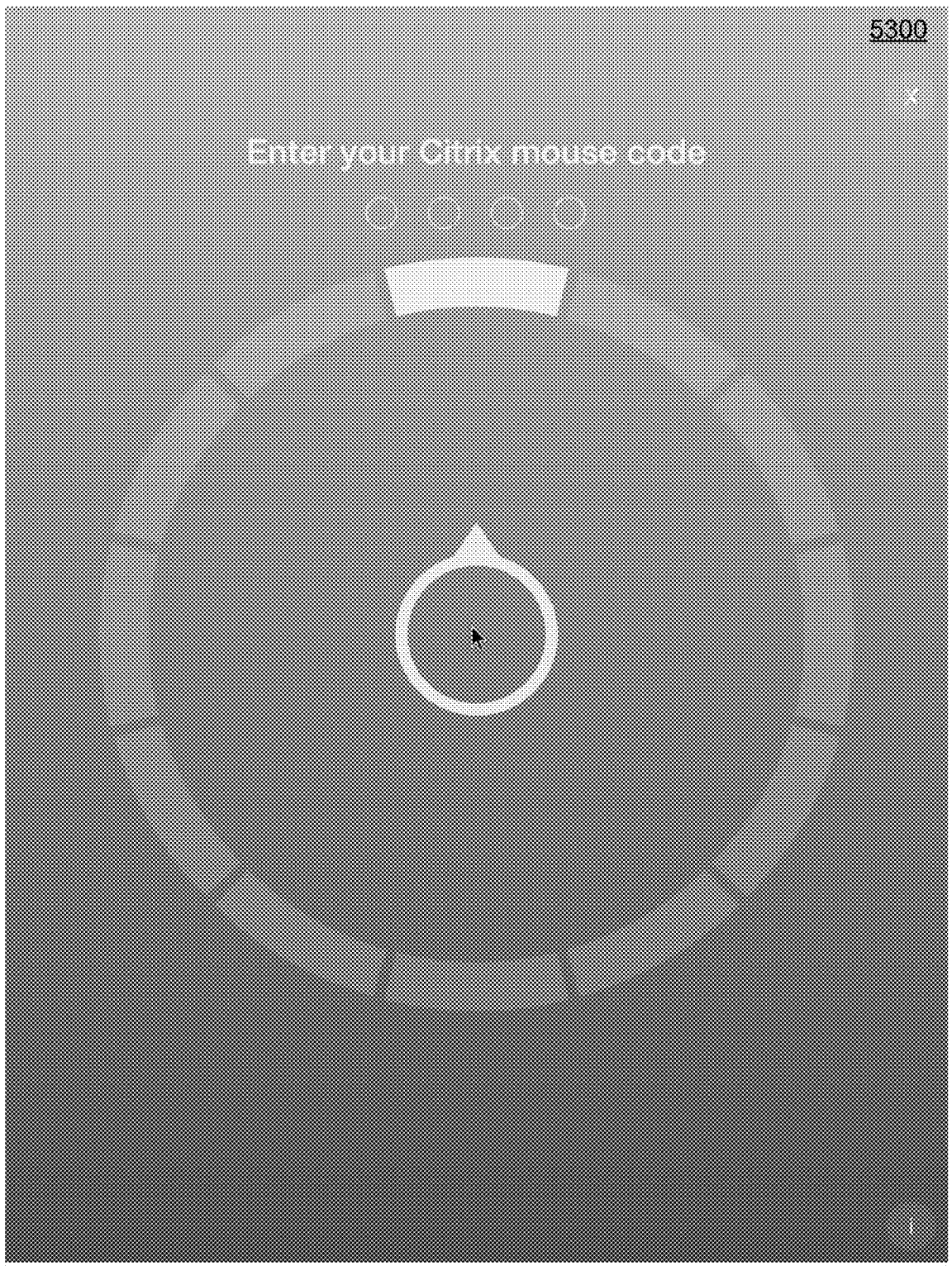
FIG. 53 illustrates an example display screen for entering a mouse wheel authentication code in accordance with one or more illustrative aspects described herein.

FIG. 53 illustrates an example display screen 5300 for entering a mouse wheel authentication code in accordance with one or more illustrative aspects described herein.

Figure 54:
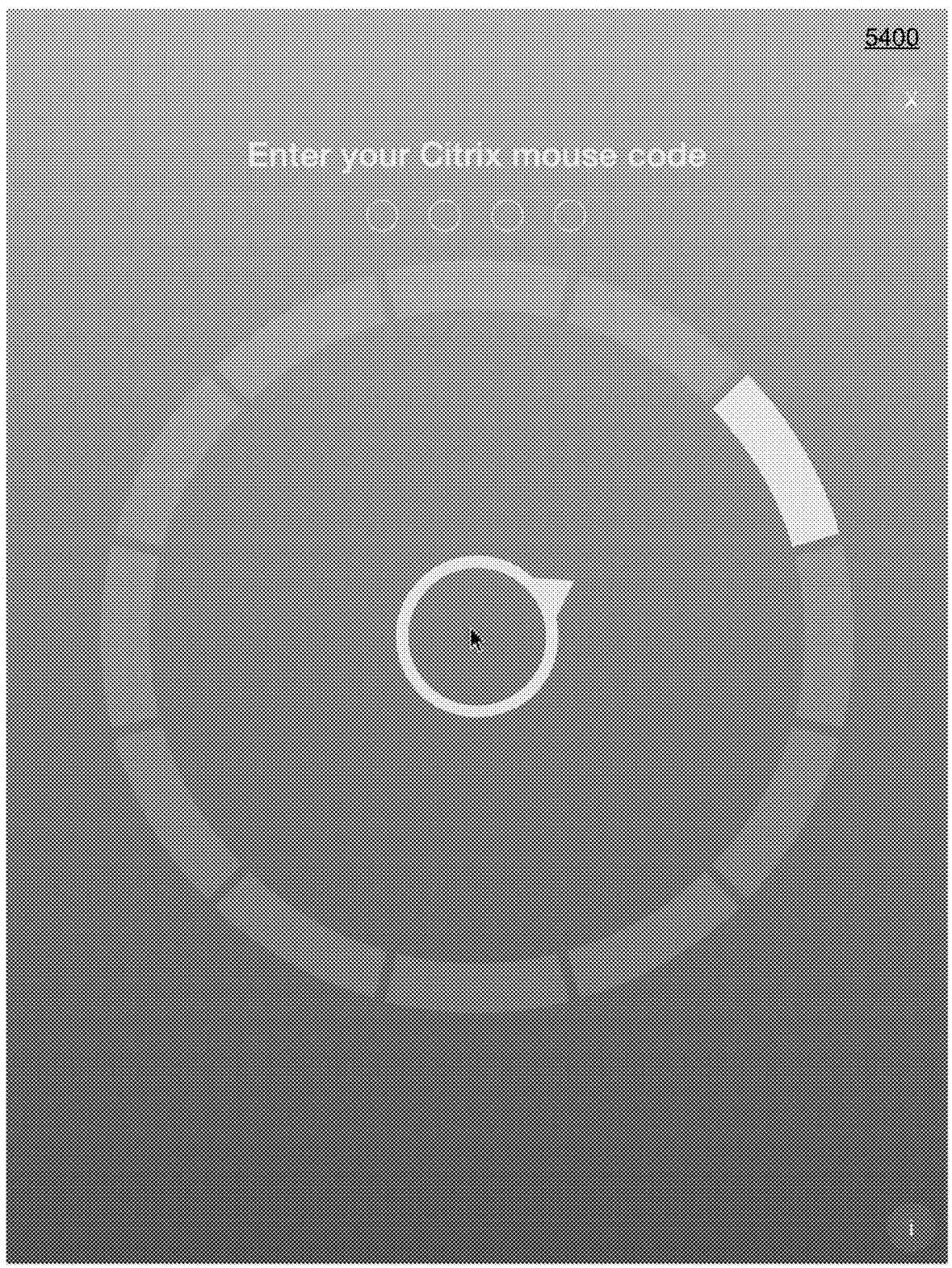
FIG. 54 illustrates an example display screen for entering a mouse wheel authentication code in accordance with one or more illustrative aspects described herein.

FIG. 54 illustrates an example display screen 5400 for entering a mouse wheel authentication code in accordance with one or more illustrative aspects described herein.

Figure 55:
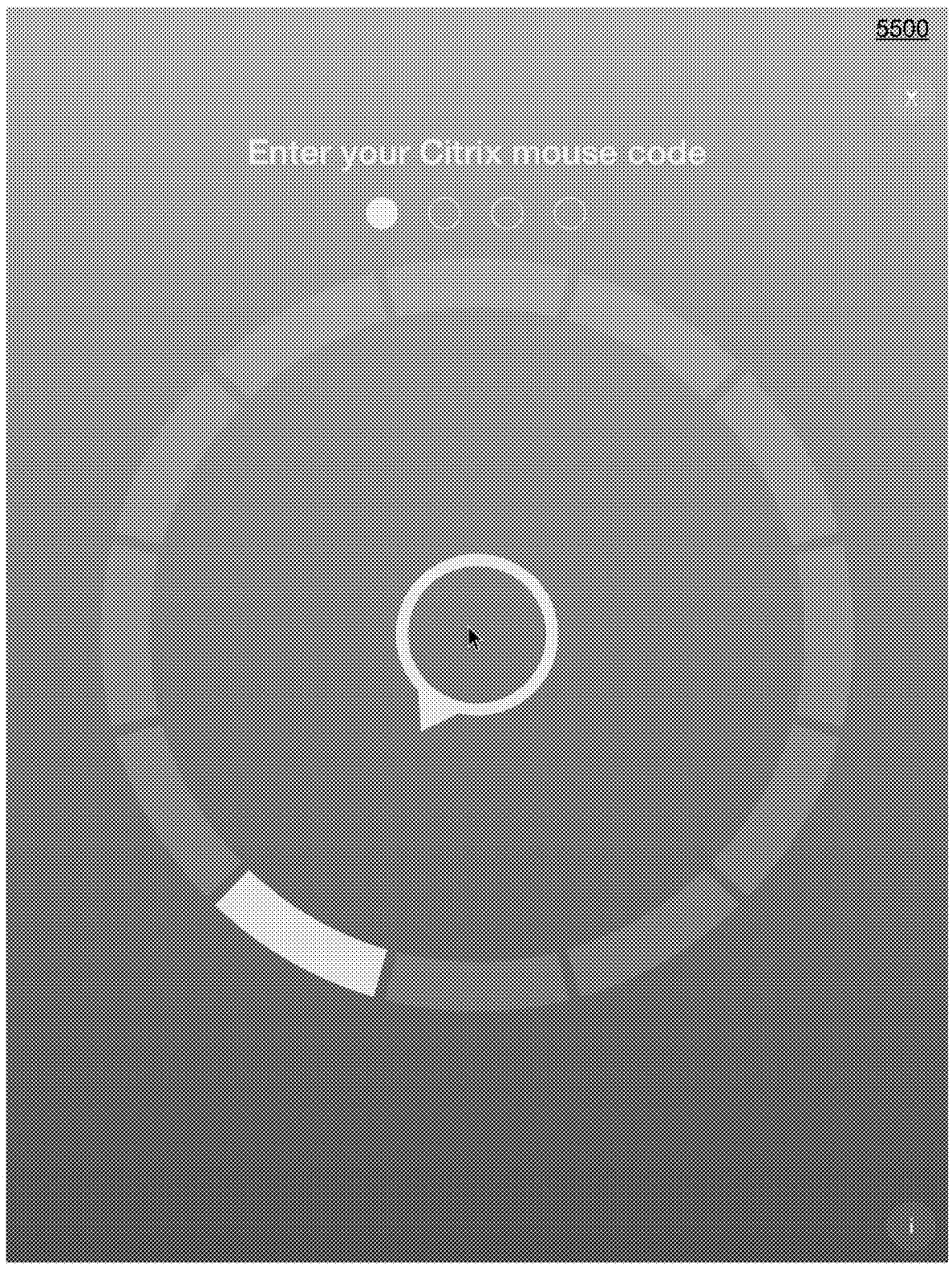
FIG. 55 illustrates an example display screen for entering a mouse wheel authentication code in accordance with one or more illustrative aspects described herein.

FIG. 55 illustrates an example display screen 5500 for entering a mouse wheel authentication code in accordance with one or more illustrative aspects described herein.

Figure 56:
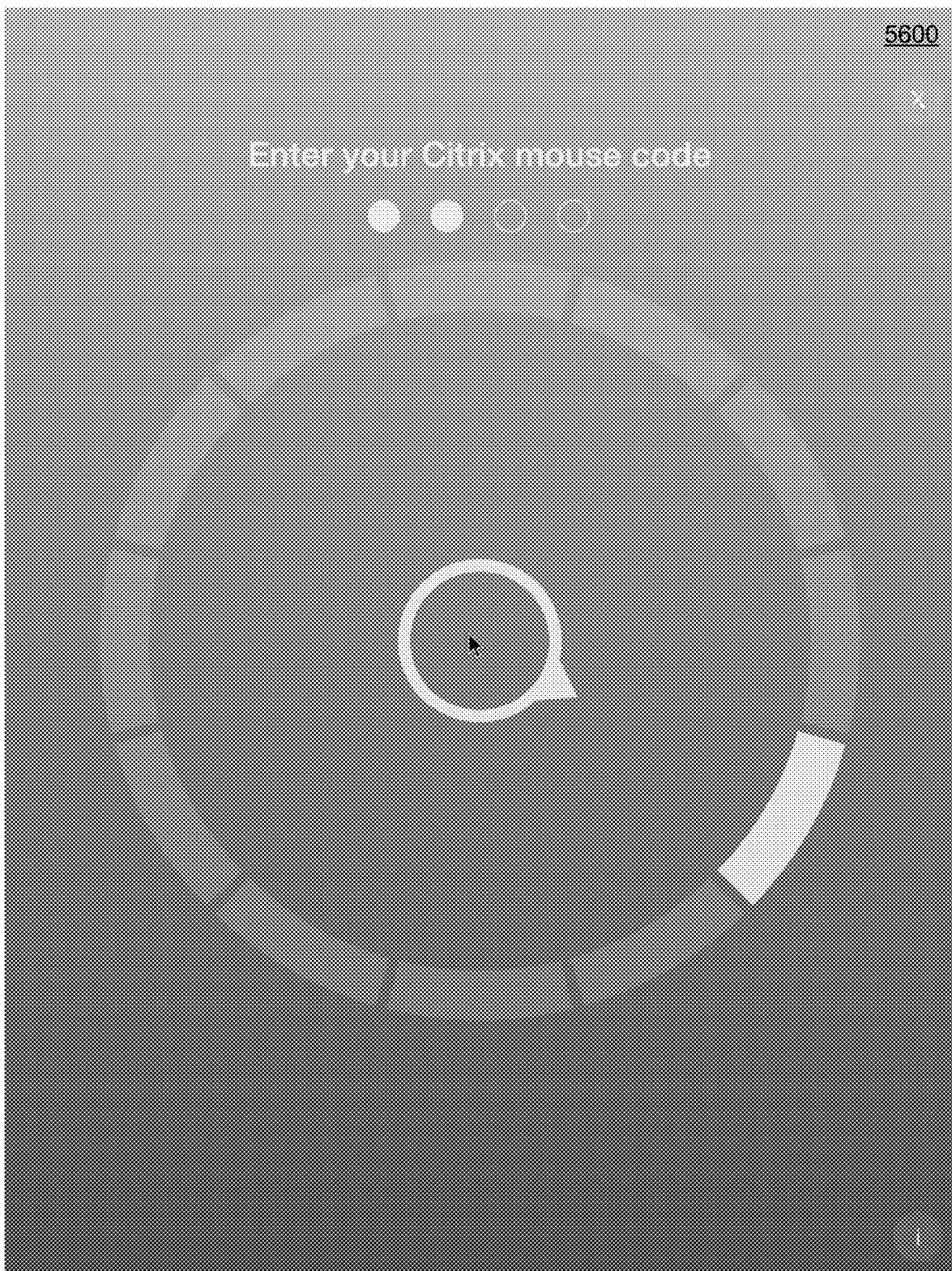
FIG. 56 illustrates an example display screen for entering a mouse wheel authentication code in accordance with one or more illustrative aspects described herein.

FIG. 56 illustrates an example display screen 5600 for entering a mouse wheel authentication code in accordance with one or more illustrative aspects described herein.

Figure 57:
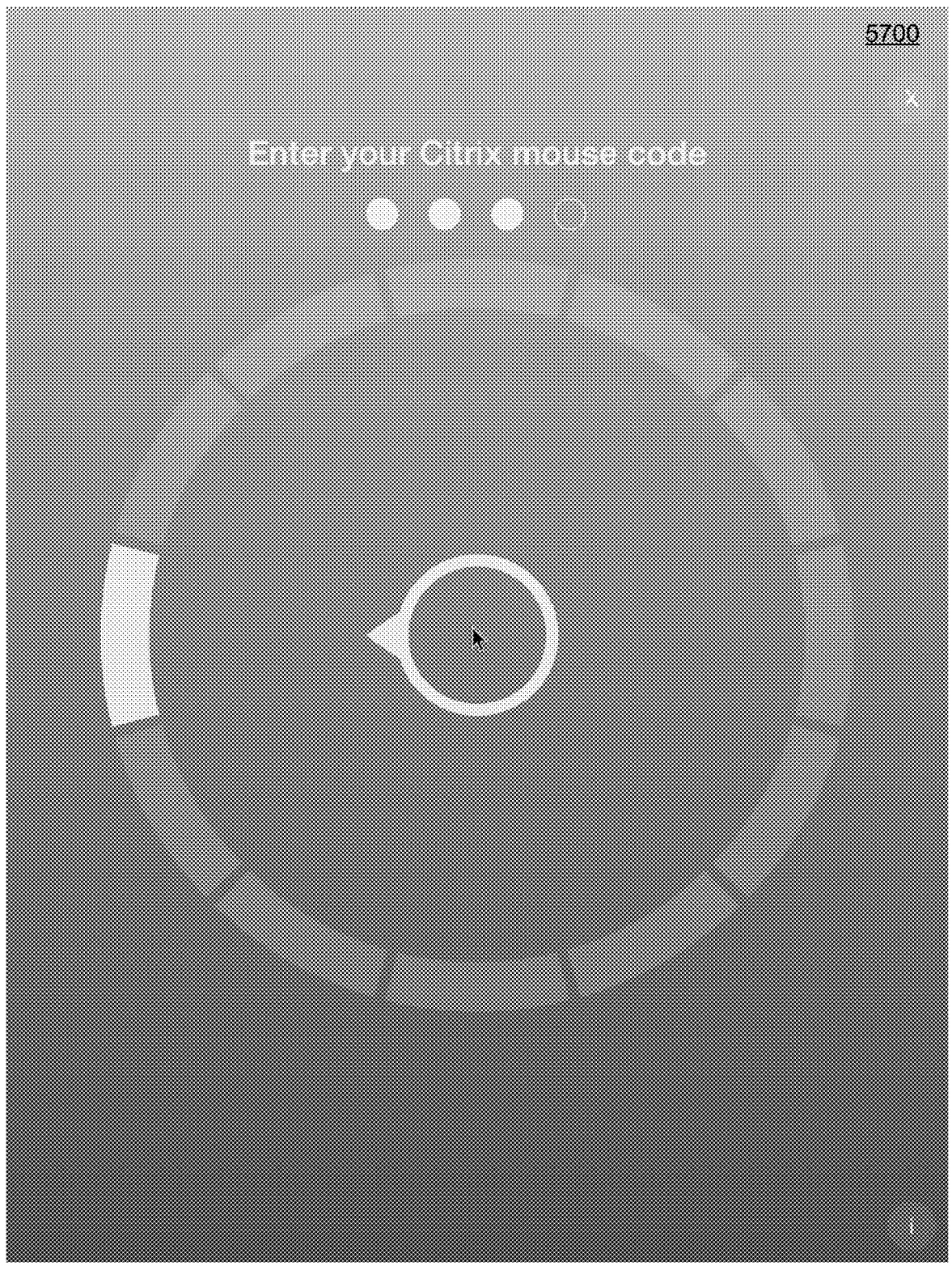
FIG. 57 illustrates an example display screen for entering a mouse wheel authentication code in accordance with one or more illustrative aspects described herein.

FIG. 57 illustrates an example display screen 5700 for entering a mouse wheel authentication code in accordance with one or more illustrative aspects described herein.

Figure 58:
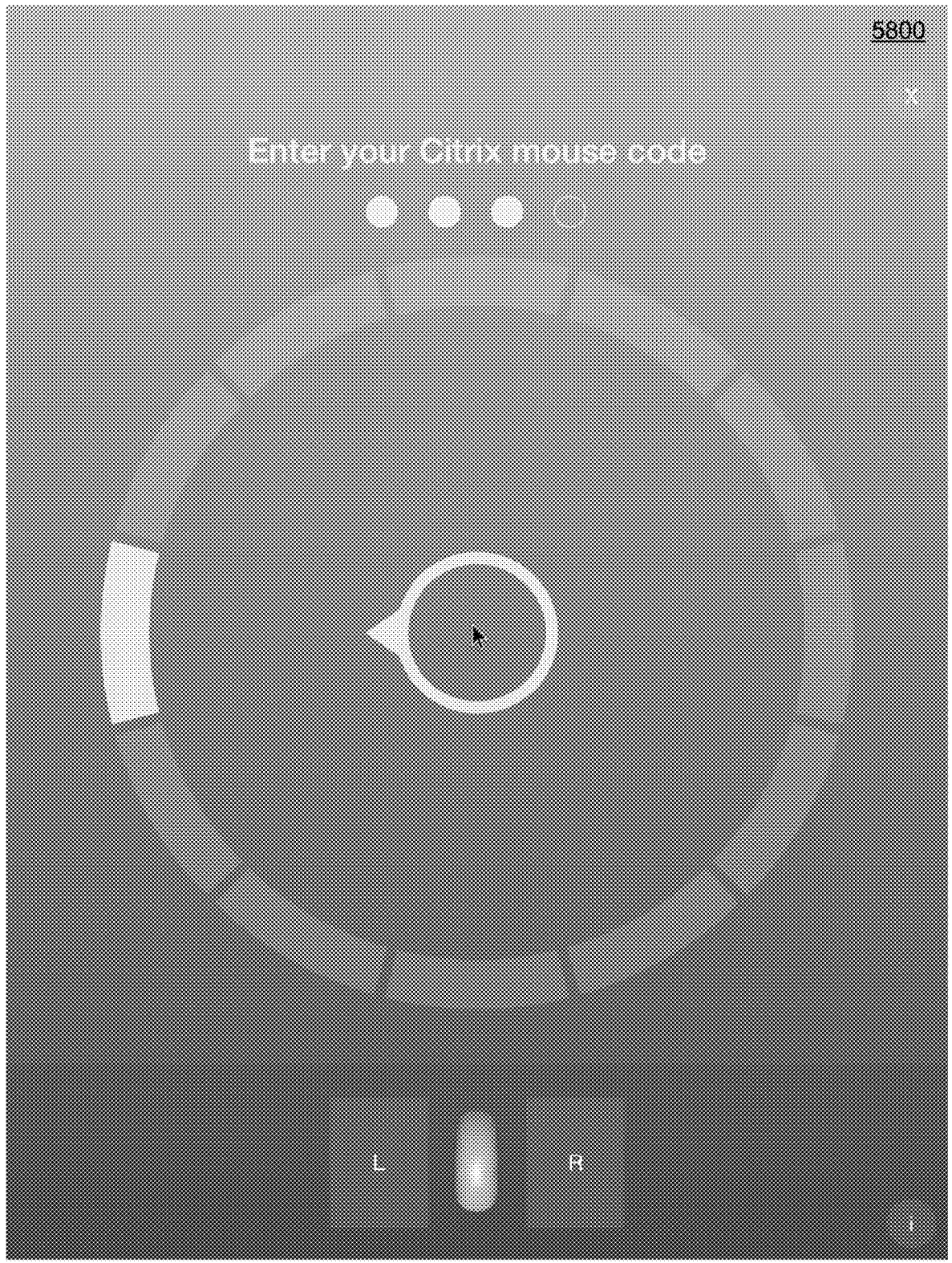
FIG. 58 illustrates an example display screen for entering a mouse wheel authentication code in accordance with one or more illustrative aspects described herein.

FIG. 58 illustrates an example display screen 5800 for entering a mouse wheel authentication code in accordance with one or more illustrative aspects described herein.

Figure 59:
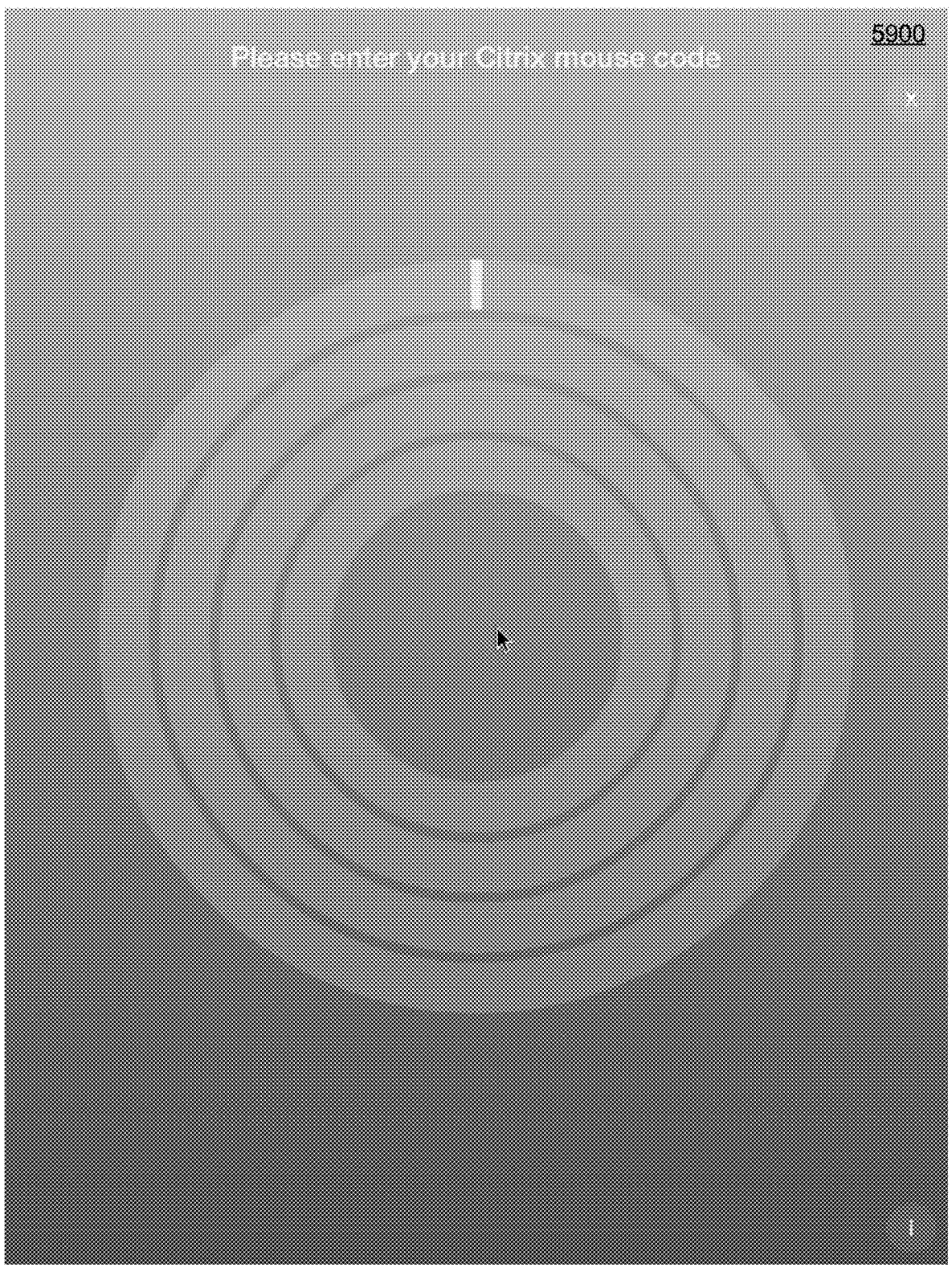
FIG. 59 illustrates an example display screen for entering a mouse wheel authentication code in accordance with one or more illustrative aspects described herein.

FIG. 59 illustrates an example display screen 5900 for entering a mouse wheel authentication code in accordance with one or more illustrative aspects described herein.

Figure 60:
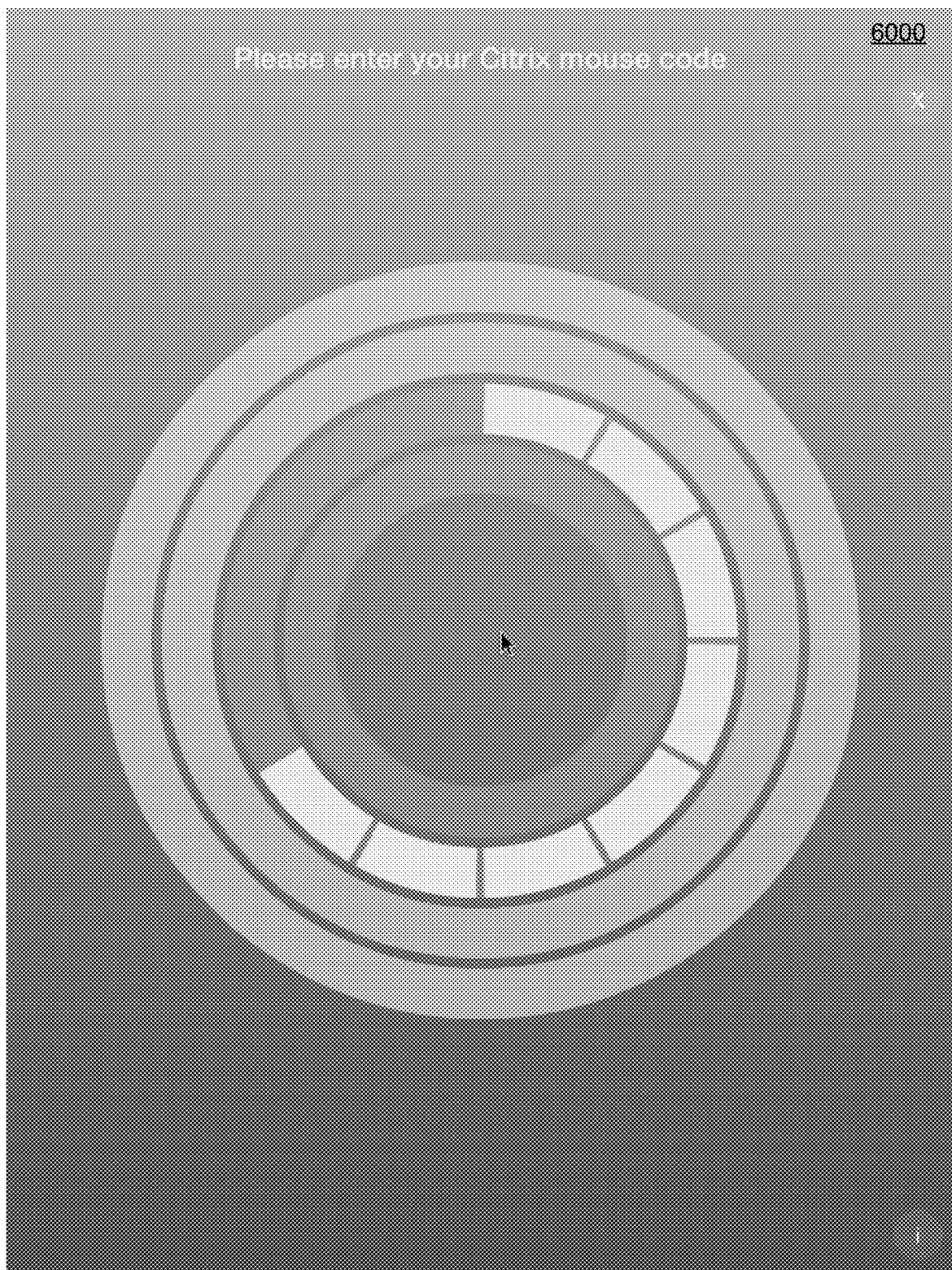
FIG. 60 illustrates an example display screen for entering a mouse wheel authentication code in accordance with one or more illustrative aspects described herein.

FIG. 60 illustrates an example display screen 6000 for entering a mouse wheel authentication code in accordance with one or more illustrative aspects described herein.

Figure 61:
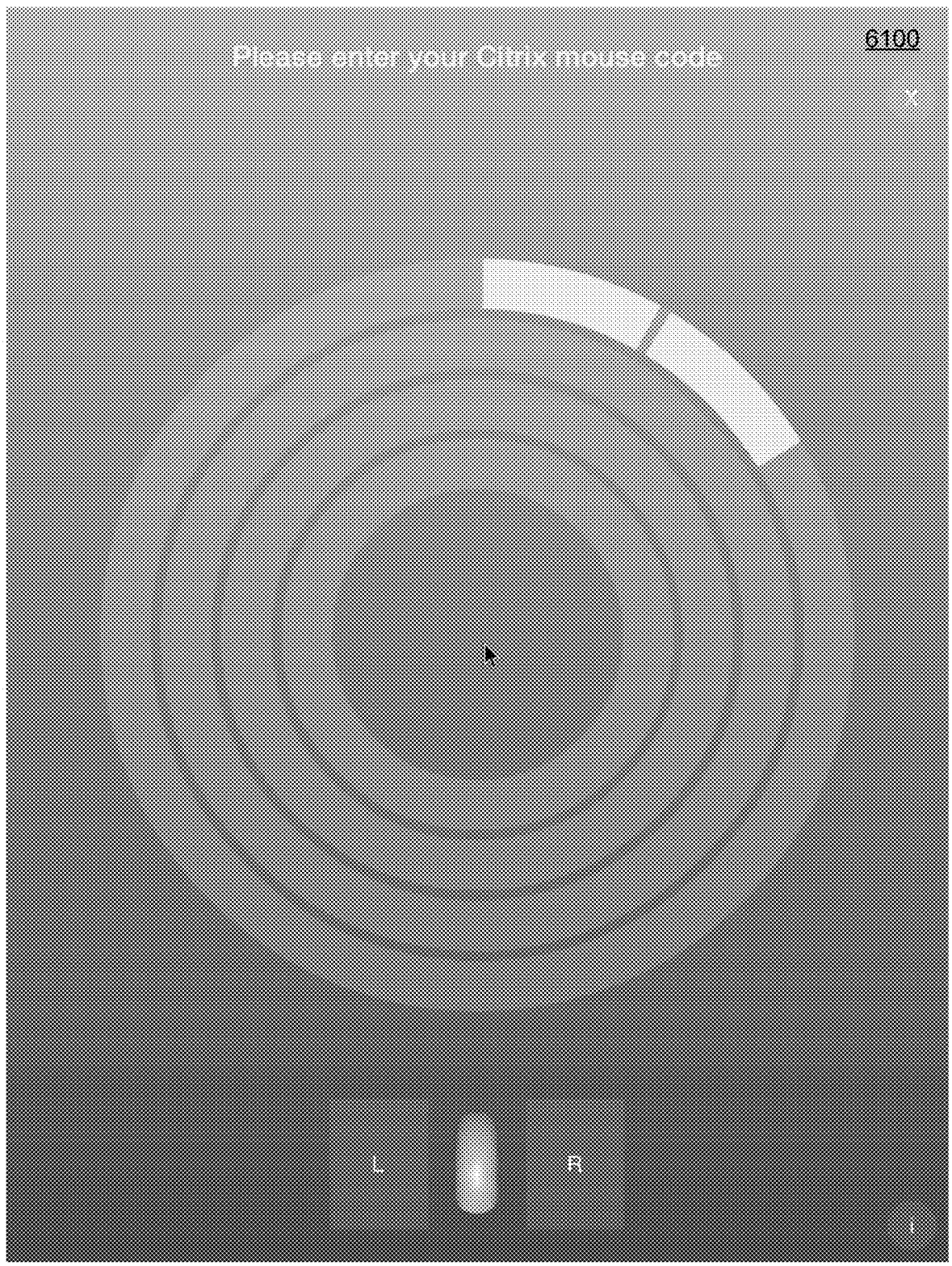
FIG. 61 illustrates an example display screen for entering a mouse wheel authentication code in accordance with one or more illustrative aspects described herein.

FIG. 61 illustrates an example display screen 6100 for entering a mouse wheel authentication code in accordance with one or more illustrative aspects described herein.

Figure 62:
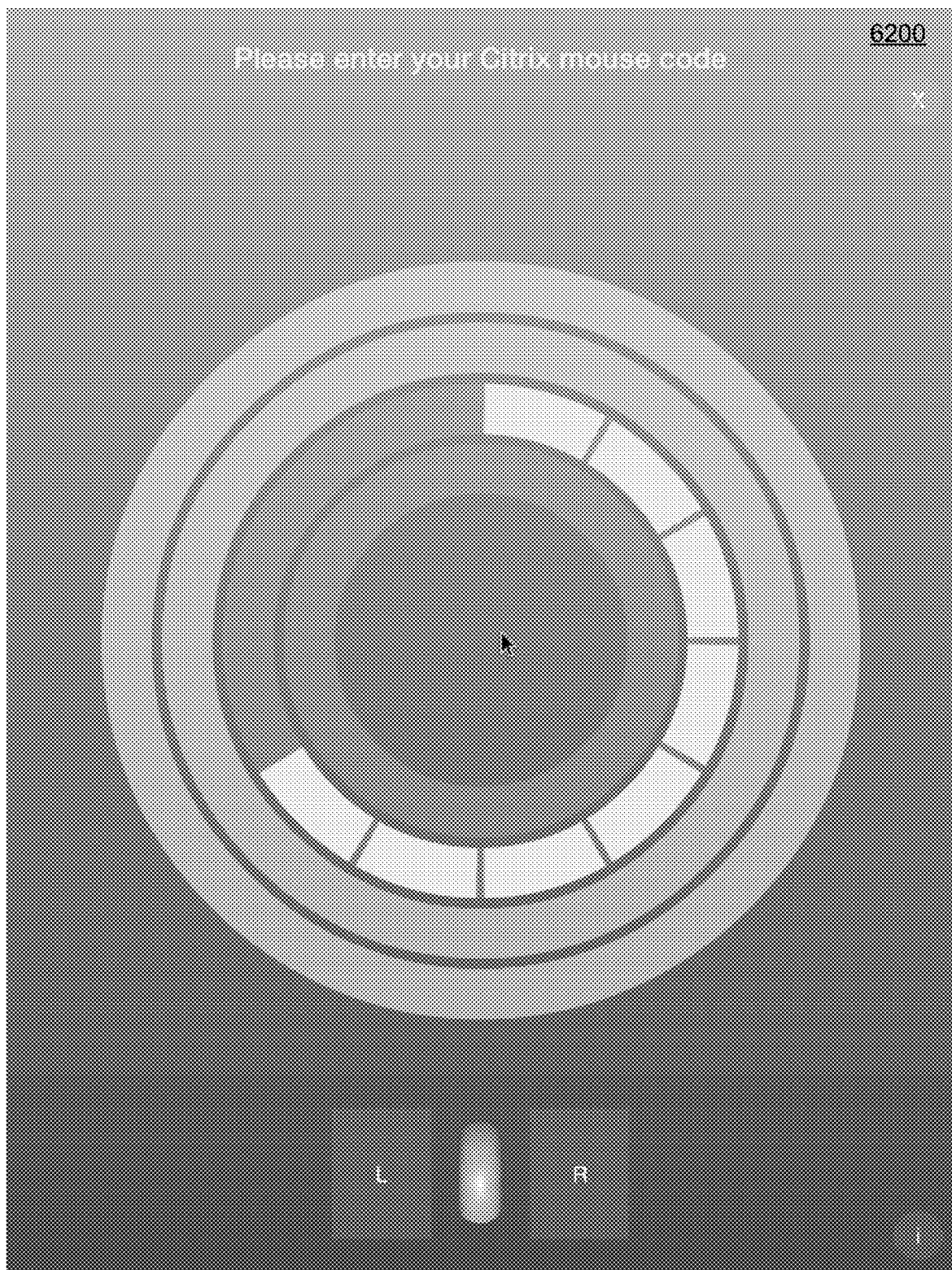
FIG. 62 illustrates an example display screen for entering a mouse wheel authentication code in accordance with one or more illustrative aspects described herein.

FIG. 62 illustrates an example display screen 6200 for entering a mouse wheel authentication code in accordance with one or more illustrative aspects described herein.

Figure 63:
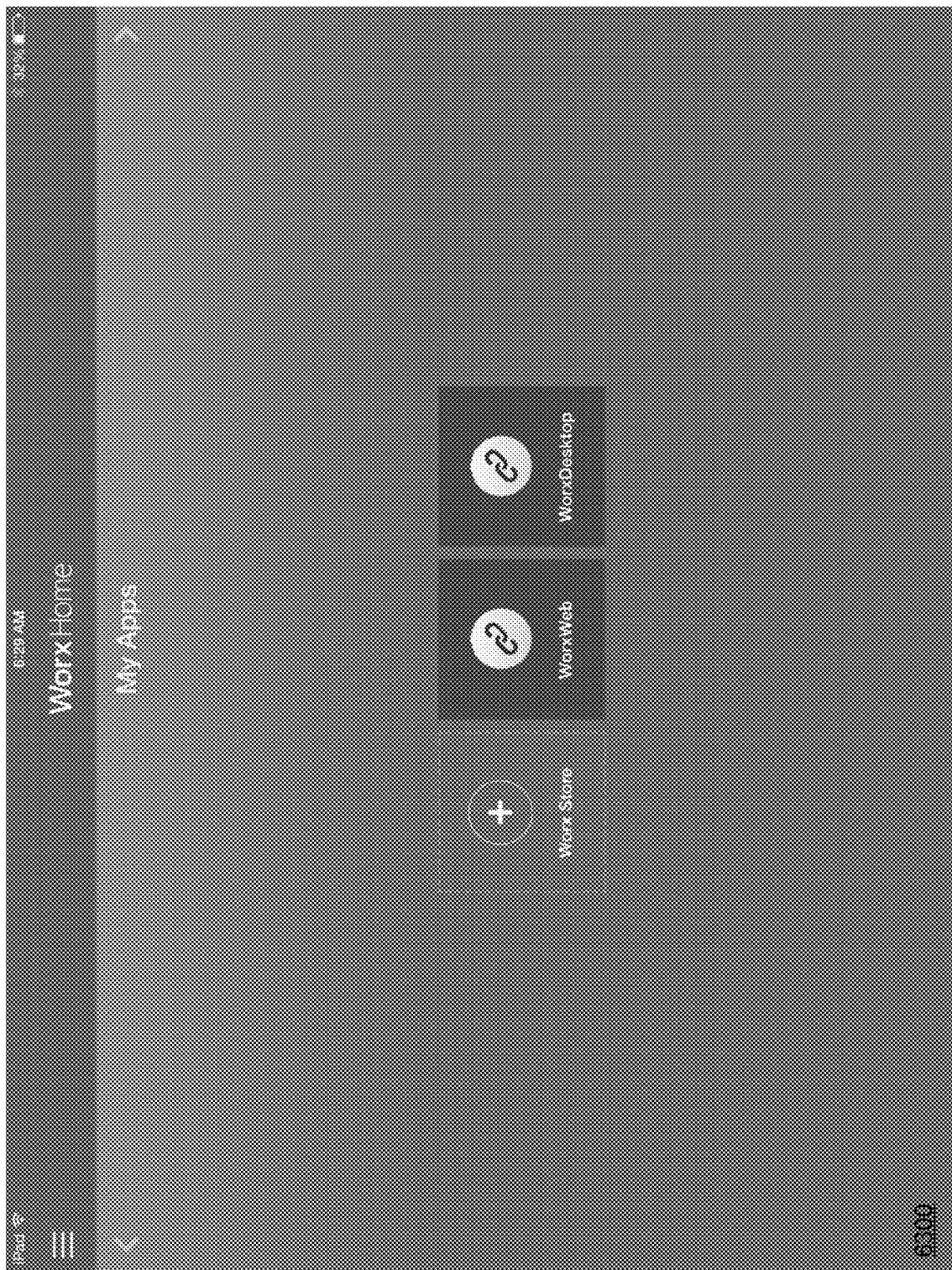
FIG. 63 illustrates an example display screen for accessing applications in accordance with one or more illustrative aspects described herein.

FIG. 63 illustrates an example display screen 6300 for accessing applications in accordance with one or more illustrative aspects described herein.

Figure 64:
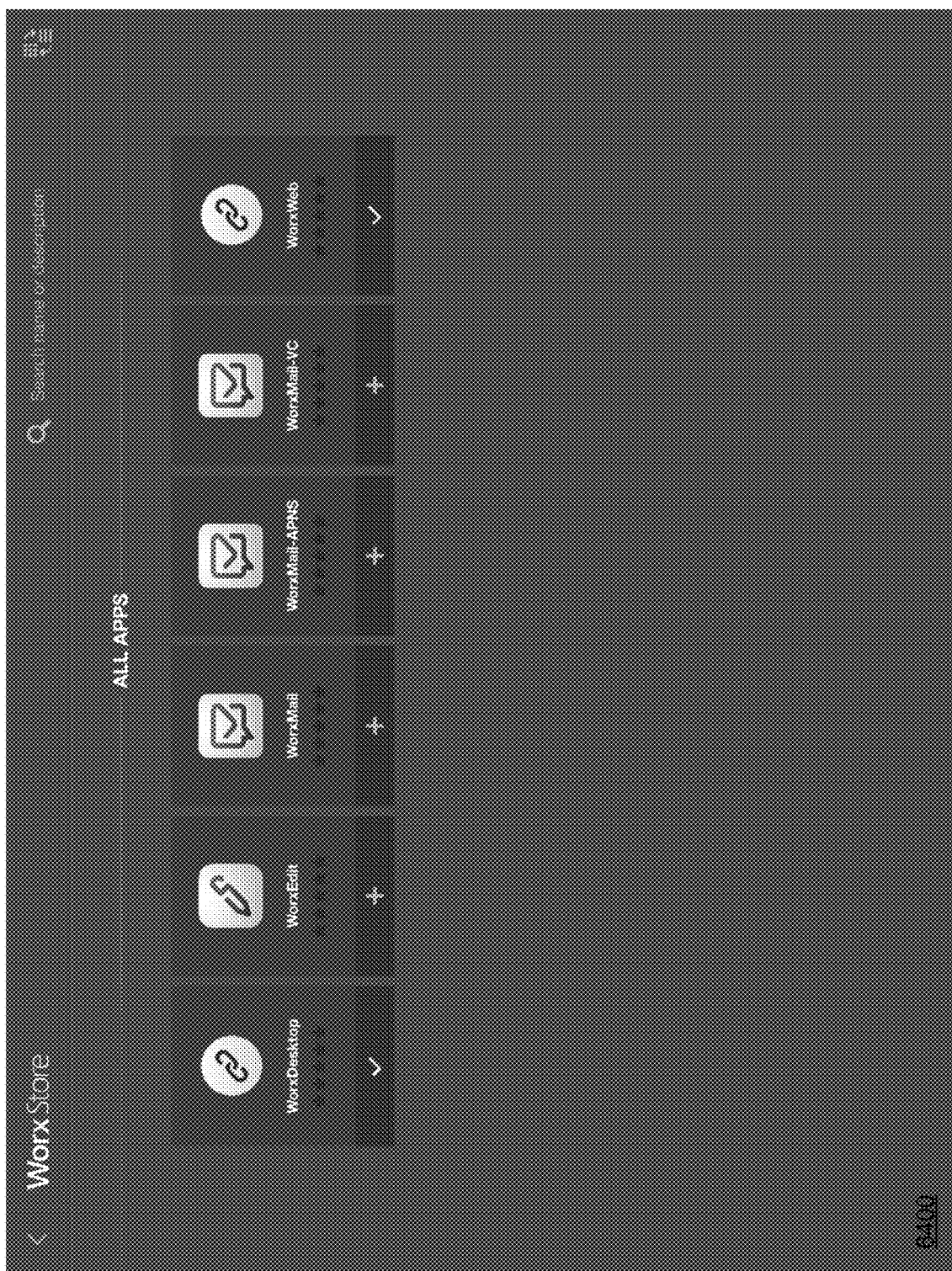
FIG. 64 illustrates an example display screen for accessing an application store in accordance with one or more illustrative aspects described herein.

FIG. 64 illustrates an example display screen 6400 for accessing an application store in accordance with one or more illustrative aspects described herein.

Mouse: Wheel-Based Credential Input

A user may enter a code by scrolling up or scrolling down on a scroll wheel of a mouse, such as the Citrix mouse. In some aspects, direction of rotation matters. A display, such as a display on the primary device A, may display the user's entered code. For example, a pointer, an arm, and/or a highlighted segment rotating clock-wise or counter-clockwise may identify the currently selected position or digit.

In one example, mouse wheel authentication may comprise concentric circles displayed on a display. FIGS. 27-32 illustrate an example of a user setting a code using a mouse to input the code. The code, as it is being set, may be displayed on, for example, a display of the primary device A. With reference to FIG. 27, four concentric circles may be displayed to the user. Although four circles are illustrated, any number of circles may be used, such as one circle, two circles, three circles, five circles, etc. The user may be prompted to set a mouse code. With reference to FIG. 28, the user may scroll down four times, and the display may highlight four segments of the outer-most circle to represent that the first code is currently set to four scrolls down. The user may optionally click the right click button, the left click button, or the scroll wheel itself to set the first code to four scrolls down. The illustrated configuration uses 12 segments, which may represent an intuitive clock interface. However, the circles are not limited to twelve segments and may comprise any number of segments based on a server policy.

FIG. 29 illustrates an example where the user has scrolled down two times and accordingly set the first code to two scrolls down. With reference to FIG. 30, after each digit entry, the current circle may be filled completely to hide the previous selection. For example, the outer-most circle may be completely filled. The user may then optionally set the second code. For example, the user may scroll up four times, as illustrated in the second concentric circle shown in FIG. 30. The user may click a button to set the second code as four scrolls up. With reference to FIG. 31, the user may optionally set a third code (e.g., 8 scrolls down). With reference to FIG. 32, the user may optionally set a fourth code (e.g., 2 scrolls up).

In another example, mouse wheel authentication may comprise a pointer displayed on a display, and optionally dots indicating the code level. FIGS. 21 and 22 illustrate an example of a user setting a code using a mouse to input the code. The display may comprise a single pointer or arm and dots at the top of the display highlighting the number of codes (e.g., digits) already set or entered. FIG. 21 illustrates an example initial display for setting a mouse code. FIG. 22 illustrates an example display displaying the first code set by the user, which may be four segments to the right relative to 12 o'clock. As previously explained, the user may scroll down four segments and press a button on the mouse to set the first code.

In some aspects, the right click or the scroll wheel click may be used to set a code, whereas the left click may be used to cancel an entry. Depending on the theme, the previously completed circle or dot may be cleared from the display. The buttons may be configured differently based on preferences, e.g., for right or left-handed users.

Once a code has been set, the code may be used to authenticate the user on the primary device A (and using the input device B to input the code) or to authenticated the user directly on the input device B. FIGS. 23-25, 33-35, and 53-62 illustrate exemplary displays prompting the user to enter his or her mouse code. The user may optionally be prompted to confirm the code by entering it a second time. FIGS. 26, 36, and 37 illustrate exemplary displays prompting the user to confirm his or her mouse code (e.g., by entering it a second time). Entering and/or confirming the code may be performed in a master application (e.g., WorxHome or Receiver X1) during an enrollment process (e.g., enrollment with XenMobile MDM/MAM server).

In some aspects, a unique secret from the mouse or other input device, such as a unique firmware ID, may be extracted as additional entropy used for authentication. The mouse might additionally or alternatively be pre-seeded with a secret (e.g., generated by the master app or the server). Use of the mouse, other input device, and/or a paired device entropy to generate keys was previously described in the examples above.

After enrollment (e.g., authentication of the user using the mouse), the master application, which may be running on the primary device A, may present the user with the user's application or with a list of applications available in an application store. FIG. 63 illustrates an example display of the user's application. FIG. 64 illustrates an example display of applications available in an application store.

In some aspects, the challenge for the mouse code may be done in any MDX/MAM app, e.g. WorxMail, or in the master application itself. Prompting the user to provide the code may be based on a policy. For example, the user may be prompted for the code each time the user launches or resumes an application to the foreground, or based on a period of inactivity. Depending on the display theme, the wheels and/or dots may shake and clear if the user enters an incorrect code. The user may be asked to enter a code again up to a maximum allowed number of unsuccessful attempts.

In some aspects, the user interface (UI) for inputting a mouse code may be hidden for added security (e.g., to prevent shoulder surfing). For example, the mouse wheel input UI may be hidden when not in enrollment mode. The user may be challenged for a mouse code without UI feedback on their entry. Instead, the user may feel the mouse button clicks to identify the entered code. For extra disguise, depressing the mouse wheel itself may be used for entry confirmation instead of right clicks after each entry.

As previously explained, the input device B, such as the mouse, may be temporarily unavailable to the user. For example, the mouse may be in checked luggage or overhead storage while the user is on an airplane. In these circumstances, an on-screen slider may be displayed to facilitate code input. FIGS. 25, 35, 58, 61, and 62 illustrate examples of on-screen sliders displayed on the primary device A when the input device B is unavailable. Based on policy, the user may be allowed to use an on-screen slider to enter mouse wheel code. The virtual code input mechanism may be made available to the user for a limited amount of time, such as a policy-controlled grace period (e.g., 72 hours). The grace period may be selected for, for example, the worst case scenario for a travelling user, such as if the user is travelling around the world on an airplane, which may take up to 72 hours. After the grace period, the user may be required to connect the mouse again. As previously explained, this may be useful when the mouse is temporarily unavailable or inconvenient to use, e.g., on an airplane or train. For added disguise, the wheel entry UI may also be hidden, and the primary device A may issue vibrations and/or audible clicks as feedback to the user entering a code. Accordingly, a shoulder surfer or an individual with an IR or temperature sensor might not be able to obtain the code easily as the user is inputting the code.

In some aspects, the mouse credential input may use customizable themes. FIG. 38 illustrates some customizable themes. For example, vibrant or different colors for each wheel or circle may allow the user to distinguish between entries more easily. As another example, different backgrounds (e.g., an image of a metal safe, a treasure chest, a jewelry box, etc.) and/or a rotating image in the middle (e.g., a metal safe handle wheel, a ship wheel, or a diamond respectively, etc.) may be used to customize the credential input display for the user.

Mouse: Gesture-Based Credential Input

Gestures made on a mouse, such as the Citrix Mouse, may be used for authentication. For example, the mouse may be used to form gestures on an imaginary grid or projected grid, for example, on a work desk or surface. The user may perform gesture authentication with a mouse by marking gestures or paths on the grid. For example, the user may move the mouse up, down, to the right, to the left, in a diagonal, in a circle, or in any other pattern. A projected grid may allow the user to reproduce gestures more easily, whereas an imaginary (e.g., invisible) grid may offer more secrecy.

Mouse: Biometric Reader

In some aspects, the mouse may include a biometric reader, such as a fingerprint reader. For example, the biometric reader may be built on the side of the mouse, so the user can enter his or her fingerprint on demand. The mouse and/or the primary device A may match the fingerprint to a stored fingerprint of the user. If a match is confirmed, the user may be authenticated.

Smartwatch

The input device B described herein may comprise a smartwatch, such as the Apple Watch, an Android smartwatch, or any other type or brand of smartwatch. As previously explained, the smartwatch may be paired with a primary device A (e.g., a tablet, a laptop computer, a desktop computer, a smartphone, etc.) over Bluetooth, Wi-Fi, NFC, or a device mesh network (e.g., the Octoblu/Meshblu REST API).

Smartwatch: Wheel-Based Credential Input

Similar to the mouse example described above and illustrated in the figures, an input device on the smartwatch, such as the touch screen display, the watch crown wheel, buttons, a slider, or any other input device may be used to set, enter, and/or confirm a code. FIG. 39 illustrates an example display for setting a smartwatch code. The crown wheel on an Apple Watch may be rotated to select a digit and depressed to confirm a selection. Additionally or alternatively, confirmation could be done by tapping the display or pressing other buttons on the smartwatch. The dots at the top of the smartwatch display may fill as each digit is being entered. If the user enters an incorrect code, the dots may clear, and the watch may vibrate and/or sound an error. The touchscreen display of the smartwatch may also be used to set, enter, and/or confirm the code. For example, the user may position his or finger at one of the positions illustrated in FIG. 39 to set, enter, and/or confirm a code. The user may also swipe left, right, down, or up to set, enter, and/or confirm the code. For example, each swipe may correspond to a movement of the pointer illustrated in FIG. 39 to the next segment. For example, a swipe to the left may cause the pointer to rotate clockwise to the next segment (e.g., from 12 o'clock to 1 o'clock). Another swipe to the left may cause the pointer to rotate clockwise an additional segment (e.g., from 1 o'clock to 2 o'clock). Similarly, a swipe to the right may cause the pointer to rotate counterclockwise. The user may set or enter the code by pressing the screen once, hard pressing the screen, or pressing a physical button the smartwatch.

Smartwatch: Gesture-Based Credential Input

FIGS. 40-43 illustrate examples displays for setting, entering, and/or confirming a gesture code. For example, the application on the smartwatch may comprise a grid having 3 horizontal lines, 3 vertical lines, and 2 diagonal lines (8 total). The user may use swiping gestures to select a line for the code. When the user swipes, a highlight may be displayed on the line that the user swiped. For example, a blue highlight may indicate the selected line. With reference to FIG. 41, the top line may be highlighted if the user horizontally swipes the top line from right to left or left to right. With reference to FIG. 42, the top left to the bottom right diagonal line may be highlighted if the user diagonally swipes that line. With reference to FIG. 43, the top right to the bottom left diagonal line may be highlighted if the user diagonally swipes that line. A set of dots may also be displayed on the top of the watch display. The dots, as described above, may indicate the number of the current swipe. As the user enters their code the dots fill accordingly. For example, the swipe illustrated in FIG. 41 may comprise the first swipe, the swipe illustrated in FIG. 42 may comprise the second swipe, and the swipe illustrated in FIG. 43 may comprise the fifth swipe.

In some aspects, the direction of swipe may matter. In other words, a swipe in one direction may represent a different code than a swipe along the same line in the opposite direction. For example and with reference to FIG. 41, a swipe along the top line from the left to right may represent a first code, whereas a swipe along the same line from the right to the left may represent a second, different code. With eight total lines, sixteen unique codes may exist for each level. If tap and double-tap gestures (e.g., on the touchscreen display) are added, a total of 18 combinations per dot (entry) may exist. With six dots (entries), a total of 34,012,224 (~34 million) permutations may exist (e.g., $18^6$ permutations).

During enrollment, the user may be prompted to enter a gesture code, then to confirm it by entering the code a second time. This may be done in a master application, such as WorxHome or Receiver X1, during the enrollment process (e.g., enrollment with XenMobile MDM/MAM server).

A separate display, such as a display on the primary device A (e.g., a tablet, laptop computer, desktop computer, smartphone, etc.), may display the progress of authentication and/or instruct the user to set, enter, and/or confirm a gesture on the smartwatch. FIG. 47 illustrates an example display instructing the user to set a gesture code on the smartwatch. FIGS. 48 and 51 illustrate example displays instructing the user to enter a gesture code on the smartwatch. FIGS. 49 and 52 illustrate example displays indicating to the user that the primary device A is waiting for the smartwatch. For example, the primary device A may wait for the user to enter and/or confirm his or her gesture. The primary device A may also wait for the smartwatch to authenticate the user and/or to provide the entered gesture to the primary device A for authentication. The primary device A may also wait for the smartwatch to connect to the primary device A either directly (e.g., over Bluetooth) or via a device mesh network. FIG. 50 illustrates an example display instructing the user to confirm the gesture code by, for example, entering it a second time.

In some aspects, a unique secret from the smartwatch, such as a unique firmware ID, may be extracted as additional entropy used for authentication. The smartwatch might additionally or alternatively be pre-seeded with a secret (e.g., generated by the master app or the server). Use of the smartwatch, other input device, and/or a paired device entropy to generate keys was previously described in the examples above.

After enrollment (e.g., authentication of the user using the smartwatch), the master application, which may be running on the primary device A, may present the user with the user's application or with a list of applications available in an application store. FIG. 63 illustrates an example display of the user's application. FIG. 64 illustrates an example display of applications available in an application store.

In some aspects, the challenge for the gesture code may be done in any MDX/MAM app, e.g. WorxMail, or in the master application itself. Prompting the user to provide the code may be based on a policy. For example, the user may be prompted for the code each time the user launches or resumes an application to the foreground, or based on a period of inactivity. Depending on the display theme, the dots may shake and clear and/or the smartwatch may vibrate or issue an "error" sound if the user enters an incorrect code. The user may be asked to enter a code again up to a maximum allowed number of unsuccessful attempts.

In alternative aspects, a numeric PIN challenge (e.g., a digit pad from 0 to 9) could be presented on the smartwatch (instead of the gesture grid) to authenticate the user to a paired primary device.

Advantages of Mouse and/or Smartwatch Authentication

Wheel-based Credential Input: Authentication via a mouse or smartwatch may offer advantages over traditional PIN-based authentication methods. For example, more combinations in a mouse or smartwatch wheel may make the wheel-based input harder to break using brute force. A 4-digit numeric PIN may comprise $10^4$ or 10,000 combinations. A 4-digit mouse or smartcard wheel code, on the other hand, may comprise $25^4$ or 390,625 combinations.

Additional Entropy: As explained above, a unique secret from the mouse or smartwatch, e.g., a unique firmware ID, may be used as additional entropy supplementing the user entropy (e.g., the entered code). This may make attacks on entropy very difficult. As explained above, the mouse may also be pre-seeded with a secret.

2-factor Authentication: With 2-factor authentication, even if someone steals the mouse or smartwatch wheel code, the thief will not be able to authenticate without the actual mouse and/or its embedded entropy. Alternatively, even if someone steals the mouse or smartwatch, the thief will not be able to authenticate by simply possessing the mouse alone because the user's secret (e.g., mouse wheel code) is also used for authentication.

Lost Paired Device (e.g., mouse or smartwatch) Handling: The user's data, such as offline e-mails, may be preserved if the mouse entropy/secret is saved on a server, such as the XenMobile server. The user may then bring a new mouse and may be asked to re-enroll it if the user loses the first mouse (or smartwatch). The user may then be asked to strongly authenticate using AD credentials and/or one-time password or token given by the administrator. After strong authentication, the old mouse entropy may be fetched from the server and used to decrypt the data on the user's primary device. The new mouse entropy may be used to re-encrypt the data. Accordingly, the user may use the new paired device (e.g., mouse or smartwatch). In some aspects, a smartcard may be built into the mouse, such that the secrets are protected on a TPM. A biometric reader may also be built, e.g., on the side of the mouse.

Security through Uniqueness: A regular PIN entry may be spied upon, e.g., using video camera or even infrared camera to analyze the heat footprint on a touch display. As previously discussed, the mouse wheel input UI may be hidden when not in enrollment mode. The user may be challenged for a mouse code without UI feedback on their entry. Rather, the mouse may provide feedback, such that the user feels the mouse button clicks instead. For extra disguise, depressing the mouse wheel itself may be used for entry confirmation instead of right-clicks after each entry.

PIN-less authentication described herein may be based on mouse presence and entropy. 2-factor authentication may be based on mouse presence and entropy and a PIN, such as a WorxPIN. Authentication may also be based on mouse presence and entropy or a PIN, such as a WorxPIN. For convenience, the mouse may be used when available. An on-screen slider to enter mouse wheel code may also be used, as previously described. The on-screen slider may be provided for a certain policy-controlled grace period, such as 72 hours. This may be useful when the mouse is temporarily unavailable or inconvenient to use, e.g., on an airplane or train. For added disguise, the wheel entry UI in this case may also be hidden, and the primary device may issue vibrations or audible clicks as feedback to the user entering a code.

Gesture-based Credential Input: Similar to other forms of input, a gesture-based input mechanism may provide a certain amount of randomness (or entropy), so that authentication systems can differentiate one gesture from another. A gesture-based input may prompt a user to draw three vertical or horizontal lines (gestures). The total number of gesture patterns may be $2^3$ or 8. Additional entropy may be gained by noting whether the line is drawn from left-right, right-left, up-down or down-up, and at what displacement from the edge of a screen. Furthermore, the system may increase the entropy even further by allowing lines to be drawn at different angles, e.g., diagonally or by allowing tap and double-tap gestures, as previously explained.

As previously explained, the smartwatch application may have a grid with 3 horizontal, 3 vertical and 2 diagonal lines (8 total lines). Because direction of swipe may also matter, 16 combinations exist. If tap and double-tap gestures are added, there will be a total of 18 combinations per dot (entry). With 6 dots (entries), that is $18^6$ or 34,012,224 permutations total.

Any device that meets one or more of the following criteria may be able to provide multifactor contextual authentication and entropy: the device is able to store user or server entropy (secret), the device is able to authenticate the request for entropy from another device, and/or the device is able to forward the stored entropy to a requesting device. For example, a smart card, smart watch, smart mouse, or a user smart token may be enrolled in a user's device mesh. Upon request for the stored user entropy, the device may prompt the user for authorization or authentication. The authorization or authentication may request the user to provide their authentication code, gesture, or voice input to authenticate. Alternatively, if the device knows that it is physically located next to the requesting device (via pre-approved locations and communication mechanisms, such as Bluetooth or NFC) it may forgo prompting the user to authenticate and instead forward the stored user entropy to the requesting device (implicit authorization). The requesting primary device may then use the received user entropy (secret) to authenticate the user to the secondary system with or without user involvement. Devices such as the Apple Watch, Pebble Watch or NFC Smart Cards may meet these criteria.

In addition to the description above, FIGS. 21-64 illustrate one or more designs for a portion of a display device, smart watch, mobile device, or other electronic device having a visual display. Applicant reserves the right to file one or more design patent applications claiming priority to the present application and based on any of the elements (or portions thereof) illustrated in FIGS. 21-64. Applicant reserves the right to claim the configurations shown in any of FIGS. 21-64 and/or to disclaim any one or more discrete elements included therein. Applicant reserves the right to disclaim any of the text or mouse cursors shown in any of FIGS. 21-64. Applicant reserves the right to claim each design (or portion thereof) in color, shading, grayscale, line drawing, or any other acceptable design patent drawing technique.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a first user device from a second user device, an authentication request;
   receiving, via an application running on the first user device, a user input comprising an authentication secret;
   performing, by the first user device based on the received authentication secret, authentication with an authentication server;
   indicating, by the first user device, to the second user device that the authentication with the authentication server is successful by sending a message from the first user device to second user device; and
   before the receiving the authentication request, pairing the first user device with the second user device;
   wherein the first user device comprises at least one of a mouse or a smartwatch.

2. The method of claim 1, wherein the user input comprises at least one of a personal identification number, a password, a gesture, a swipe, a mouse wheel entry, a watch wheel entry, or a voice entry.

3. The method of claim 1, wherein the sending the message comprises sending, by the first user device to the second user device, a secret key.

4. The method of claim 1, wherein the message comprises a validity time period within which the message is valid.

5. The method of claim 1, wherein the message is encrypted with a public key of the second user device, and wherein the message is signed with a private key of the first user device.

6. The method of claim 1, wherein the message sent from the first user device terminates at the second user device.

7. The method of claim 1, wherein the indication that the authentication with the authentication server is successful, from the first user device to the second user device, unlocks the second user device.

8. The method of claim 1, further comprising: delegating, from the second user device to the first user device, an authentication task.

9. A method comprising:
   receiving, by a first user device from a second user device, an authentication request;
   receiving, via an application running on the first user device, a user input comprising an authentication secret;
   performing, by the first user device based on the received authentication secret, authentication with an authentication server;
   indicating, by the first user device, to the second user device that the authentication with the authentication server is successful by sending a message from the first user device to second user device;
   before the receiving the authentication request, pairing the first user device with the second user device;
   sending, by the first user device to a computing device associated with a device mesh, a request for a public key of the second user device; and
   receiving, by the first user device from the computing device, the public key of the second user device,
   wherein the receiving the user input is based on a successful verification of the authentication request using the public key of the second user device.

10. The method of claim 9, wherein the message sent from the first user device terminates at the second user device.

11. The method of claim 9, wherein the indication that the authentication with the authentication server is successful, from the first user device to the second user device, unlocks the second user device.

12. The method of claim 9, further comprising: delegating, from the second user device to the first user device, an authentication task.

13. An apparatus comprising:
   one or more processors; and memory storing instructions that, when executed by the one or more processors, cause the apparatus to:

receive, from a user device, an authentication request;

receive, via an application running on the apparatus, a user input comprising an authentication secret;

perform, based on the received authentication secret, authentication with an authentication server;

indicate, to the user device, that the authentication with the authentication server is successful by sending a message from the first user device to second user device;

pair the apparatus with the user device;

send, to a computing device associated with a device mesh, a request for a public key of the user device;

receive, from the computing device, the public key of the user device, and receive the user input based on a successful verification of the authentication;

request using the public key of the user device.

14. The apparatus of claim 13, wherein the user input comprises at least one of a personal identification number, a password, a gesture, a swipe, a mouse wheel entry, a watch wheel entry, or a voice entry.

15. The apparatus of claim 13, wherein the instructions, when executed by the one or more processors, cause the apparatus to send the message by sending, to the user device, a secret key.

16. The apparatus of claim 13, wherein the message comprises a validity time period within which the message is valid.

17. The apparatus of claim 13, wherein the message is encrypted with a public key of the user device, and wherein the message is signed with a private key of the apparatus.

18. The apparatus of claim 13, wherein the message sent from the first user device terminates at the second user device.

19. The apparatus of claim 13, wherein the indication that the authentication with the authentication server is successful unlocks the second user device.

* * * * *